United States Patent
Davis et al.

(10) Patent No.: US 9,621,404 B2
(45) Date of Patent: Apr. 11, 2017

(54) BEHAVIORAL FINGERPRINTING WITH SOCIAL NETWORKING

(71) Applicant: Elwha LLC, Bellevue, WA (US)

(72) Inventors: Marc E. Davis, San Francisco, CA (US); Matthew G. Dyor, Bellevue, WA (US); Daniel A. Gerrity, Seattle, WA (US); Xeudong Huang, Bellevue, WA (US); Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Nathan P. Myhrvold, Bellevue, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 99 days.

(21) Appl. No.: 13/691,466

(22) Filed: Nov. 30, 2012

(65) Prior Publication Data
US 2013/0159413 A1 Jun. 20, 2013

Related U.S. Application Data

(63) Continuation-in-part of application No. 13/686,739, filed on Nov. 27, 2012, which is a (Continued)

(51) Int. Cl.
*H04L 29/08* (2006.01)
*H04L 29/06* (2006.01)
(Continued)

(52) U.S. Cl.
CPC ......... *H04L 29/0872* (2013.01); *G06Q 10/10* (2013.01); *G06Q 50/01* (2013.01);
(Continued)

(58) Field of Classification Search
CPC ........................ H04L 63/02; H04L 63/0861
(Continued)

(56) References Cited

U.S. PATENT DOCUMENTS 6,084,953 A 7/2000 Bardenheuer et al.
6,957,199 B1 10/2005 Fisher
(Continued)

FOREIGN PATENT DOCUMENTS

WO WO 2011/119273 A3 9/2011

OTHER PUBLICATIONS

Trejo et al.; "Using Cloud Computing MapReduce operations to Detect DDoS Attacks on DNS servers"; Proceedings of the 4th Iberian Grid Infrastructure Conference; pdf created Mar. 1, 2013; pp. 1-13.
(Continued)

*Primary Examiner* — Lashonda Jacobs

(57) ABSTRACT

Disclosed herein are example embodiments for behavioral fingerprinting with social networking. For certain example embodiments, one or more devices may: (i) communicate for at least one interaction related to a user of a user device in a behavioral fingerprint habitat; or (ii) administer at least an aspect of at least one interaction related to a user of a user device in a behavioral fingerprint habitat. However, claimed subject matter is not limited to any particular described embodiments, implementations, examples, or so forth.

37 Claims, 21 Drawing Sheets

Related U.S. Application Data continuation-in-part of application No. 13/678,380, filed on Nov. 15, 2012, which is a continuation-in-part of application No. 13/673,506, filed on Nov. 9, 2012, which is a continuation-in-part of application No. 13/665,841, filed on Oct. 31, 2012, which is a continuation-in-part of application No. 13/665,830, filed on Oct. 31, 2012, now Pat. No. 9,298,900, which is a continuation-in-part of application No. 13/631,667, filed on Sep. 28, 2012, now Pat. No. 9,015,860, which is a continuation-in-part of application No. 13/602,061, filed on Aug. 31, 2012, which is a continuation-in-part of application No. 13/563,599, filed on Jul. 31, 2012, now Pat. No. 9,083,687, which is a continuation-in-part of application No. 13/552,502, filed on Jul. 18, 2012, which is a continuation-in-part of application No. 13/538,385, filed on Jun. 29, 2012, now Pat. No. 8,869,241, which is a continuation-in-part of application No. 13/475,564, filed on May 18, 2012, now Pat. No. 8,713,704, which is a continuation-in-part of application No. 13/373,682, filed on Nov. 23, 2011, which is a continuation-in-part of application No. 13/373,677, filed on Nov. 23, 2011, now Pat. No. 8,688,980, which is a continuation-in-part of application No. 13/373,680, filed on Nov. 23, 2011, now Pat. No. 8,689,350, which is a continuation-in-part of application No. 13/373,684, filed on Nov. 23, 2011, now Pat. No. 9,348,985, which is a continuation-in-part of application No. 13/373,685, filed on Nov. 23, 2011, now Pat. No. 8,555,077.

(60) Provisional application No. 61/572,309, filed on Oct. 13, 2011, provisional application No. 61/632,836, filed on Sep. 24, 2011.

(51) Int. Cl.
  *G06Q 10/10* (2012.01)
  *G06Q 50/00* (2012.01)

(52) U.S. Cl.
  CPC .......... *H04L 63/02* (2013.01); *H04L 63/0861* (2013.01); *H04L 67/22* (2013.01)

(58) Field of Classification Search
  USPC .... 709/206, 203, 217, 219, 223, 224; 726/6, 726/14, 28, 29
  See application file for complete search history.

(56) References Cited

U.S. PATENT DOCUMENTS

| | | | |
|---|---|---|---|
| 7,305,360 B1 | 12/2007 | Lamoureux et al. | |
| 7,433,960 B1 | 10/2008 | Dube et al. | |
| 7,577,987 B2 | 8/2009 | Mizrah | |
| 7,689,418 B2 | 3/2010 | Ramaswamy et al. | |
| 7,827,592 B2 | 11/2010 | Fifer et al. | |
| 7,908,237 B2 | 3/2011 | Angell et al. | |
| 7,929,733 B1 | 4/2011 | Lehnert et al. | |
| 7,975,150 B1 | 7/2011 | Lillibridge et al. | |
| 8,020,005 B2 | 9/2011 | Mani et al. | |
| 8,051,468 B2 | 11/2011 | Davis et al. | |
| 8,155,999 B2 | 4/2012 | de Boer et al. | |
| 8,161,530 B2* | 4/2012 | Meehan | G06Q 20/341 713/186 |
| 8,169,916 B1 | 5/2012 | Pai et al. | |
| 8,175,959 B2 | 5/2012 | Mylet et al. | |
| 8,185,646 B2* | 5/2012 | Headley | G06F 21/32 709/225 |
| 8,205,245 B2 | 6/2012 | Tam et al. | |
| 8,285,639 B2 | 10/2012 | Eden et al. | |
| 8,290,908 B2 | 10/2012 | McCarthy et al. | |
| 8,316,237 B1 | 11/2012 | Felsher et al. | |
| 8,358,579 B1 | 1/2013 | Walsh et al. | |
| 8,392,969 B1 | 3/2013 | Park et al. | |
| 8,504,831 B2* | 8/2013 | Pratt et al. | 713/168 |
| 8,522,147 B2 | 8/2013 | Bladel et al. | |
| 8,533,266 B2 | 9/2013 | Koulomzin et al. | |
| 8,582,829 B2 | 11/2013 | Shuster | |
| 8,689,350 B2 | 4/2014 | Davis et al. | |
| 8,694,401 B2 | 4/2014 | Stewart | |
| 8,713,704 B2* | 4/2014 | Davis | H04L 9/3231 713/166 |
| 8,725,569 B2* | 5/2014 | Liang | H04W 4/02 705/14.49 |
| 8,725,672 B2 | 5/2014 | Rostampour et al. | |
| 8,726,036 B2* | 5/2014 | Kornafeld et al. | 713/189 |
| 8,732,089 B1 | 5/2014 | Fang et al. | |
| 8,776,168 B1 | 7/2014 | Gibson et al. | |
| 8,806,598 B2 | 8/2014 | Assam | |
| 8,819,789 B2 | 8/2014 | Orttung et al. | |
| 8,832,788 B1 | 9/2014 | Gibson et al. | |
| 8,869,241 B2* | 10/2014 | Davis | G06F 21/316 713/175 |
| 8,892,461 B2* | 11/2014 | Lau | H04W 12/06 705/14.4 |
| 8,918,904 B2 | 12/2014 | Sanin et al. | |
| 9,015,860 B2* | 4/2015 | Davis | G06N 5/02 726/28 |
| 9,053,307 B1* | 6/2015 | Johansson | G06F 21/316 |
| 9,137,247 B2* | 9/2015 | Smith | G06F 21/32 |
| 9,154,466 B2* | 10/2015 | Sobel | H04L 63/0421 |
| 9,185,101 B2* | 11/2015 | Grigg | H04L 63/08 |
| 2002/0025803 A1 | 2/2002 | Park | |
| 2002/0046105 A1 | 4/2002 | Gardenswartz et al. | |
| 2002/0073046 A1 | 6/2002 | David | |
| 2003/0063730 A1 | 4/2003 | Woodring | |
| 2003/0220980 A1 | 11/2003 | Crane | |
| 2004/0002329 A1 | 1/2004 | Bhatia et al. | |
| 2004/0005051 A1 | 1/2004 | Wheeler et al. | |
| 2004/0193892 A1 | 9/2004 | Tamura et al. | |
| 2005/0071643 A1 | 3/2005 | Moghe | |
| 2005/0100198 A1 | 5/2005 | Nakano et al. | |
| 2005/0171832 A1 | 8/2005 | Hull et al. | |
| 2005/0246771 A1 | 11/2005 | Hunt et al. | |
| 2005/0268107 A1 | 12/2005 | Harris et al. | |
| 2006/0020814 A1 | 1/2006 | Lieblich et al. | |
| 2006/0020816 A1 | 1/2006 | Campbell | |
| 2006/0020876 A1 | 1/2006 | Chang | |
| 2006/0074769 A1 | 4/2006 | Looney et al. | |
| 2006/0133651 A1 | 6/2006 | Polcha et al. | |
| 2006/0161553 A1* | 7/2006 | Woo | 707/10 |
| 2006/0218153 A1 | 9/2006 | Voon et al. | |
| 2006/0224898 A1 | 10/2006 | Ahmed | |
| 2006/0250578 A1 | 11/2006 | Pohl et al. | |
| 2006/0288234 A1 | 12/2006 | Azar et al. | |
| 2007/0067853 A1* | 3/2007 | Ramsey | 726/28 |
| 2007/0084913 A1 | 4/2007 | Weston | |
| 2007/0218900 A1 | 9/2007 | Abhyanker | |
| 2007/0226248 A1 | 9/2007 | Darr | |
| 2007/0240203 A1 | 10/2007 | Beck | |
| 2007/0245157 A1 | 10/2007 | Giobbi et al. | |
| 2007/0245158 A1 | 10/2007 | Giobbi et al. | |
| 2007/0250550 A1 | 10/2007 | Berninger | |
| 2008/0033941 A1 | 2/2008 | Parrish | |
| 2008/0091453 A1* | 4/2008 | Meehan | G06Q 20/341 705/317 |
| 2008/0092209 A1 | 4/2008 | Davis et al. | |
| 2008/0098456 A1 | 4/2008 | Alward et al. | |
| 2008/0102766 A1 | 5/2008 | Schultz | |
| 2008/0138472 A1 | 6/2008 | Alexandre | |
| 2008/0146193 A1 | 6/2008 | Bentley et al. | |
| 2008/0167002 A1 | 7/2008 | Kim et al. | |
| 2008/0172461 A1 | 7/2008 | Thattai et al. | |
| 2008/0281668 A1 | 11/2008 | Nurminen | |
| 2009/0006846 A1 | 1/2009 | Rosenblatt | |
| 2009/0025081 A1 | 1/2009 | Quigley et al. | |
| 2009/0030985 A1 | 1/2009 | Yuan | |
| 2009/0037285 A1 | 2/2009 | Murphy | |
| 2009/0070435 A1 | 3/2009 | Abhyanker | |

(56) References Cited

U.S. PATENT DOCUMENTS

| | | |
|---|---|---|
| 2009/0093235 A1 | 4/2009 | Grealish et al. |
| 2009/0111491 A1 | 4/2009 | Lemberg |
| 2009/0113040 A1 | 4/2009 | Zalewski |
| 2009/0150507 A1 | 6/2009 | Davis et al. |
| 2009/0152343 A1 | 6/2009 | Carter et al. |
| 2009/0210494 A1* | 8/2009 | Fisher et al. ............... 709/205 |
| 2009/0228509 A1 | 9/2009 | McCarthy et al. |
| 2009/0298514 A1 | 12/2009 | Ullah |
| 2010/0073202 A1 | 3/2010 | Mazed |
| 2010/0088157 A1 | 4/2010 | Wilson |
| 2010/0115592 A1 | 5/2010 | Belz et al. |
| 2010/0115610 A1* | 5/2010 | Tredoux et al. ............ 726/19 |
| 2010/0130165 A1 | 5/2010 | Snyder et al. |
| 2010/0161544 A1 | 6/2010 | Song et al. |
| 2010/0169343 A1 | 7/2010 | Kenedy et al. |
| 2010/0174709 A1 | 7/2010 | Hansen et al. |
| 2010/0177938 A1 | 7/2010 | Martinez et al. |
| 2010/0179857 A1 | 7/2010 | Kalaboukis et al. |
| 2010/0185518 A1* | 7/2010 | Higgins ............... G06Q 30/02 705/14.58 |
| 2010/0186066 A1 | 7/2010 | Pollard |
| 2010/0241964 A1 | 9/2010 | Belinsky et al. |
| 2010/0250676 A1 | 9/2010 | Ufford et al. |
| 2010/0299292 A1 | 11/2010 | Collazo |
| 2010/0299757 A1* | 11/2010 | Lee ..................... G06F 21/88 726/26 |
| 2010/0306099 A1 | 12/2010 | Hirson et al. |
| 2010/0306828 A1 | 12/2010 | Grob et al. |
| 2010/0319053 A1 | 12/2010 | Gharabally |
| 2010/0323730 A1 | 12/2010 | Karmarkar |
| 2011/0016534 A1* | 1/2011 | Jakobsson et al. .......... 726/28 |
| 2011/0029887 A1 | 2/2011 | Pearson et al. |
| 2011/0066615 A1 | 3/2011 | Pradhan et al. |
| 2011/0070898 A1 | 3/2011 | Sanjeev et al. |
| 2011/0072487 A1 | 3/2011 | Hadar et al. |
| 2011/0112898 A1 | 5/2011 | White |
| 2011/0131131 A1 | 6/2011 | Griffin et al. |
| 2011/0137789 A1 | 6/2011 | Kortina et al. |
| 2011/0145927 A1 | 6/2011 | Hubner et al. |
| 2011/0161085 A1 | 6/2011 | Boda et al. |
| 2011/0162034 A1 | 6/2011 | Nagaratnam et al. |
| 2011/0166922 A1 | 7/2011 | Fuerstenberg |
| 2011/0185401 A1 | 7/2011 | Bak et al. |
| 2011/0191200 A1 | 8/2011 | Bayer et al. |
| 2011/0196926 A1 | 8/2011 | Crawford |
| 2011/0218948 A1 | 9/2011 | De Souza et al. |
| 2011/0225048 A1* | 9/2011 | Nair ....................... 705/14.66 |
| 2011/0238482 A1 | 9/2011 | Carney et al. |
| 2011/0239276 A1 | 9/2011 | Garcia Garcia et al. |
| 2011/0251823 A1 | 10/2011 | Davis et al. |
| 2011/0264528 A1 | 10/2011 | Whale |
| 2011/0276486 A1 | 11/2011 | Kuba |
| 2011/0302640 A1 | 12/2011 | Liu et al. |
| 2011/0314017 A1 | 12/2011 | Yariv et al. |
| 2011/0314559 A1 | 12/2011 | Jakobsson |
| 2011/0321157 A1 | 12/2011 | Davis et al. |
| 2012/0005230 A1 | 1/2012 | Jhanji |
| 2012/0009943 A1 | 1/2012 | Greenberg |
| 2012/0030764 A1 | 2/2012 | White et al. |
| 2012/0041822 A1 | 2/2012 | Landry et al. |
| 2012/0054691 A1 | 3/2012 | Nurmi |
| 2012/0060214 A1 | 3/2012 | Nahari |
| 2012/0066065 A1 | 3/2012 | Switzer |
| 2012/0089732 A1 | 4/2012 | Clark |
| 2012/0100869 A1* | 4/2012 | Liang ..................... H04W 4/02 455/456.1 |
| 2012/0131034 A1 | 5/2012 | Kenedy et al. |
| 2012/0136936 A1 | 5/2012 | Quintuna |
| 2012/0137340 A1 | 5/2012 | Jakobsson et al. |
| 2012/0144468 A1 | 6/2012 | Pratt et al. |
| 2012/0159647 A1 | 6/2012 | Sanin et al. |
| 2012/0197754 A1 | 8/2012 | Kalin |
| 2012/0198491 A1* | 8/2012 | O'Connell ............. G06F 21/55 725/30 |
| 2012/0198532 A1* | 8/2012 | Headley ....................... 726/7 |
| 2012/0209768 A1 | 8/2012 | Nuzzi |
| 2012/0214442 A1 | 8/2012 | Crawford et al. |
| 2012/0226701 A1 | 9/2012 | Singh |
| 2012/0272156 A1 | 10/2012 | Kerger et al. |
| 2012/0284602 A1* | 11/2012 | Seed et al. ................. 715/224 |
| 2012/0284779 A1 | 11/2012 | Ingrassia, Jr. et al. |
| 2012/0323685 A1 | 12/2012 | Ullah |
| 2013/0013404 A1 | 1/2013 | Suprock et al. |
| 2013/0019289 A1* | 1/2013 | Gonser et al. .................. 726/6 |
| 2013/0024916 A1 | 1/2013 | Evans |
| 2013/0036458 A1 | 2/2013 | Liberman et al. |
| 2013/0036459 A1* | 2/2013 | Liberman et al. ................ 726/6 |
| 2013/0042327 A1 | 2/2013 | Chow |
| 2013/0054433 A1* | 2/2013 | Giard ..................... H04L 67/22 705/34 |
| 2013/0054470 A1* | 2/2013 | Campos et al. ............... 705/67 |
| 2013/0055367 A1* | 2/2013 | Kshirsagar ............. G06F 21/32 726/6 |
| 2013/0061285 A1 | 3/2013 | Donfried et al. |
| 2013/0066962 A1 | 3/2013 | Scherzinger et al. |
| 2013/0067546 A1 | 3/2013 | Thavasi et al. |
| 2013/0091262 A1 | 4/2013 | Rajakarunanayake et al. |
| 2013/0096980 A1 | 4/2013 | Basavapatna et al. |
| 2013/0097669 A1 | 4/2013 | Davis et al. |
| 2013/0097673 A1 | 4/2013 | Meehan et al. |
| 2013/0097683 A1 | 4/2013 | Davis et al. |
| 2013/0102283 A1* | 4/2013 | Lau ..................... H04W 12/06 455/411 |
| 2013/0133052 A1 | 5/2013 | Davis et al. |
| 2013/0133054 A1 | 5/2013 | Davis et al. |
| 2013/0159413 A1* | 6/2013 | Davis et al. ................. 709/204 |
| 2013/0167207 A1 | 6/2013 | Davis et al. |
| 2013/0173457 A1 | 7/2013 | Chrapko et al. |
| 2013/0191887 A1 | 7/2013 | Davis et al. |
| 2013/0198811 A1 | 8/2013 | Yu et al. |
| 2013/0227700 A1 | 8/2013 | Dhillon et al. |
| 2013/0288647 A1 | 10/2013 | Turgeman |
| 2013/0291099 A1 | 10/2013 | Donfried et al. |
| 2013/0305325 A1 | 11/2013 | Headley |
| 2013/0305336 A1 | 11/2013 | Konertz et al. |
| 2013/0332337 A1 | 12/2013 | Tran |
| 2014/0158760 A1* | 6/2014 | Seker ......................... 235/380 |

OTHER PUBLICATIONS

Xie et al.; "Privacy-Preserving Matchmaking for Mobile Social Networking Secure Against Malicious Users"; 2011 Ninth Annual International Conference on Privacy, Security and Trust; bearing a date of Jul. 11, 2011; pp. 1-8; IEEE.

Brainard, John; Juels, Ari; Rivest, Ronald L.; Szydlo, Michael; Yung, Moti; "Fourth-Factor Authentication: Somebody You Know"; ACM CCS; 2006; pp. 168-178; Alexandria, Virginia.

Diep, Francie; "Your finger swipe could become your password"; NBC News Future Tech; Oct. 2, 2012; http://www.nbcnews.com/technology/futureoftech/your-finger-swipe-could-become-your-password-6215845.

Gianchandani, Erwin; "DARPA Seeking to Develop a 'Cognitive Fingerprint'"; Computing Community Consortium Blog; Jan. 27, 2012; http://www.cccblog.org/2012/01/27/darpa-seeking-to-develop-a-cognitive-fingerprint/.

Jacobs, Tom; "Identity Protection That Really Clicks"; Pacific Standard Magazine; May 3, 2012; http://www.psmag.com/business-economics/identity-protection-that-really-clicks-42048/.

Jorgensen, Zach; Yu, Ting; "On Mouse Dynamics as a Behavioral Biometric for Authentication"; 2011; pp. 476-482; Department of Computer Science, North Carolina State University; Releigh, North Carolina.

Riva, Oriana; Qin, Chuan; Strauss, Karin; Lymberopoulos, Dimitrios; "Progressive authentication: deciding when to authenticate on mobile phones"; Microsoft Research; Aug. 8, 2012; http://research.microsoft.com/apps/pubs/default/aspx?id=168102.

PCT International Search Report; International App. No. PCT/US13/48664; Dec. 3, 2013; pp. 1-3.

Germanakos et al.; "Personalization Systems and Processes Review based on a Predetermined User Interface Categorization"; Proceed-

(56) References Cited

OTHER PUBLICATIONS ings of the III International conference on communication and reality, digital utopia in the media: From discourses to facts; May 2005; 12 pages.

Mobasher et al.; "Creatinig Adaptive Web Sites Through Usage-Based Clustering of URLs"; IEEE; 1999 (created on May 9, 2014); 7 pages.

Monrose et al.; "Keystroke dynamics as a biometric for authentication"; Future Generation Computer Systems; Mar. 3, 1999; pp. 351-359; vol. 16; © 2000 Elsevier Science B.V.

Nauman et al.; "TOKEN: Trustable Keystroke-Based Authentication for Web-Based Applications on Smartphones"; ISA 2010, CCIS 76; 2010 (created on May 9, 2014); pp. 286-297; © Springer-Verlap Berlin Heidelberg 2010.

Venkataram et al.; "An authentication scheme for ubiquitous commerce: A cognitive agents based approach"; Network Operations and Management Symposium Workshops; bearing a date of Apr. 7-11, 2008; pp. 248-256; IEEE.

U.S. Appl. No. 13/373,682, Davis et al.

Jermyn et al.; "The Design Analysis of Graphical Passwords"; $8^{th}$ USENIX Security Symposium; bearing a date of Mar. 8, 1999; 20 pages.

Melton, R.G.; "Details of the GPS position calculation"; located at: https://www.courses.psu.edu/aersp/aersp055_r81/satellites/pgs_details.html; accessed on Jul. 11, 2016; pp. 1-2.

European Patent Office; Communication pursuant to Article 94(3) EPC; European App. No. EP 13 809 279.6; Dec. 12, 2016; pp. 1-7 (received by our agent on Dec. 12, 2016).

\* cited by examiner

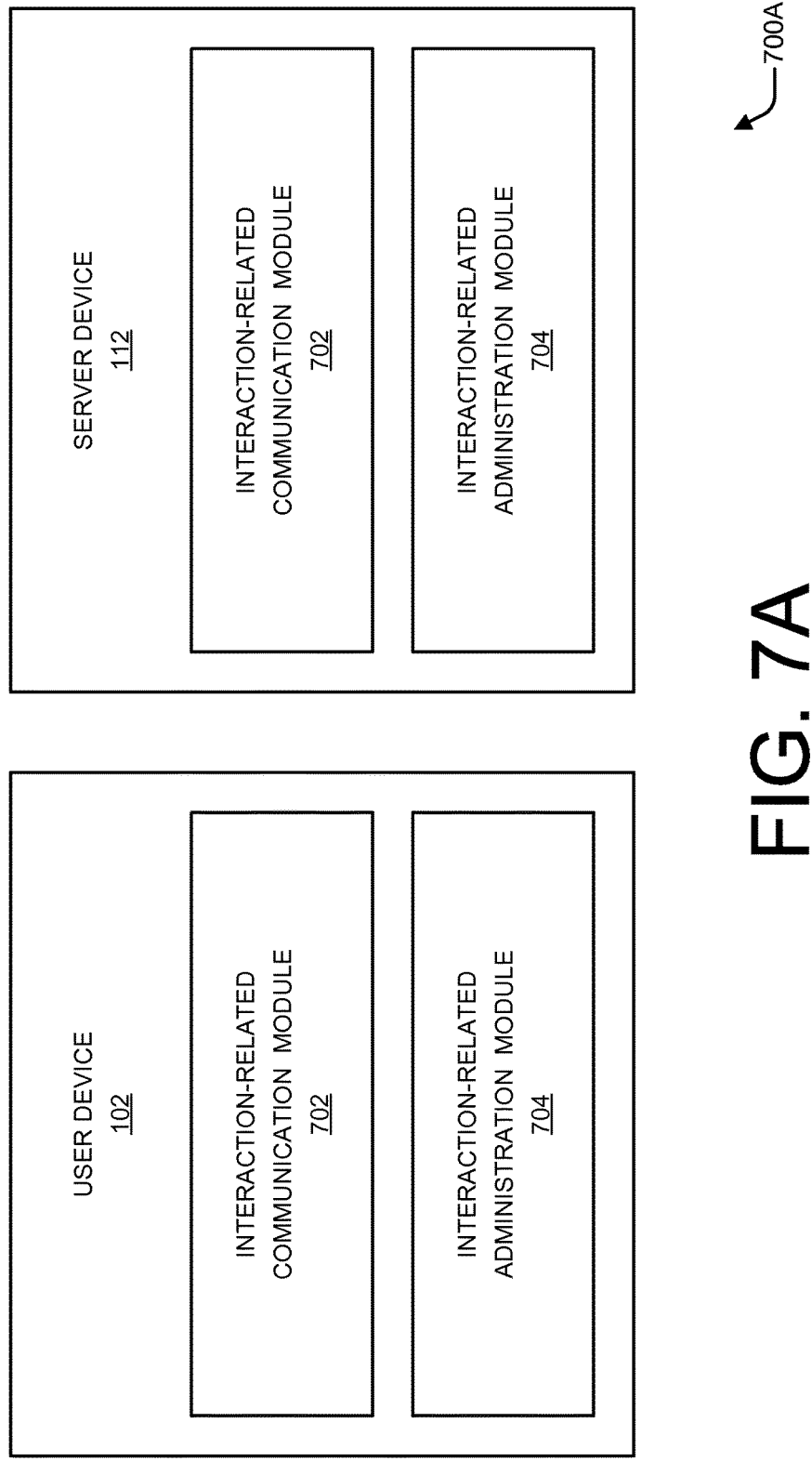

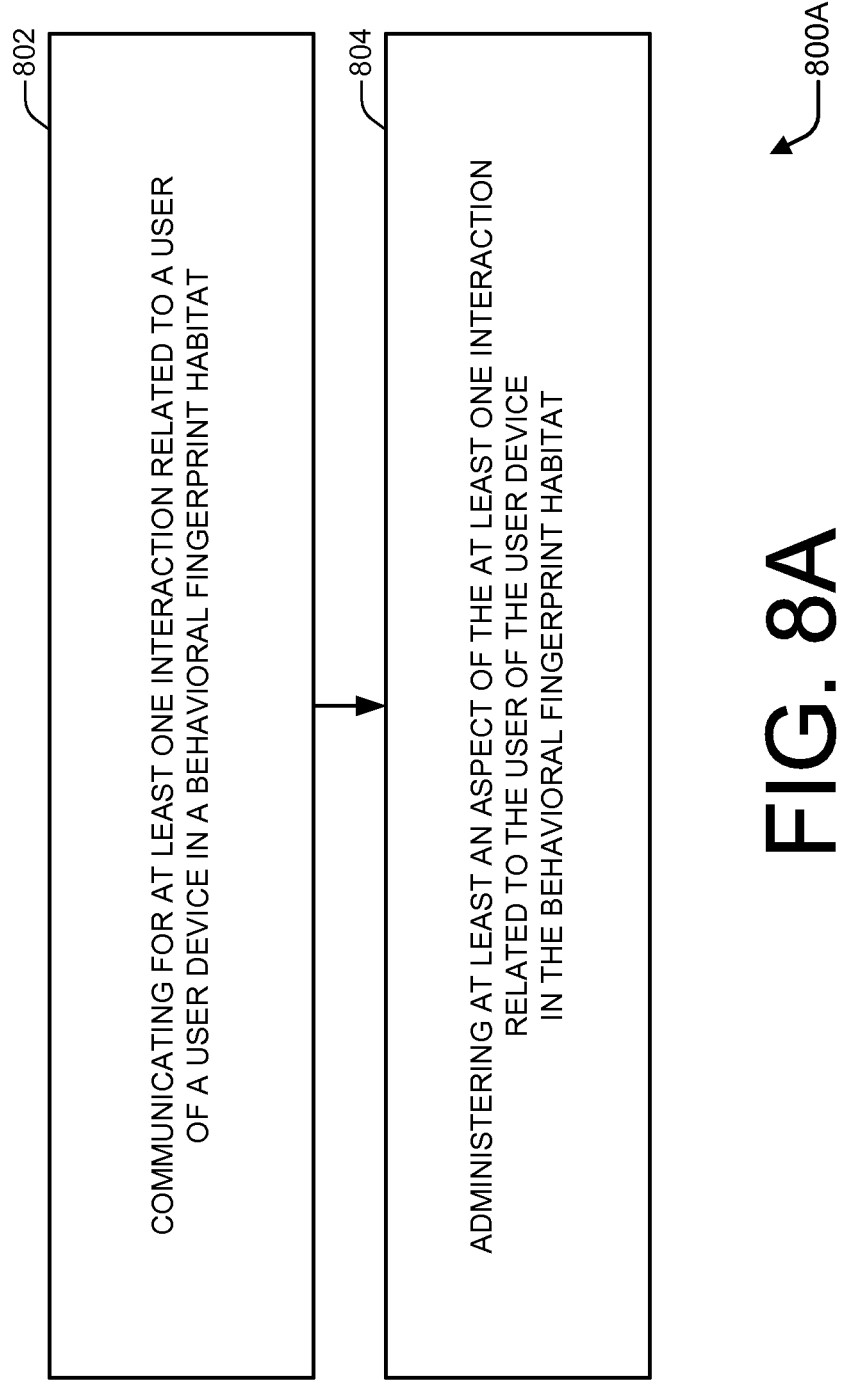

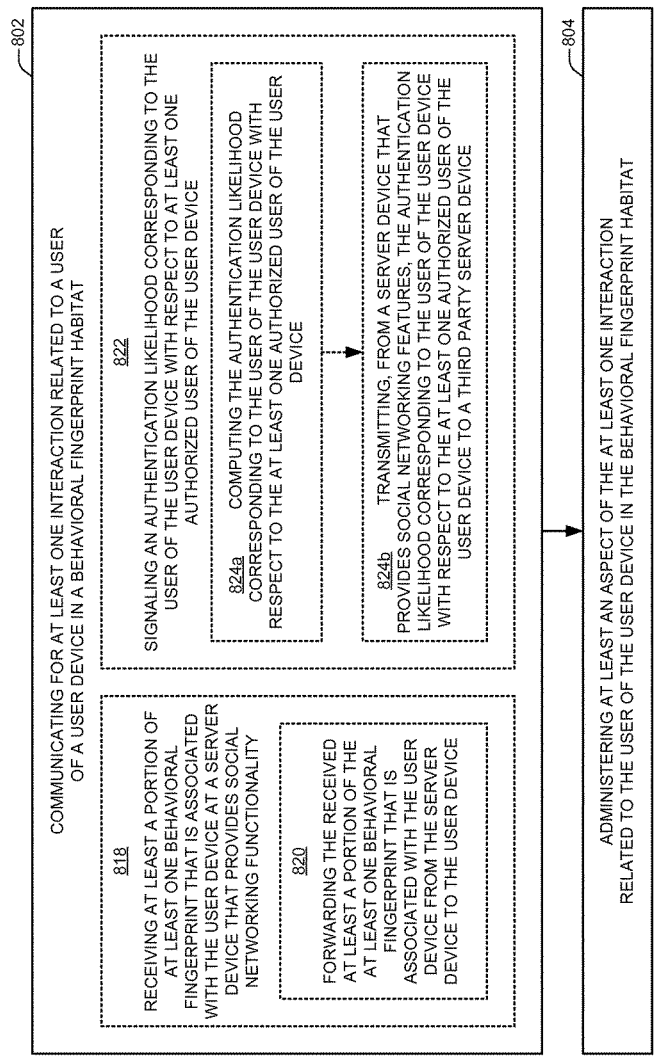

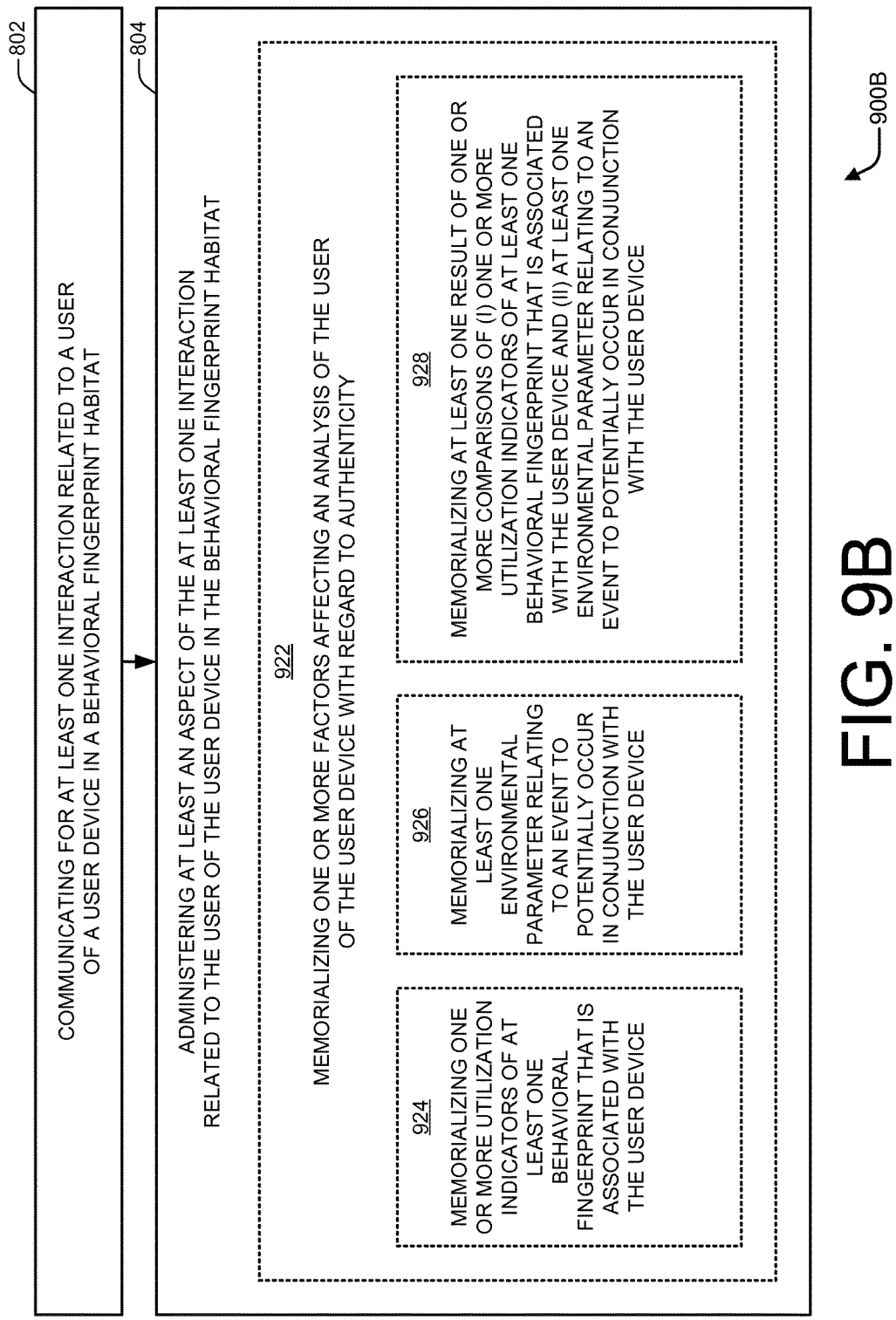

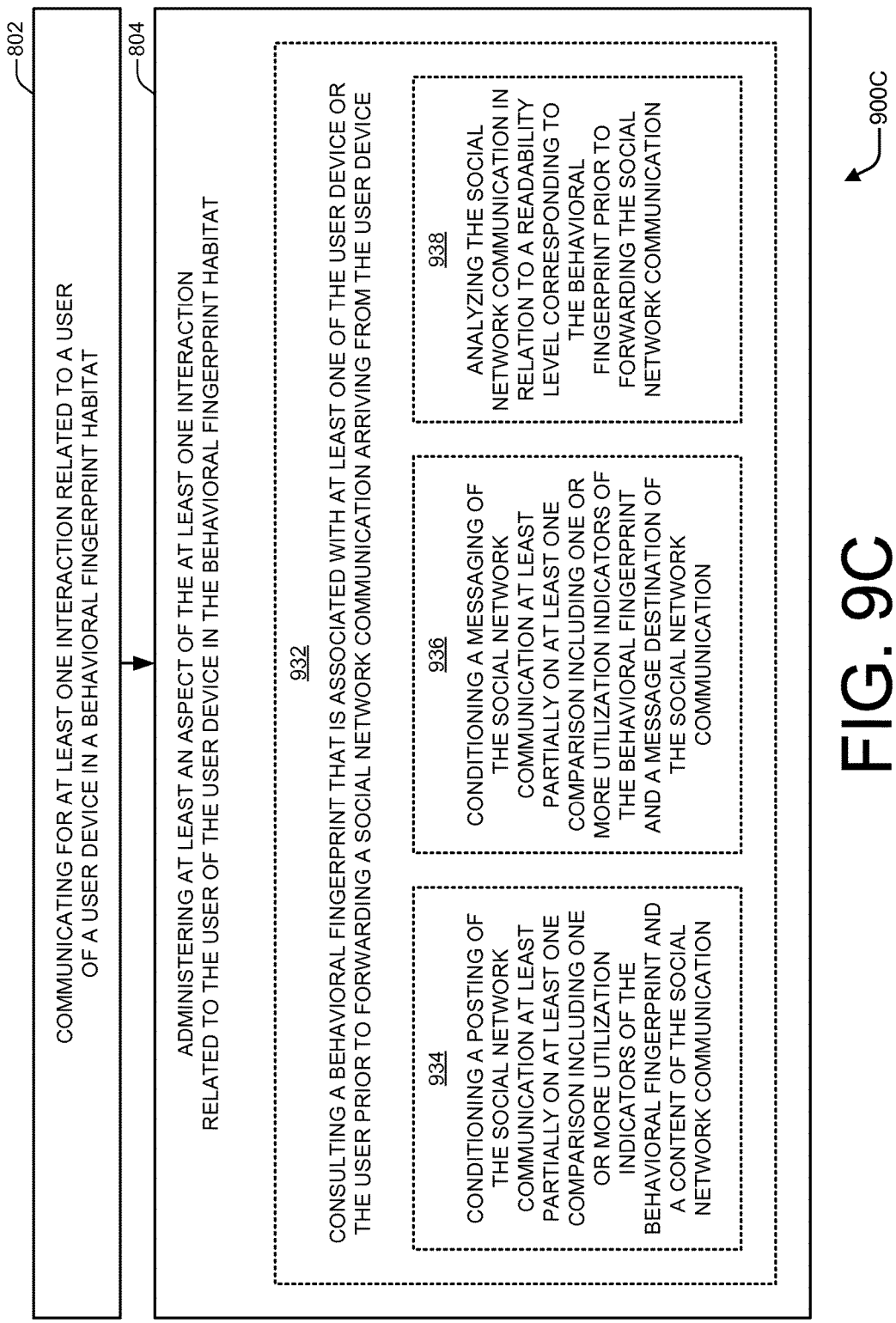

BEHAVIORAL FINGERPRINTING WITH SOCIAL NETWORKING

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application claims benefit of priority of U.S. Provisional Patent Application No. 61/632,836, entitled "Behavioral Fingerprint Based Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 24 Sep. 2011, which was filed within the twelve months preceding the filing date of the present application or is an application of which a currently application is entitled to the benefit of the filing date.

(2) For purposes of the USPTO extra-statutory requirements, the present application claims benefit of priority of U.S. Provisional Patent Application No. 61/572,309, entitled "Network Acquired Behavioral Fingerprint for Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 13 Oct. 2011, which was filed within the twelve months preceding the filing date of the present application or is an application of which a currently application is entitled to the benefit of the filing date.

(3) For purposes of the USPTO extra-statutory requirements, the present application constitutes a continuation-in-part of U.S. patent application Ser. No. 13/373,685, entitled "Behavioral Fingerprint Device Identification", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 13/373,684, entitled "Behavioral Fingerprint Controlled Automatic Task Determination", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(5) For purposes of the USPTO extra-statutory requirements, the present application constitutes a continuation-in-part of United States Patent application Ser. No. 13/373,680, entitled "Behavioral Fingerprint Controlled Theft Detection and Recovery", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(6) For purposes of the USPTO extra-statutory requirements, the present application constitutes a continuation-in-part of U.S. patent application Ser. No. 13/373,677, entitled "Trust Verification Schema Based Transaction Authorization", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(7) For purposes of the USPTO extra-statutory requirements, the present application constitutes a continuation-in-part of U.S. patent application Ser. No. 13/373,682, entitled "Social Network Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(8) For purposes of the USPTO extra-statutory requirements, the present application constitutes a continuation-in-part of U.S. patent application Ser. No. 13/475,564, entitled "Behavioral Fingerprint Based Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 18 May 2012, which is currently co-pending or is an application of which a currently co-pending application is entitled to the benefit of the filing date.

(9) For purposes of the USPTO extra-statutory requirements, the present application constitutes a continuation-in-part of U.S. patent application Ser. No. 13/538,385, entitled "Network Acquired Behavioral Fingerprint for Authentication", naming Marc E. Davis, Matthew G. Dyor, Daniel A. Gerrity, Xuedong (XD) Huang, Roderick A. Hyde, Royce A. Levien, Richard T.

Lord, Robert W. Lord, Mark A. Malamud, Nathan Myhrvold, and Clarence T. Tegreene as inventors, filed 29 Jun. 2012, which is currently co-pending or is an application of which a currently co-pending application is entitled to the benefit of the filing date.

(10) For purposes of the USPTO extra-statutory requirements, the present application constitutes a continuation-in-part of U.S. patent application Ser. No. 13/552,502, entitled "Relationship Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 18 Jul. 2012, which is currently co-pending or is an application of which a currently co-pending application is entitled to the benefit of the filing date.

(11) For purposes of the USPTO extra-statutory requirements, the present application constitutes a continuation-in-part of U.S. patent application Ser. No. 13/563,599, entitled "Multi-Device Behavioral Fingerprinting", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Jul. 2012, which is currently co-pending or is an application of which a currently co-pending application is entitled to the benefit of the filing date.

(12) For purposes of the USPTO extra-statutory requirements, the present application constitutes a continuation-in-part of U.S. patent application Ser. No. 13/602,061, entitled "Behavioral Fingerprinting Via Social Networking Interaction", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Aug. 2012, which is currently co-pending or is an application of which a currently co-pending application is entitled to the benefit of the filing date.

(13) For purposes of the USPTO extra-statutory requirements, the present application constitutes a continuation-in-part of U.S. patent application Ser. No. 13/631,667, entitled "Behavioral Fingerprinting Via Derived Personal Relation", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 28 Sep. 2012, which is currently co-pending or is an application of which a currently co-pending application is entitled to the benefit of the filing date.

(14) For purposes of the USPTO extra-statutory requirements, the present application constitutes a continuation-in-part of U.S. patent application Ser. No. 13/665,830, entitled "Behavioral Fingerprinting Via Inferred Personal Relation", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Oct. 2012, which is currently co-pending or is an application of which a currently co-pending application is entitled to the benefit of the filing date.

(15) For purposes of the USPTO extra-statutory requirements, the present application constitutes a continuation-in-part of U.S. patent application Ser. No. 13/665,841, entitled "Behavioral Fingerprinting Via Corroborative User Device", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Oct. 2012, which is currently co-pending or is an application of which a currently co-pending application is entitled to the benefit of the filing date.

(16) For purposes of the USPTO extra-statutory requirements, the present application constitutes a continuation-in-part of U.S. patent application Ser. No. 13/673,506, entitled "Behavioral Fingerprinting Via Social Network Verification", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 9 Nov. 2012, which is currently co-pending or is an application of which a currently co-pending application is entitled to the benefit of the filing date.

(17) For purposes of the USPTO extra-statutory requirements, the present application constitutes a continuation-in-part of U.S. patent application Ser. No. 13/678,380, entitled "Behavioral Fingerprinting with Adaptive Development", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 15 Nov. 2012, which is currently co-pending or is an application of which a currently co-pending application is entitled to the benefit of the filing date.

(18) For purposes of the USPTO extra-statutory requirements, the present application constitutes a continuation-in-part of U.S. patent application Ser. No. 13/686,739, entitled "Environmentally-Responsive Behavioral Fingerprinting", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 27 Nov. 2012, which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIG. 7A is a schematic diagram that includes at least one example device that is capable of handling scenarios for behavioral fingerprinting with social networking in accordance with certain example embodiments.

FIG. 8A is a flow diagram illustrating an example method for at least one device with regard to behavioral fingerprinting with social networking in accordance with certain example embodiments.

FIGS. 8B-8D depict example additions or alternatives for a flow diagram of FIG. 8A in accordance with certain example embodiments.

FIGS. 9A-9D depict example additions or alternatives for a flow diagram of FIG. 8A in accordance with certain example embodiments.

DETAILED DESCRIPTION

Figure 1:
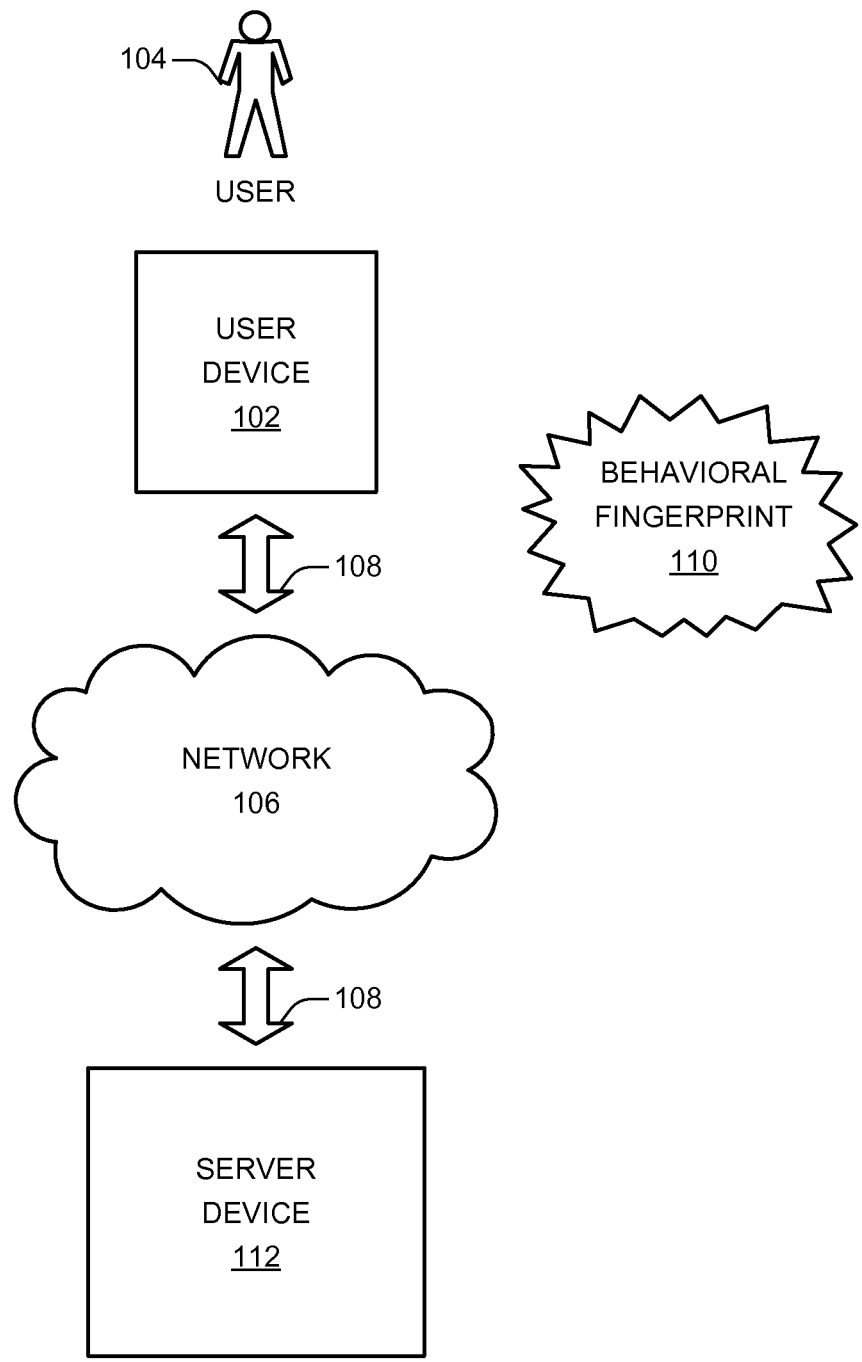
FIG. 1 is a schematic diagram of a user device, a server device, and at least one behavioral fingerprint, any of which may be involved individually or jointly in example authentication scenarios in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of a user device, a server device, and at least one behavioral fingerprint, any of which may be involved individually or jointly in example authentication scenarios in accordance with certain example embodiments. As shown in FIG. 1, by way of example but not limitation, schematic diagram 100 may include at least one user device 102, at least one user 104, at least one network 106, at least one channel 108, at least one behavioral fingerprint 110, or at least one server device 112. More specifically, at least one channel 108 may extend from or lead to a device 102 or 112 to facilitate communication therewith.

For certain example embodiments, a user 104 may correspond to or be utilizing at least one user device 102. A user 104 may utilize a user device 102 in accordance with a usage that may be at least partially represented by, modeled by, incorporated into, stored at, tracked by, summarized in, or a combination thereof, etc. at least one behavioral fingerprint 110. A user device 102 may include or comprise, by way of example but not limitation, a mobile phone, a smart phone, a mobile terminal, a laptop or notebook computer, a personal digital assistant (PDA), a netbook, an entertainment appliance (e.g., a television, a gaming console, a set-top box, a music player, or a combination thereof, etc.), a portable gaming device, a user equipment, a tablet or slate computer, a desktop computer, a personal navigation device (PND), a vehicle with user-accessible computational capabilities, videoconferencing equipment, some combination thereof, or so forth. A user 104 may include or comprise, by way of example only, at least one person, a couple, siblings, a family, a partnership, an organizational group, a company, a robotic user (e.g., a computational entity), an electronic agent, a portion thereof, some combination thereof, or so forth. However, claimed subject matter is not limited to any particular described embodiments, implementations, examples, etc.

For certain example embodiments, a network 106 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof, or so forth. A node may include, by way of example but not limitation, a server; a router; an end user device, such as a mobile phone, a tablet computer, a desktop computer, an entertainment appliance, a vehicle, or a combination thereof, etc.; a switch; a base station; a gateway; some combination thereof; or so forth. However, claimed subject matter is not limited to any particular described embodiments, implementations, examples, etc.

For certain example embodiments, a channel 108 may include, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a PSTN, at least part of a cable network, at least part of a cellular network connection, at least part of an Internet connection, at least part of a Wi-Fi connection, at least part of a WiMax connection, at least part of an internet backbone, at least part of a satellite network, at least part of a fiber optic network, multiple instances of any of the above, one or more network nodes, some combination of the above, or so forth. A channel 108 may include one or more nodes (e.g., a telecommunication node, an access point, a base station, an internet server, a gateway, an internet or telecommunications switch, or a combination thereof, etc.) through which signals are propagated. A communication may include, by way of example but not limitation, a transmission of data, a reception of data, an exchange of data, a flow of data (e.g., between or among two or more intermediate nodes or endpoints), some combination thereof, or so forth. A user device 102 may communicate with a server device 112, or vice versa, via one or more signals (not explicitly shown) using one or more channels 108. A couple of examples of channels 108 are illustrated in schematic diagram 100 (as well as in additional figures, such as schematic diagram 200A of FIG. 2A). Signals may propagate via one or more channels 108. Signals, by way of example but not limitation, may include, electrical signals, magnetic signals, electromagnetic signals, photonic signals, wireless signals, wired signals, multiples ones thereof, some combination thereof, or so forth. However, claimed subject matter is not limited to any particular described embodiments, implementations, examples, etc.

For certain example embodiments, a server device 112 may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof, or so forth. However, claimed subject matter is not limited to any particular described embodiments, implementations, examples, etc.

For certain example embodiments, at least one behavioral fingerprint 110 may include, by way of example but not limitation, one or more indicators representing one or more behaviors of at least one user with respect to at least one user device. Examples of one or more indicators representing one or more behaviors of at least one user with respect to at least one user device may include, but are not limited to, one or more indicators representing one or more habits of at least one user with respect to at least one user device, one or more indicators representing usage of at least one user device by at least one user, one or more indicators representing one or more actions of at least one user with respect to at least one user device, some combination thereof, or so forth. Additionally or alternatively, at least one behavioral fingerprint 110 may include, by way of example but not limitation, one or more indicators representing one or more predicted acts (e.g., behaviors, such as habits, usages, actions, or a combination thereof, etc.) of at least one user with respect to at least one device. Additionally or alternatively, at least one behavioral fingerprint 110 may include, by way of example but not limitation, at least one status of a user that is utilizing or that corresponds to a user device. For certain example implementations, a user whose behavior is being monitored to at least partially establish at least a portion of at least one behavioral fingerprint 110 may comprise an authorized user, which is described herein below. However, claimed subject matter is not limited to any particular described embodiments, implementations, examples, etc.

For certain example embodiments, a user may be utilizing a user device, by way of example but not limitation, if the user is accessing the user device, if the user is interacting with the user device, if the user is carrying the user device, if the user is providing input to the user device, if the user is receiving output from the user device, if the user is directing operation of the user device, some combination thereof, or so forth. A user may correspond to a user device, by way of example but not limitation, if the user is an authorized user of the user device. However, claimed subject matter is not limited to any particular described embodiments, implementations, examples, etc.

For certain example embodiments, a user 104 of a user device 102 may comprise an authorized user of the user device 102: if the user 104 comprises, by way of example but not limitation, a true owner, a manager, an information technology (IT) specialist, a controller, a purchaser, a lessee, an approved borrower, a primary user, or a combination thereof, etc. of the user device 102; if the user 104 is or has been authorized by a true owner, a manager, an IT specialist, a controller, a purchaser, a lessee, an approved borrower, a primary user, or a combination thereof, etc. of the user device 102; some combination thereof; or so forth. In certain example implementations, a determination that a user 104 comprises (e.g., is, is becoming, is being designated, or a combination thereof, etc.) an authorized user of a user device 102: may be effectuated if or when a user first registers a profile, an account, or a combination thereof, etc. on a device (e.g., after a purchase or a 'hard' reset); may be effectuated if or when one or more 'sign-ins' (e.g., entry of a password, code, PIN, pattern, biometric input, or a combination thereof, etc.) are performed by a user; may be effectuated if or when one or more user ID/secret information combinations (e.g., entry of an account name, email address, individualized identification, or a combination thereof, etc. along with a corresponding password, code, PIN, pattern, biometric input, or a combination thereof, etc.) are entered by a user; may be effectuated if or when a given user is identified as, designated as, or otherwise indicated to comprise an authorized user by one who is already an authorized user; some combination of such authorized user determinations; or so forth. An authorized user may add a new authorized user, by way of example only: by providing a name or other identification of another user or his or her biometric information (e.g., a facial photo, a voice sample, a fingerprint image, a retinal scan, or a combination thereof, etc.); by providing a name or other identification of a user or temporary or permanent secret information, such as a password, a code, a PIN, a pattern, biometric input, or a combination thereof, etc. (e.g., that a newly authorized user may be capable of changing or confirming); some combination thereof; or so forth. An authorized user, such as a true owner or IT specialist, may be empowered to remove someone from a list of authorized user(s). In certain example embodiments, different authorized users may have different levels of authorization (e.g., different levels of access, capabilities, rights, privileges, or a combination thereof, etc.) with respect to a given user device 102. For certain example implementations, but by way of example only, one authorized user may comprise an administrator with full access rights or privileges, yet another authorized user may comprise a regular, non-administrative, or junior user with fewer access rights or privileges. Additionally or alternatively, one authorized user may have full access rights to applications and content stored on a device or associated with a particular account/profile, yet another authorized user may have restricted access rights to applications or content stored on a device such that access is prevented, for instance, to particular device settings or adult content. Other approaches to providing different levels of authorization may also or instead be implemented. By way of example only, an authorized user who is a true owner may add a new authorized user that is permitted to utilize existing applications and content but is prohibited from adding new applications or making particular purchases (e.g., individual purchases above a predetermined dollar amount or multiple purchases beyond a total dollar amount).

Figure 2A:
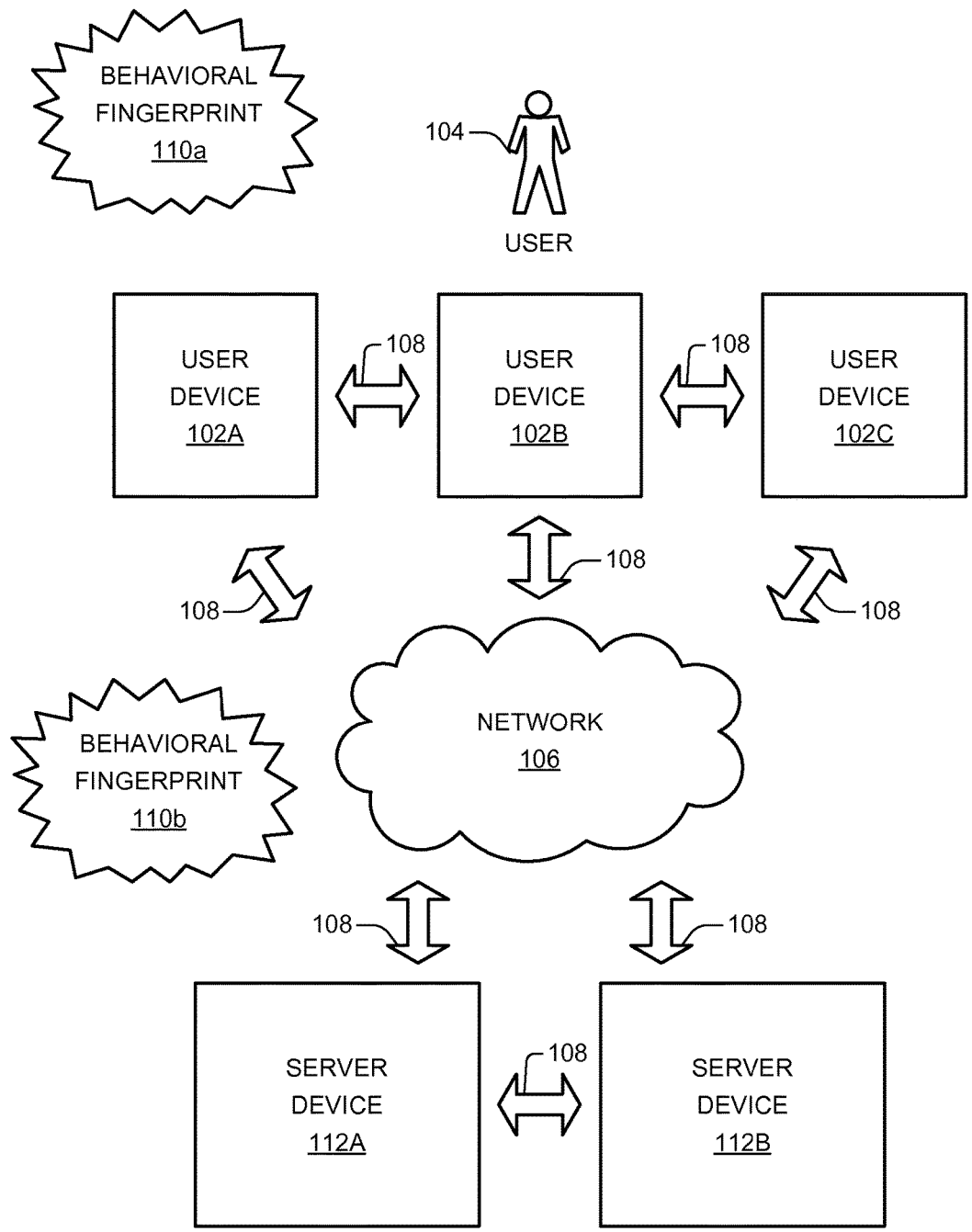
FIG. 2A is a schematic diagram of multiple user devices, multiple server devices, and at least one behavioral fingerprint, any of which may be involved individually or jointly in example authentication scenarios in accordance with certain example embodiments.

FIG. 2A is a schematic diagram 200A of multiple user devices, multiple server devices, and at least one behavioral fingerprint, any of which may be involved individually or jointly in example authentication scenarios in accordance with certain example embodiments. As shown in FIG. 2A, by way of example but not limitation, schematic diagram 200A may include at least one user device 102, at least one user 104, at least one network 106, at least one channel 108, at least one behavioral fingerprint 110, or at least one server device 112. More specifically, schematic diagram 200A may include, by way of example only, three user devices 102 (e.g., a user device 102A, a user device 102B, or a user device 102C, etc.), two server devices 112 (e.g., a server device 112A, or a server device 112B, etc.), or two behavioral fingerprints 110 (e.g., a behavioral fingerprint 110a, or a behavioral fingerprint 110b, etc.).

For certain example embodiments, a user 104 may correspond to or be utilizing multiple user devices 102, such as at least two of user device 102A, user device 102B, or user device 102C, at least partially simultaneously or from time to time. By way of example only, a user 104 may own at least two of: a mobile phone, a tablet computer, a vehicle with an intelligent computing apparatus, a laptop computer, or a desktop computer. For certain example implementations, at least part of a combined behavioral fingerprint 110 (e.g., a behavioral fingerprint 110a/110b) may be associated with a user 104 and each corresponding user device 102. Additionally or alternatively, an individualized behavioral fingerprint 110 (e.g., a behavioral fingerprint 110a or a behavioral fingerprint 110b) may be associated with a user 104 and each corresponding individual or respective user device 102. However, claimed subject matter is not limited to any particular described embodiments, implementations, examples, etc.

For certain example embodiments, a behavioral fingerprint 110, 110a, or 110b; an at least partially combined instantiation of at least two of a behavioral fingerprint 110, 110a, or 110b; a portion of a behavioral fingerprint 110, 110a, or 110b; or a combination thereof; etc. may be distributed across or stored at, by way of example only, one or more of: a user device 102A, a user device 102B, a user device 102C, a network 106 or node thereof, a server device 112A, a server device 112B, some combination thereof, or so forth. Additionally or alternatively, a behavioral fingerprint 110, 110a, or 110b; an at least partially combined instantiation of at least two of a behavioral fingerprint 110, 110a, or 110b; a portion of a behavioral fingerprint 110, 110a, or 110b; or a combination thereof; etc. may be transmitted, received, exchanged, or a combination thereof, etc., by way of example only, via one or more of: at least one network 106, one or more channels 108, some combination thereof, or so forth. A user device 102 or a server device 112 may transmit, receive, exchange, or a combination thereof, etc. at least a portion of a behavioral fingerprint 110, 110a, or 110b directly between or among devices 102 or 112 or indirectly via at least one node (not explicitly shown) of one or more networks 106. However, claimed subject matter is not limited to any particular described embodiments, implementations, examples, etc.

Figure 2B:
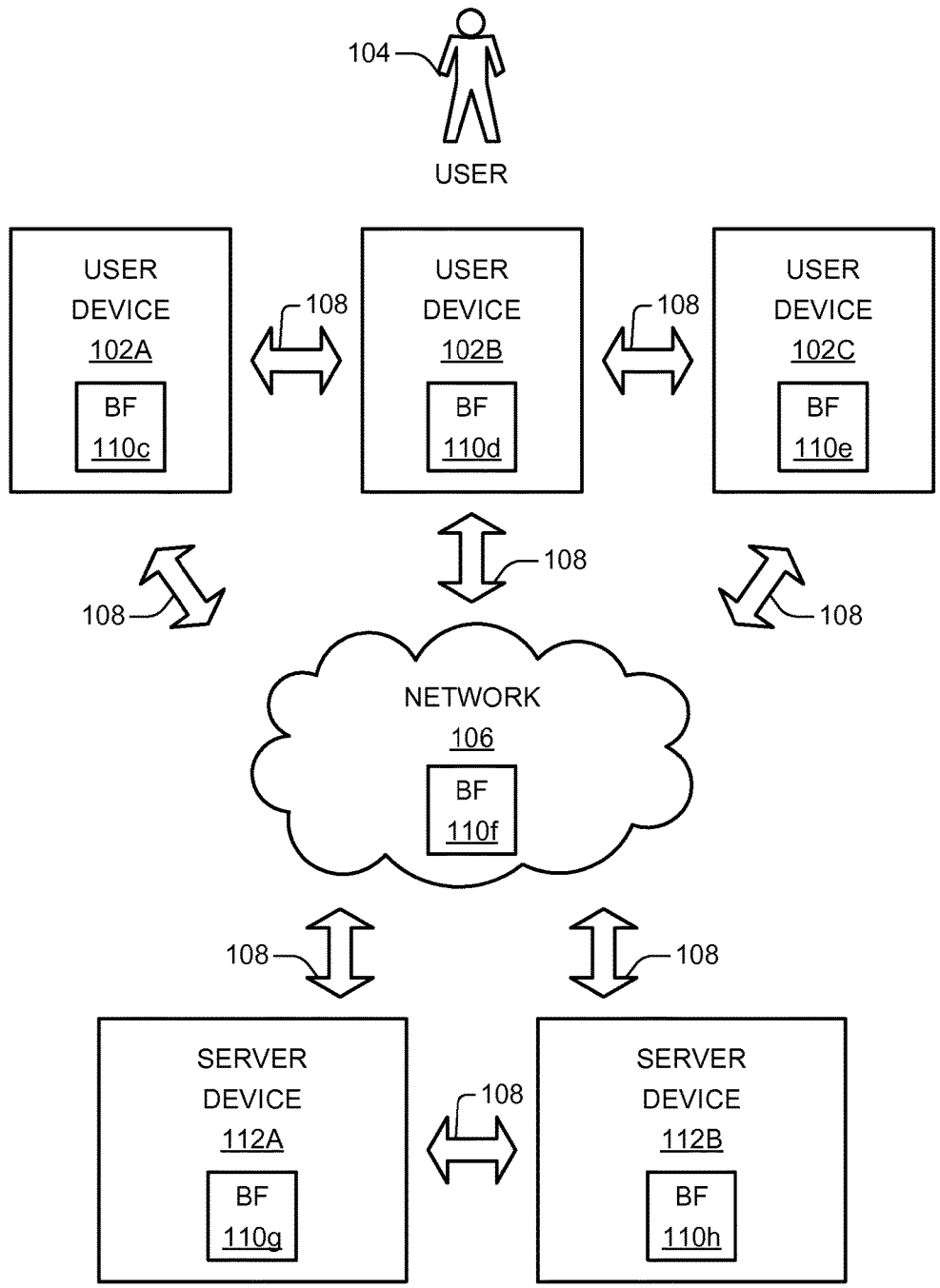
FIG. 2B is a schematic diagram of multiple user devices, multiple server devices, and multiple example locations for at least a portion of at least one behavioral fingerprint in accordance with certain example embodiments.

FIG. 2B is a schematic diagram 200B of multiple user devices, multiple server devices, and multiple example locations for at least a portion of at least one behavioral fingerprint in accordance with certain example embodiments. As shown in FIG. 2B, by way of example but not limitation, schematic diagram 200B may include at least one user device 102, at least one user 104, at least one network 106, at least one channel 108, at least one behavioral fingerprint 110, or at least one server device 112. More specifically, schematic diagram 200B may include, by way of example only, three user devices 102 (e.g., a user device 102A, a user device 102B, or a user device 102C, etc.), two server devices 112 (e.g., a server device 112A, or a server device 112B, etc.), or six behavioral fingerprints 110 (e.g., a behavioral fingerprint 110c, a behavioral fingerprint 110d, a behavioral fingerprint 110e, a behavioral fingerprint 110f, a behavioral fingerprint 110g, or a behavioral fingerprint 110h, etc.).

For certain example embodiments, a given behavioral fingerprint 110 or portion thereof may be located at (stored at, distributed at least partially across, accessible from, associated with, or a combination thereof, etc.) one or more devices 102 or 112. By way of example only, a behavioral fingerprint 110c may be located at a user device 102A, a behavioral fingerprint 110d may be located at a user device 102B, a behavioral fingerprint 110e may be located at a user device 102C, a behavioral fingerprint 110f may be located at a network 106 (e.g., at a cloud service or system), a behavioral fingerprint 110g may be located at a server device 112A, or a behavioral fingerprint 110h may be located at a server device 112B. For certain example implementations, any one or more of behavioral fingerprints 110c-110h may include one or more separate or individualized behavioral fingerprints 110; may include one or more combined, amalgamated, distributed, or a combination thereof, etc. behavioral fingerprints 110; may include at least a portion of at least one behavioral fingerprint 110; some combination thereof; or so forth. However, claimed subject matter is not limited to any particular described embodiments, implementations, examples, etc.

For certain example embodiments, at least one behavioral fingerprint 110 (e.g., of behavioral fingerprints 110c-110h) may be associated with at least one user 104 or one or more of user devices 102A, 102B, or 102C. For certain example implementations, a behavioral fingerprint 110c, which may be stored at a user device 102A, may be associated with a user 104 and user device 102A. For certain example implementations, a behavioral fingerprint 110g, which may be stored at a server device 112A, may be associated with a user 104 and a user device 102A. For certain example implementations, a behavioral fingerprint 110h, which may be stored at a server device 112B, may be associated with a user 104, a user device 102B, and a user device 102C. For certain example implementations, a behavioral fingerprint 110c, which may be stored at a user device 102A and associated therewith, and a behavioral fingerprint 110d, which may be stored at a user device 102B and associated therewith, may be individually or jointly associated with a user 104. A behavioral fingerprint 110c and a behavioral fingerprint 110d may be identical to each other, partially the same, different from one another, updated to keep one at least partially coherent or consistent with the other, some combination thereof, or so forth. For certain example implementations, a behavioral fingerprint 110d, which may be stored at a user device 102B and associated therewith, and a behavioral fingerprint 110g, which may be stored at a server device 112A and associated with a user device 102C, may be individually or jointly associated with a user 104. A behavioral fingerprint 110d and a behavioral fingerprint 110g may be identical to each other, partially the same, different from one another, updated to keep one at least partially coherent or consistent with the other, some combination thereof, or so forth. For certain example implementations, a behavioral fingerprint 110e, which may be stored at a user device 102C and associated therewith, and a behavioral fingerprint 110h, which may be stored at a server device 112b and also associated with user device 102C, may be individually or jointly associated with a user 104. A behavioral fingerprint 110e and a behavioral fingerprint 110h may be identical to each other, partially the same, different from one another, updated to keep one at least partially coherent or consistent with the other, some combination thereof, or so forth. For certain example implementations, a behavioral fingerprint 110e, which may be stored at a user device 102C, may be associated with a user 104 and a user device 102b. Although each user device 102 and server device 112 (and network 106) is shown in schematic diagram 200B as having a behavioral fingerprint 110 located there at, one or more user devices 102 or server devices 112 (or networks 106) may alternatively not have a behavioral fingerprint 110 located there at. Furthermore, other additional or alternative approaches may instead be implemented.

For certain example embodiments, a behavioral fingerprint 110 (including but not limited to any one or more of behavioral fingerprints 110a-110h) may include a whole behavioral fingerprint, a portion of a behavioral fingerprint, a behavioral fingerprint associated with a single user device, a behavioral fingerprint associated with multiple user devices, a part of a distributed behavioral fingerprint, a whole behavioral fingerprint that is distributed across multiple devices, a portion or a whole behavioral fingerprint that is located at one device, one or more indicators of one or more behavior-related acts, some combination thereof, or so forth. Examples of behavioral fingerprint(s) 110 are described further herein below with particular reference to FIG. 3. However, claimed subject matter is not limited to any particular described embodiments, implementations, examples, etc.

Figure 3:
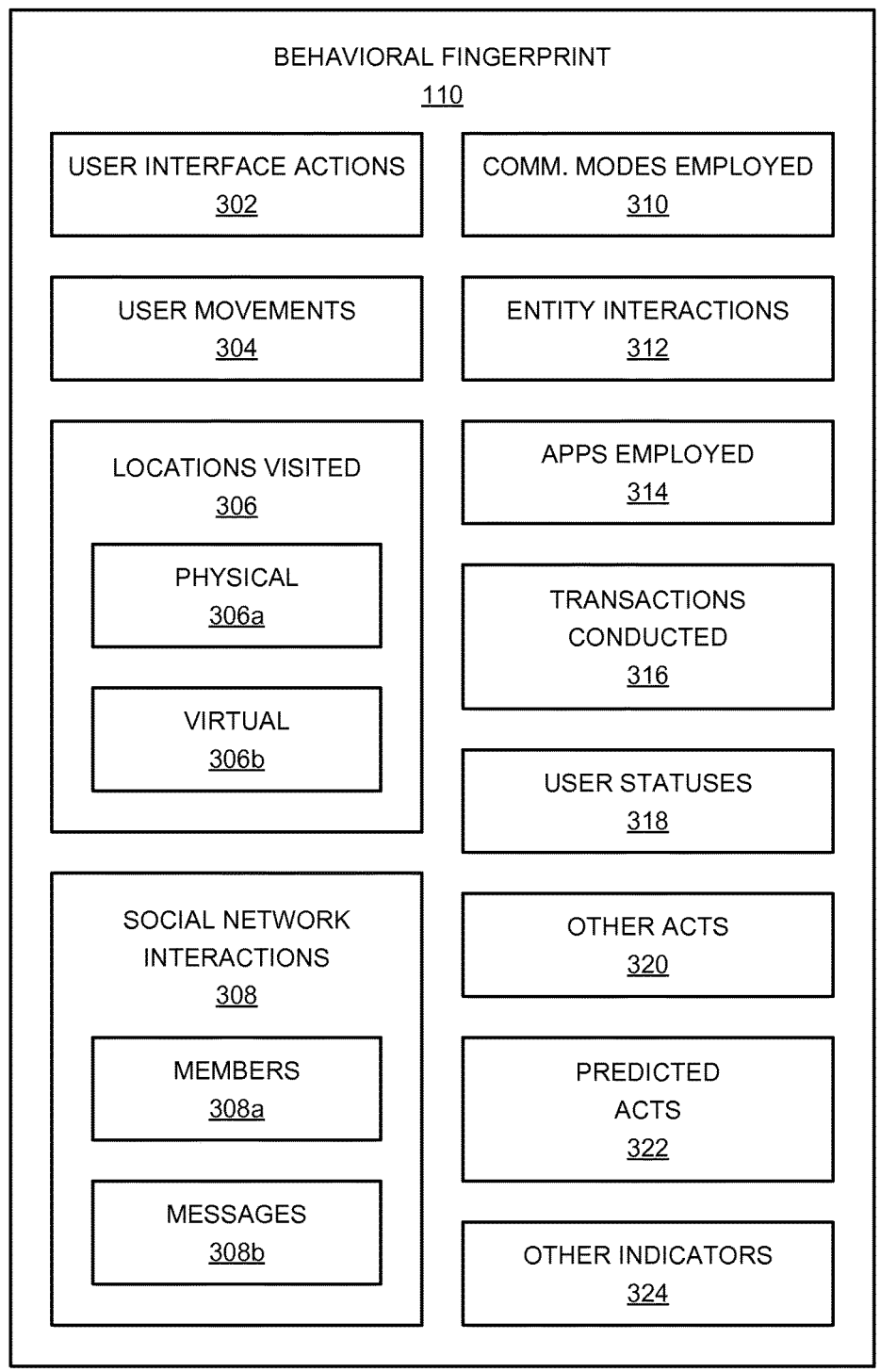
FIG. 3 is a schematic diagram illustrating an example behavioral fingerprint including one or more example indicators of one or more behavior-related acts in accordance with certain example embodiments.

FIG. 3 is a schematic diagram 300 illustrating an example behavioral fingerprint including one or more example indicators of one or more behavior-related acts in accordance with certain example embodiments. As shown in FIG. 3, by way of example but not limitation, schematic diagram 300 may depict a behavioral fingerprint 110, which behavioral fingerprint 110 may include any one or more indicators of various acts 302-322 or other indicators 324. Example indicators 302-324 that are illustrated may include, but are not limited to, user interface actions 302, user movements 304, locations visited 306, social network interactions 308, communication modes employed 310, entity interactions 312, apps employed 314, transactions conducted 316, user statuses 318, other acts 320, predicted acts 322, other indicators 324, some combination thereof, or so forth. More specifically, locations visited 306 may include physical locations visited 306a, virtual locations visited 306b, or a combination thereof, etc., or social network interactions 308 may include social network members 308a, social network messages 308b, or a combination thereof, etc. Additional or alternative implementations to those of schematic diagram 300 for a behavioral fingerprint 110 are described further herein below as well as above. Moreover, a behavioral fingerprint 110 may alternatively include more, fewer, or different indicator(s) from those that are illustrated without departing from claimed subject matter.

For certain example embodiments, one or more user interface actions 302 may include, but are not limited to, a type of user interaction (e.g., buttons, keys, physical keyboard, touch screen, swipes, virtual buttons, virtual keyboard, multi-finger touch, speech, textual, movement sensing input such as a shake or a twist, or a combination thereof, etc.), a speed of user interaction (e.g., speech rate, speech cadence, typing speed, swiping speed, scrolling speed, speed moving between or among windows or apps, duration of a swipe or press of a virtual or physical key or button, or a combination thereof, etc.), a user input apparatus (e.g., a built-in microphone, a wireless microphone, a built-in keyboard, a virtual keyboard, a detachable/attachable keyboard, a wireless keyboard, an input apparatus identifiable such as by name or number, or a combination thereof, etc.), a position of user interaction (e.g., a location of touch for a touch-sensitive screen having a keyboard or button or swipe area, a location of a swipe, a length of a swipe, an offset from a designated key or slide area, or a combination thereof, etc.), a user output apparatus (e.g., a screen, a built-in speaker, a separate speaker, a vibration unit, an integrated output apparatus, a wired output apparatus, a wireless output apparatus, an output apparatus identifiable such as by name or number, or a combination thereof, etc.), some combination thereof, or so forth. However, claimed subject matter is not limited to any particular described embodiments, implementations, examples, etc.

For certain example embodiments, one or more user movements 304 may include, but are not limited to, device orientation (e.g., cardinal direction a device is pointed at, angle a device is held at, or a combination thereof, etc.), device shakes or deformations (e.g., how a device is moved to provide input, how a device is pressed or twisted or curved to provide input, or a combination thereof, etc.), a pattern of vibrations or jostling applied to or experienced by a device during daily use (e.g., as a result of carrying it, commuting with it, placing it in a pack or purse, placing it in a pocket, or a combination thereof, etc.), some combination thereof, or so forth. However, claimed subject matter is not limited to any particular described embodiments, implementations, examples, etc.

For certain example embodiments, one or more locations visited 306 may include, but are not limited to, locations that a user carries, sends, places, or travels with a device;

locations that a user directs software to acquire data from or send data to; some combination thereof; or so forth. For certain example implementations, physical locations visited 306a may include, but are not limited to, an address, a room, a store, a building, a neighborhood, a city, a state, a country, one or more satellite positioning system (SPS) coordinates, a check-in location, a business, one or more geographical (e.g., cardinal) coordinates, a geographical zone (e.g., coordinates or approximate position in conjunction with a distance or range), some combination thereof, or so forth. For certain example implementations, virtual locations visited 306b may include, but are not limited to, an internet address, a web page, a web site, a social network, a destination within a social network, a virtual world, a destination within a virtual world, a chat room, a bulletin board, a blog, some combination thereof, or so forth. However, claimed subject matter is not limited to any particular described embodiments, implementations, examples, etc.

For certain example embodiments, one or more social network interactions 308 may include, but are not limited to, accessing a social network, reading a communication from one or more social network members, sending a communication to one or more social network members, changing profile or account information for a social network, viewing publicly-available social network information (e.g., viewing a person's wall, board, stream, pinning, or a combination thereof, etc.), viewing private social network information (e.g., viewing a targeted or personalized message, tweet, picture, or a combination thereof, etc.), searching for entities on a social network, playing games via a social network, experiencing entertainment (e.g., video, audio, clips, pictures, or a combination thereof, etc.) via a social network, a listing of which social network(s) are accessed, an order of which social networks are accessed, a day or time of accessing particular social network(s), some combination thereof, or so forth. For certain example implementations, social network member interactions 308a may include, but are not limited to, identifying or listing members interacted with via receiving, retrieving, sending, replying to or a combination thereof, etc. one or more communications; noting particular social network protocols or modes (e.g., wall writing or viewing, tweet sending or receiving, picture sending or viewing, public versus private communicating, or a combination thereof, etc.) used to communicate with particular members individually or in groups; noting particular social network protocols or modes used to communicate with particular member groups; some combination thereof; or so forth. For certain example implementations, social network message interactions 308b may include, but are not limited to, noting (e.g., recording, memorializing, storing, identifying, or a combination thereof, etc.) messages sent or received, noting an order of message sending or viewing, noting a type (e.g., a social network protocol) of message sent or received, noting a number of messages sent or received, noting a duration between arrival of a message (e.g., generally or from a particular member) and viewing of the message, noting a duration between arrival or viewing of a message (e.g., generally or from a particular member) and responding to the message, some combination thereof, or so forth. However, claimed subject matter is not limited to any particular described embodiments, implementations, examples, etc.

For certain example embodiments, one or more communication modes employed 310 may include, but are not limited to, speech, a phone call, a voice-over-internet-protocol (VoIP) communication, text messaging, instant messaging, a video communication (e.g., a video call, a video conference, or a combination thereof, etc.), a social-network-based communication (e.g., a communication that is effectuated at least partially using a social network app, web site, service, or a combination thereof, etc.), some combination thereof, or so forth. Additionally or alternatively, one or more communication modes employed 310 may include, but are not limited to, indicators of which communication mode is employed if/when responding to a received communication of a given communication mode (e.g., it may be noted that an authorized user may respond to most phone calls or phone calls from particular people with text messages). However, claimed subject matter is not limited to any particular described embodiments, implementations, examples, etc.

For certain example embodiments, one or more entity interactions 312 may include, but are not limited to, identification of at least one entity (e.g., business, service, person, social network member, group, organization, or a combination thereof, etc.) that a user interacts with (e.g., with or without an indicator of a communication mode, such as via a telephone capability, via email, via instant messaging, via a social network communication protocol, via VoIP, via a video capability, via a speech capability, or a combination thereof, etc.), a listing of entities interacted with, an order of entities interacted with, notations of when (e.g., a day, a time, days of week, or a combination thereof, etc.) entities are interacted with, notations of how (e.g., a communication mode used, a duration, or a combination thereof, etc.) entities are interacted with, some combination thereof, or so forth. However, claimed subject matter is not limited to any particular described embodiments, implementations, examples, etc.

For certain example embodiments, one or more apps employed 314 may include, but are not limited to, identification of one or more apps (e.g., applications, native applications, downloaded applications, installed applications, software applications, web applications, or a combination thereof, etc.) employed (e.g., accessed, started, opened, launched, viewed, consulted, manipulated, configured, installed, executed, or a combination thereof, etc.) by a user, a listing of apps employed, an order of apps employed, a notation of a time or a day at which apps are employed, a notation of duration(s) for which apps are employed, some combination thereof, or so forth. However, claimed subject matter is not limited to any particular described embodiments, implementations, examples, etc.

For certain example embodiments, one or more transactions conducted 316 may include, but are not limited to, an identification of transactions (e.g., exchanges of consideration, purchases, orders, downloads, or a combination thereof, etc.) conducted (e.g., initiated, requested, consummated, effectuated, accomplished, monitored, or a combination thereof, etc.), a list of transactions, a notation of times or days of transactions, a notation of transaction amounts, a notation of at least one party to one or more transactions, a notation of items (e.g., physical items such as food or electronics, virtual items such as songs or movies or games or in-game abilities, or a combination thereof, etc.) or services (e.g., physical services such as a massage or a car wash, virtual services such as streaming media or a membership, or a combination thereof, etc.) involved in one or more transactions, some combination thereof, or so forth. However, claimed subject matter is not limited to any particular described embodiments, implementations, examples, etc.

For certain example embodiments, one or more user statuses 318 may include, but are not limited to, a location status update, a health status update, an alert (e.g., as to whether a person has possession or has lost possession of a device; as to whether a device has exceeded some percentage—e.g. 50% or 75% or 100%—of an allotted amount, such as of minutes of talking, bytes of data, messages of texting, dollars of a fund, time of use, etc.; as to where a person is currently located; a combination thereof; etc.), a current (e.g., most recent, present, or a combination thereof, etc.) activity update, some combination thereof, or so forth. However, claimed subject matter is not limited to any particular described embodiments, implementations, examples, etc.

For certain example embodiments, one or more other acts 320 may include, but are not limited to, other user behaviors, user habits, user actions, user movements, user interactions, user visitations, user transactions, device features (e.g., capabilities, native applications, operating system functions, or a combination thereof, etc.) employed, or a combination thereof, etc. that a device may monitor (e.g., detect, observe, discern, ascertain, or a combination thereof, etc.); other acts reflecting user behavior; other acts described herein; some combination thereof; or so forth. However, claimed subject matter is not limited to any particular described embodiments, implementations, examples, etc.

For certain example embodiments, one or more predicted acts 322 may include, but are not limited to, an act that is predicted based at least partially on any one or more of other indicators 302-320; an act that is predicted to be performed by an authorized user; an act corresponding to a particular likelihood level of re-occurring; an act that is predicted to re-occur in view of one or more observed acts of at least one authorized user of one or more user devices; an act that is predicted to occur based at least partially on a statistical analysis (e.g., a likelihood function, a histogram evaluation, a probabilistic approach, a Bayesian analysis, a stochastic mechanism, a correlation procedure, a probability density function, a normal/Gaussian distribution, a cumulative distribution function, an expected value, or a combination thereof, etc.) of one or more historically-monitored acts; an act that has been repeatedly performed in certain manner(s) or at particular time(s) such that it can be expected to be performed again in such certain manner(s) or at such particular time(s); an act that is derived or results from a conversion of monitored act(s) corresponding to one device to at least one act corresponding to another device; some combination thereof; or so forth. However, claimed subject matter is not limited to any particular described embodiments, implementations, examples, etc.

For certain example embodiments, one or more other indicators 324 may include, but are not limited to, static characteristics of an authorized user, individuals that are related to an authorized user, characteristics of individuals that are related to an authorized user; nature of relationships between or among an authorized user and other individuals, some combination thereof, or so forth. Non-exhaustive examples of other indicators 324 are provided herein below with particular reference to FIG. 7A-7E, 8A-8D, 9A-9D, or 10A. However, claimed subject matter is not limited to any particular described embodiments, implementations, examples, etc.

Figure 4:
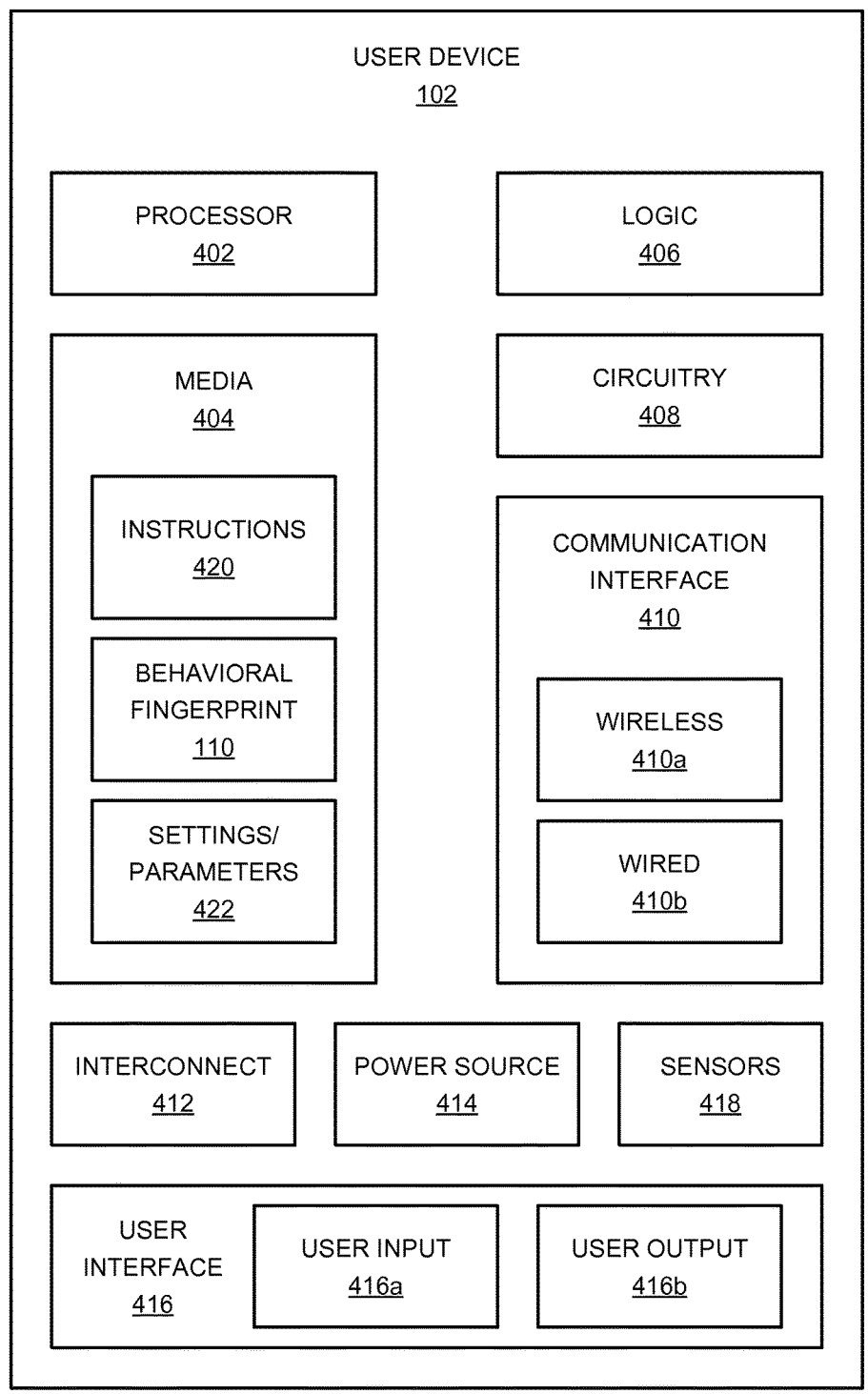
FIG. 4 is a schematic diagram of an example user device including one or more example components in accordance with certain example embodiments.

FIG. 4 is a schematic diagram 400 of an example user device including one or more example components in accordance with certain example embodiments. As shown in FIG. 4, a user device 102 may include one or more components such as: at least one processor 402, one or more media 404, logic 406, circuitry 408, at least one communication interface 410, at least one interconnect 412, at least one power source 414, at least one user interface 416, one or more sensors 418, some combination thereof, or so forth. Furthermore, as shown in schematic diagram 400, one or more media 404 may include one or more instructions 420, at least one behavioral fingerprint 110, one or more settings or parameters 422, some combination thereof, or so forth; a communication interface 410 may include at least one wireless communication interface 410a, at least one wired communication interface 410b, some combination thereof, or so forth; or a user interface 416 may include at least one user input interface 416a, at least one user output interface 416b, some combination thereof, or so forth. However, a user device 102 may alternatively include more, fewer, or different component(s) from those that are illustrated without departing from claimed subject matter.

For certain example embodiments, a user device 102 may include or comprise at least one electronic device. User device 102 may include, for example, a computing platform or any electronic device having at least one processor or memory. Processor 402 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, or a combination thereof, etc. instructions 420, which may be executable by a processor 402; at least one behavioral fingerprint 110; one or more settings/parameters 422; some combination thereof; or so forth. Instructions 420 may include or comprise, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 404 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, a behavioral fingerprint, settings, parameters, some combination thereof, or so forth.

For certain example embodiments, execution of instructions 420 by one or more processors 402 may transform user device 102 into a special-purpose computing device, apparatus, platform, machine, some combination thereof, or so forth. Instructions 420 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings. Settings/parameters 422 may include, by way of example but not limitation, one or more settings or parameters that may be established or determined by a user or other entity, one or more or settings or parameters that may be determined or detected by a user device 102, one or more settings or parameters that may be received from another device that determined or detected them, one or more settings or parameters that may determine at least partly how a user device 102 is to operate or respond to a situation or a behavioral fingerprint, one or more settings or parameters (e.g., values) that may be used to realize flow diagrams, methods, processes, procedures, operations, functionality, technology, mechanisms, or a combination thereof, etc. that are described herein or illustrated in the accompanying drawings. Settings/parameters 422 may control at least partially how at least one behavioral fingerprint 110 is configured, stored, shared, used, applied, some combination thereof, or so forth. Additionally or alternatively, at least a portion of settings/parameters 422 may be at least partially integrated with at least one behavioral fingerprint 110.

For certain example embodiments, logic 406 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 408 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 408 includes at least one physical or hardware component or aspect.

For certain example embodiments, one or more communication interfaces 410 may provide one or more interfaces between user device 102 and another device or a person/operator. With respect to a person/operator, a communication interface 410 may include, by way of example but not limitation, a screen, a speaker, a keyboard or keys, a microphone, or other person-device input/output apparatuses. A wireless communication interface 410a or a wired communication interface 410b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, or a combination thereof, etc. to communicate wireless signals or wired signals via one or more wireless communication links or wired communication links, respectively, such as over at least one channel 108 (e.g., of FIGS. 1 and 2A). Communications with at least one communication interface 410 may enable transmitting, receiving, or initiating of transmissions, just to name a few examples.

For certain example embodiments, at least one interconnect 412 may enable signal communication between or among components of user device 102. Interconnect 412 may include, by way of example but not limitation, one or more buses, channels, switching fabrics, some combination thereof, or so forth. Although not explicitly illustrated in FIG. 4, one or more components of user device 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of user device 102. Power source 414 may include, by way of example but not limitation, a battery, a power connector, a solar power source or charger, a mechanical power source or charger, a fuel source, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 418 may include, by way of example but not limitation, an image, a sound recording, an acceleration value, a temperature, SPS coordinates, a barometric pressure, a humidity level, a compass direction, a gyroscopic value, a magnetic reading, a pressure value, an oscillation value, an ambient light reading, inertial readings, touch detections, finger placements, flex detections, some combination thereof, or so forth.

For certain example embodiments, a user interface 416 may enable one or more users to interact with user device 102. Interactions between a user and a user device may relate, by way of example but not limitation: to touch/tactile/feeling/haptic sensory (e.g., a user may shake, rotate, decline/incline, bend, twist, or move a user device which may be detected by a gyroscope, an accelerometer, a compass, or a combination thereof, etc.; a user may press a button, slide a switch, rotate a knob, etc.; a user may touch a touch-sensitive screen; a device may vibrate; some combination thereof; or so forth), to sound/hearing/speech sensory (e.g., a user may speak into a microphone, a device may generate sounds via a speaker, or a combination thereof, etc.), to sights/vision sensory (e.g., a device may activate one or more lights, modify an image presented on a display screen, or a combination thereof, etc.), some combination thereof, or so forth.

For certain example embodiments, a user interface 416 may include a user input interface 416a, a user output interface 416b, some combination thereof, or so forth. A user input interface 416a may include, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, a virtual button/slider/keyboard/etc. presented on a touch-sensitive screen, some combination thereof, or so forth. A user output interface 416b may include, by way of example but not limitation, a speaker, a screen (e.g., with or without touch-sensitivity), a vibrating haptic feature, some combination thereof, or so forth. Certain user interfaces 416 may enable both user input and user output. For example, a touch-sensitive screen may be capable of providing user output and accepting user input. Additionally or alternatively, a user interface 416 component (e.g., that may be integrated with or separate from a user device 102), such as a headset that has a microphone and a speaker, may enable both user input and user output.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a USB connector may function as a wired communication interface 410b or a power source 414. Additionally or alternatively, a single component such as a display screen may function as a communication interface 410 with respect to a user, as a user input interface 416a, or as a user output interface 416b. Additionally or alternatively, one or more instructions 420 may function to realize at least part of a behavioral fingerprint 110 or at least one setting or parameter 422.

It should also be understood that for certain example implementations components that are illustrated in schematic diagram 400 or described herein may or may not be integral with or integrated into a user device 102. For example, a component may be removably connected to a user device 102, a component may be wirelessly coupled to a user device 102, some combination thereof, or so forth. By way of example only, instructions 420 may be stored on a removable card having at least one medium 404. Additionally or alternatively, a user interface 416 (e.g., a wired or wireless headset, a screen, a video camera, a keyboard, or a combination thereof, etc.) may be coupled to a user device 102 wirelessly or by wire. However, claimed subject matter is not limited to any particular described embodiments, implementations, examples, etc.

Figure 5:
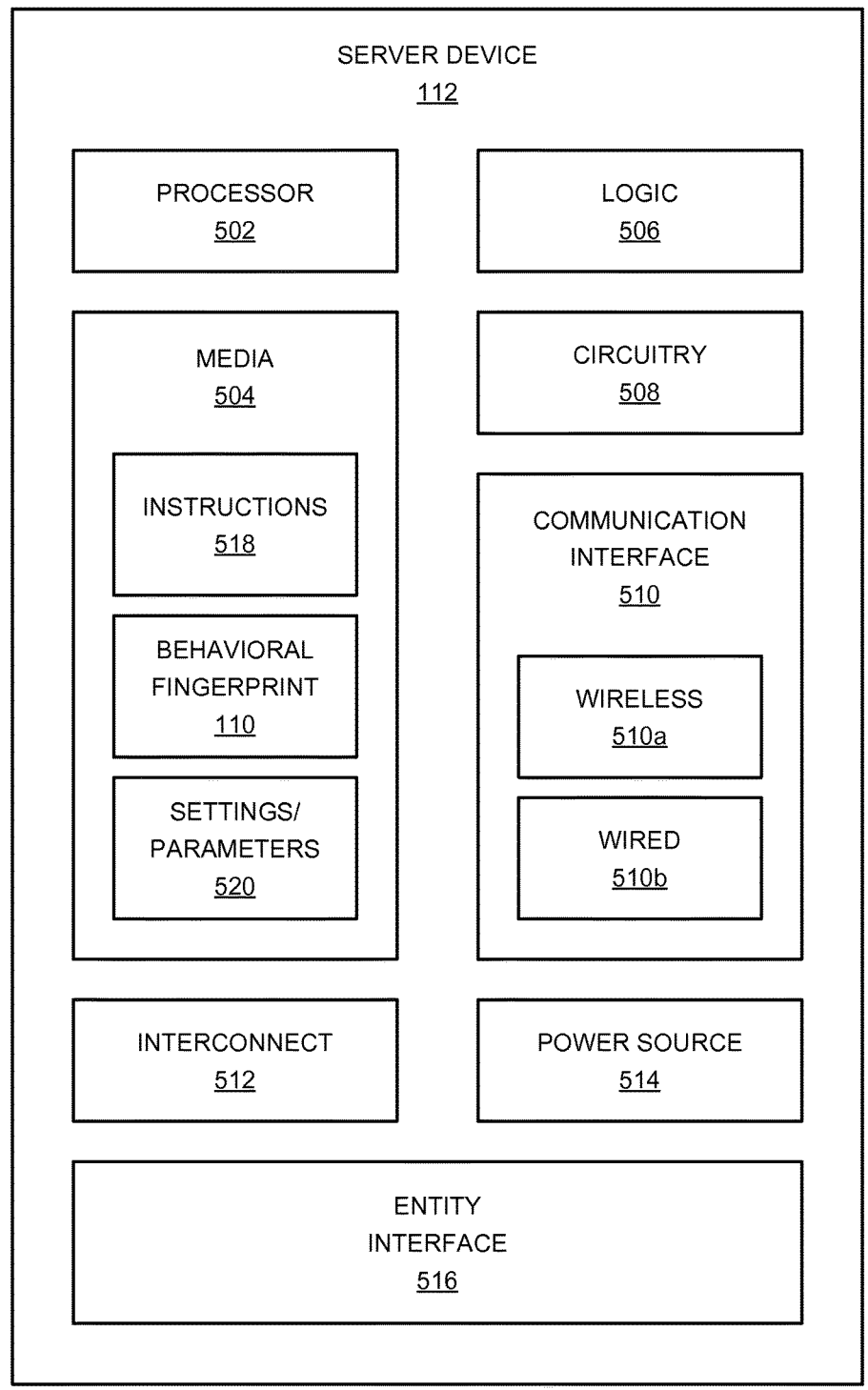
FIG. 5 is a schematic diagram of an example server device including one or more example components in accordance with certain example embodiments.

FIG. 5 is a schematic diagram 500 of an example server device including one or more example components in accordance with certain example embodiments. As shown in FIG. 5, a server device 112 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may include one or more instructions 518, at least one behavioral fingerprint 110, one or more settings or parameters 520, some combination thereof, or so forth; or communication interface 510 may include at least one wireless communication interface 510a, at least one wired communication interface 510b, some combination thereof, or so forth. However, a server device 112 may alternatively include more, fewer, or different component(s) from those that are illustrated without departing from claimed subject matter.

For certain example embodiments, a server device 112 may include or comprise at least one processing or computing device or machine. Server device 112 may include or comprise, for example, a computing platform or any electronic device or devices having at least one processor or memory. Processor 502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 504 may bear, store, contain, include, provide access to, or a combination thereof, etc. instructions 518, which may be executable by a processor 502; at least one behavioral fingerprint 110; one or more settings/parameters 520; some combination thereof; or so forth. Instructions 518 may include or comprise, by way of example but not limitation, a program, a module, an application or app (e.g., that is native, that runs in a browser, that runs within a virtual machine or server, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, at least one behavioral fingerprint, settings, parameters, some combination thereof, or so forth.

For certain example embodiments, execution of instructions 518 by one or more processors 502 may transform server device 112 into a special-purpose computing device, apparatus, platform, machine, some combination thereof, or so forth. Instructions 518 may include, for example, instructions that are capable of realizing at least a portion of one or more flow diagrams methods, processes, procedures, operations, functionality, technology, mechanisms, or a combination thereof, etc. that are described herein or illustrated in the accompanying drawings. Settings/parameters 520 may include, by way of example but not limitation, one or more settings or parameters that may be established by a user or other entity, one or more settings or parameters that may be determined by a server device 112, one or more settings or parameters that may be determined by a user or other entity, one or more settings or parameters that may be detected by a server device 112, one or more settings or parameters that may be received from another device that detected them, one or more settings or parameters that may determine at least partly how a server device 112 is to operate or respond to a situation or a behavioral fingerprint, one or more settings or parameters (e.g., values) that may be used to realize flow diagrams, methods, processes, procedures, operations, functionality, technology, mechanisms, or a combination thereof, etc. that are described herein or illustrated in the accompanying drawings. Settings/parameters 520 may control at least partially how at least one behavioral fingerprint 110 is configured, stored, shared, used, applied, some combination thereof, or so forth. Additionally or alternatively, at least a portion of settings/parameters 520 may be at least partially integrated with at least one behavioral fingerprint 110.

For certain example embodiments, logic 506 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 508 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 508 includes at least one physical or hardware component or aspect.

For certain example embodiments, one or more communication interfaces 510 may provide one or more interfaces between server device 112 and another device or a person/operator/entity directly or indirectly. A wireless communication interface 510a or a wired communication interface 510b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, or a combination thereof, etc.), a physical or logical network adapter or port, a frequency converter, a baseband processor, an internet or telecommunications backbone connector, a fiber optic connector, a storage area network (SAN) connector, or a combination thereof, etc. to communicate wireless signals or wired signals via one or more wireless communication links or wired communication links, respectively, such as over one or more channels 108 (e.g., of FIGS. 1 and 2A). Communications with at least one communication interface 510 may enable transmitting, receiving, or initiating of transmissions, just to name a few examples.

For certain example embodiments, at least one interconnect 512 may enable signal communication between or among components of server device 112. Interconnect 512 may include, by way of example but not limitation, one or more buses, channels, switching fabrics, local area networks (LANs), storage area networks (SANs), some combination thereof, or so forth. Although not explicitly illustrated in FIG. 5, one or more components of server device 112 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of server device 112. Power source 514 may include, by way of example but not limitation, a power connector for accessing an electrical grid, a fuel cell, a solar power source, some combination thereof, or so forth.

For certain example embodiments, an entity interface 516 may enable one or more entities (e.g., another device, a person, a group, a robotic entity, or a combination thereof, etc.) to provide input to or receive output from server device 112. Interactions between an entity and a device may relate, by way of example but not limitation, to inputting or outputting instructions, commands, settings, parameters, indications or indicators, some combination thereof, or so forth. Certain entity interfaces 516 may enable both entity input and entity output at server device 112 or over at least one network link, such as one or more channels 108 (e.g., of FIGS. 1 and 2A).

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize at least one setting or parameter 520.

It should also be understood that for certain example implementations components that are illustrated in schematic diagram 500 or described herein may not be integral or integrated with a server device 112. For example, a component may be removably connected to a server device 112, a component may be wirelessly coupled to a server device 112, one or more components of a server device 112 may be geographically distributed or separated from one another, some combination thereof, or so forth. By way of example only, instructions 518 may be stored on one medium 504, and settings/parameters 520 (or another portion of instructions 518) may be stored on a different medium 504, which may include a same server or a part of a different server of, e.g., a server farm. Additionally or alternatively, respective processor-media sets may be physically realized on different or respective server blades or server containers. Multiple server blades, for instance, may be linked or interlinked to realize at least one server device 112. However, claimed subject matter is not limited to any particular described embodiments, implementations, examples, etc.

Figure 6A:
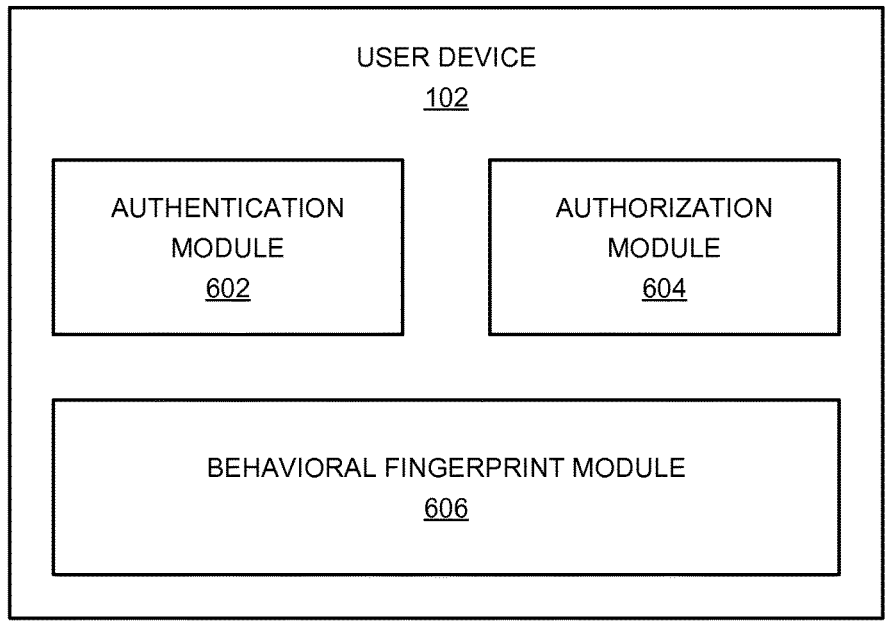
FIGS. 6A and 6B are schematic diagrams of an example user device and an example server device, respectively, that have one or more functional modules in accordance with certain example embodiments.
Figure 6B:
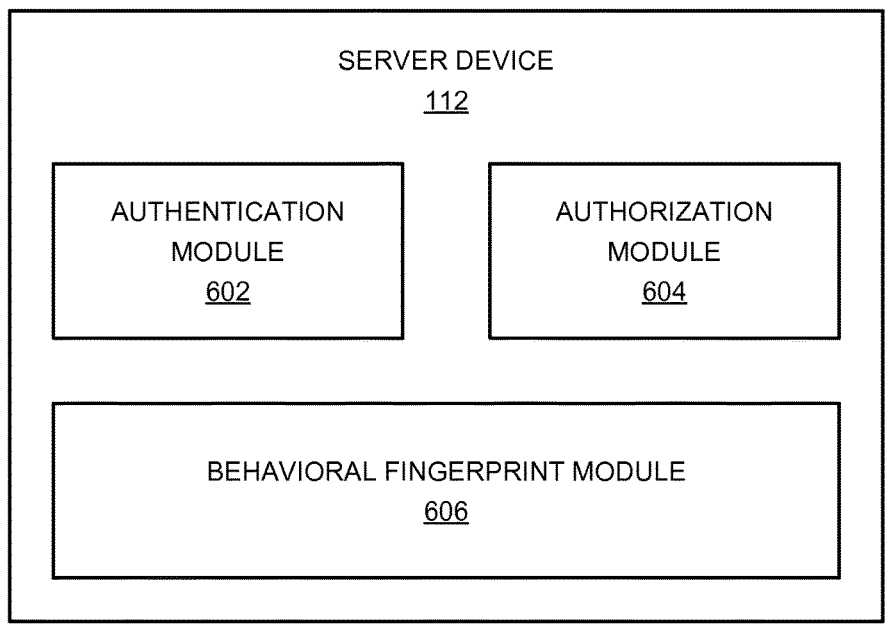

FIGS. 6A and 6B are schematic diagrams 600A and 600B of an example user device and an example server device, respectively, that have one or more functional modules in accordance with certain example embodiments. As shown in FIGS. 6A and 6B, by way of example but not limitation, schematic diagrams 600A and 600B may depict a user device 102 and a server device 112, respectively. As illustrated in schematic diagrams 600A and 600B, a user device 102 or a server device 112 may include, but are not limited to, at least one authentication module 602, at least one authorization module 604, at least one behavioral fingerprint module 606, a combination thereof, or so forth. However, a user device 102 or a server device 112 may alternatively include more, fewer, or different module(s) from those that are illustrated without departing from claimed subject matter.

For certain example embodiments, a module may include or be comprised of at least one processor (e.g., a processor 402 of FIG. 4, a processor 502 of FIG. 5, or a combination thereof, etc.), one or more media (e.g., a medium 404 of FIG. 4, a media medium 504 of FIG. 5, or a combination thereof, etc.), executable instructions (e.g., processor-executable instructions, instructions 420 of FIG. 4, instructions 518 of FIG. 5, computer-implementable instructions, or a combination thereof, etc.), logic (e.g., logic 406 of FIG. 4, logic 506 of FIG. 5, or a combination thereof, etc.), circuitry (e.g., circuitry 408 of FIG. 4, circuitry 508 of FIG. 5, or a combination thereof, etc.), other described or illustrated component(s), some combination thereof, or so forth. For certain example implementations, one or more modules (e.g., an authentication module 602, an authorization module 604, a behavioral fingerprint module 606, or a combination thereof, etc.) of at least one user device 102 may function or interoperate with one or more modules of at least one server device 112. However, claimed subject matter is not limited to any particular described embodiments, implementations, examples, etc.

For certain example embodiments, an authentication module 602 may operate to authenticate a user of a device. For certain example implementations, a user of a device may be authenticated by determining to some (e.g., reasonable, acceptable, measurable, quantifiable, or a combination thereof, etc.) degree an identity of a user. By way of example but not limitation, an authentication module 602 may enable implementation of multiple degrees of authentication, with different degrees of authentication corresponding to different levels of certainty of an identity of a user. Example aspects related to authentication are described further herein (e.g., at least herein above with particular reference to FIG. 1). However, claimed subject matter is not limited to any particular described embodiments, implementations, examples, etc.

For certain example embodiments, an authorization module 604 may operate to permit or enable full or at least partial access to, use of, implementation of, execution of, or a combination thereof, etc. one or more features, applications, accounts, profiles, data, capabilities, or a combination thereof, etc. of at least one device, such as a user device 102 or a server device 112. For certain example implementations, authorization may be fully or at least partially granted, denied, withheld, or a combination thereof, etc. based at least partially on an authentication determination, a result from an authentication module 602, some combination thereof, or so forth. By way of example but not limitation, an authorization module 604 may provide for different levels of authorization, including but not limited to those for a given authorized user, that correspond to different degrees of authentication, that correspond to different user identities, some combination thereof, or so forth. Example aspects related to authorization are described further herein (e.g., at least herein above with particular reference to FIG. 1). However, claimed subject matter is not limited to any particular described embodiments, implementations, examples, etc.

For certain example embodiments, a behavioral fingerprint module 606 may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to at least one behavioral fingerprint. For certain example implementations, a behavioral fingerprint module 606 may provide information, monitored acts, likelihood values, determinations, comparisons, analyses, indications or indicators, predicted acts, or a combination thereof, etc. to an authentication module 602 on which it may at least partially base an authentication determination. Example aspects related to behavioral fingerprinting are described further herein above and below. However, claimed subject matter is not limited to any particular described embodiments, implementations, examples, etc.

FIG. 7A is a schematic diagram 700A that includes at least one example device that is capable of handling scenarios for behavioral fingerprinting with social networking in accordance with certain example embodiments. As shown in FIG. 7A, by way of example but not limitation, schematic diagram 700A includes at least one device that may include an interaction-related communication module 702 or an interaction-related administration module 704. More specifically, schematic diagram 700A may include a user device 102 or a server device 112. By way of example but not limitation, an interaction-related communication module 702 or an interaction-related administration module 704 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, an interaction-related communication module 702 or an interaction-related administration module 704 may be implemented separately or at least partially jointly or in combination. For certain example implementations, an interaction-related communication module 702 may be configured to communicate for at least one interaction related to a user of a user device in a behavioral fingerprint habitat. For certain example implementations, an interaction-related administration module 704 may be configured to administer at least an aspect of at least one interaction related to a user of a user device in a behavioral fingerprint habitat. However, claimed subject matter is not limited to any particular described embodiments, implementations, examples, etc.

FIGS. 7B-7E are schematic diagrams 700B-700E that include at least one example device and that depict example scenarios for implementing behavioral fingerprinting with social networking in accordance with certain example embodiments. As shown in FIGS. 7B-7E, by way of example but not limitation, one or more of schematic diagrams 700B-700E may include at least one user device 102, at least one user 104, at least one behavioral fingerprint 110, at least one server device 112, at least one communication 706, at least one interaction 708, at least one behavioral fingerprint habitat 710, or at least one administration 712. Each of schematic diagrams 700B-700E may include alternative or additional depictions, which may relate to behavioral fingerprinting with social networking, as described herein. In addition to or in alternative to description herein below with specific reference to FIGS. 7B-7E, illustrated aspects of schematic diagrams 700B-700E may be relevant to example description with reference to FIG. 8A-8D, 9A-9D, or 10A. However, claimed subject matter is not limited to any particular described embodiments, implementations, examples, etc.

Figure 7B:
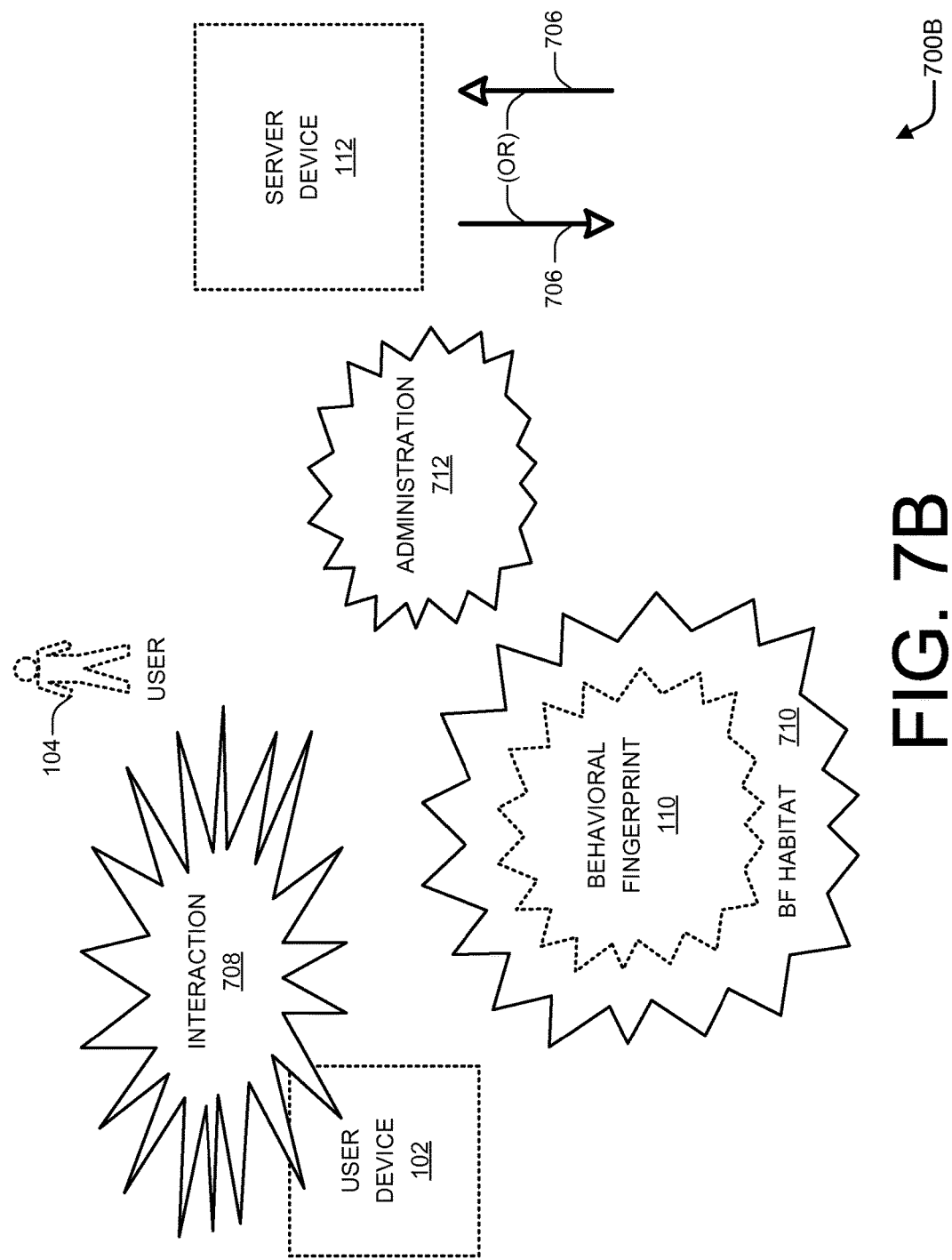
FIGS. 7B-7E are schematic diagrams that include at least one example device and that depict example scenarios for implementing behavioral fingerprinting with social networking in accordance with certain example embodiments.

As shown in FIG. 7B, by way of example but not limitation, schematic diagram 700B may include at least one user device 102, at least one user 104, at least one behavioral fingerprint 110, at least one server device 112, at least one communication 706, at least one interaction 708, at least one behavioral fingerprint habitat 710, or at least one administration 712. For certain example embodiments, a communication 706 may comprise or include an incoming communication, an outgoing communication, an intra-device communication, an inter-device communication, an internal communication within a company, an external communication to outside of a company, a transmission, a reception, a signaling, an intra-cloud communication, an inter-cloud communication, or a combination thereof, etc. that is effectuated or facilitated or performed at least partially using or with or via at least one server device 112. For certain example embodiments, an administration 712 may comprise or include a management, a supervision, a providing of a response to, an implementing an application of, a being in charge of, a use of, a making application of, a handling of, a cataloging of, coordinating a continuation of, initiating a cessation or change regarding, or a combination thereof, etc. that is effectuated or facilitated or performed at least partially using or with or via at least one server device 112. For alternative embodiments, a communication 706 and an administration 712 may be effectuated or facilitated or performed at least partially using or with or via at least one user device 102 (e.g., with a social networking app that is resident thereon). However, claimed subject matter is not limited to any particular described embodiments, implementations, examples, etc.

For certain example embodiments, an interaction 708 may comprise or include a direct or indirect interaction between or among at least one user device 102 and at least one user 104. Examples of interactions 708 may include, by way of example but not limitation, a user interface manipulation of a user device 102 by a user 104, an in-person purchase made by a user 104 via a user device 102, an internet purchase or order made by a user 104 with a user device 102, an indoor or an outdoor navigation by a user 104 with a user device 102, monitoring of a user 104 by a user device 102, providing information to a user 104 by a user device 102, providing input to a user device 102 by a user 104, carrying a user device 102 by a user 104, communicating with others by a user 104 via a user device 102, monitoring a social network stream or newsfeed or viewing a social network timeline of a user 104 with a user device 102, a user device 102 providing social network messages to a user 104, any one or more acts having a nexus between a user 104 and a user device 102 as described herein above with particular reference to FIG. 3, or a combination thereof, etc. For certain example embodiments, behavioral fingerprint habitat 710 may comprise or include an environment, at least one network, at least one user device, at least one server device, an application programming interface (API), a web service, a cloud computing platform, or a combination thereof, etc. in conjunction with at least a portion of a behavioral fingerprint 110 or a distributed implementation of at least one behavioral fingerprint 110 (e.g., as described herein including, by way of example but not limitation, herein above with particular reference to FIG. 1, 2A, 2B, or 3). However, claimed subject matter is not limited to any particular described embodiments, implementations, examples, etc. Additional or alternative description that may be relevant to schematic diagram 700B is provided herein below with particular reference to one or more of any of FIGS. 8A-8D, FIGS. 9A-9D, or FIG. 10A.

Figure 7C:
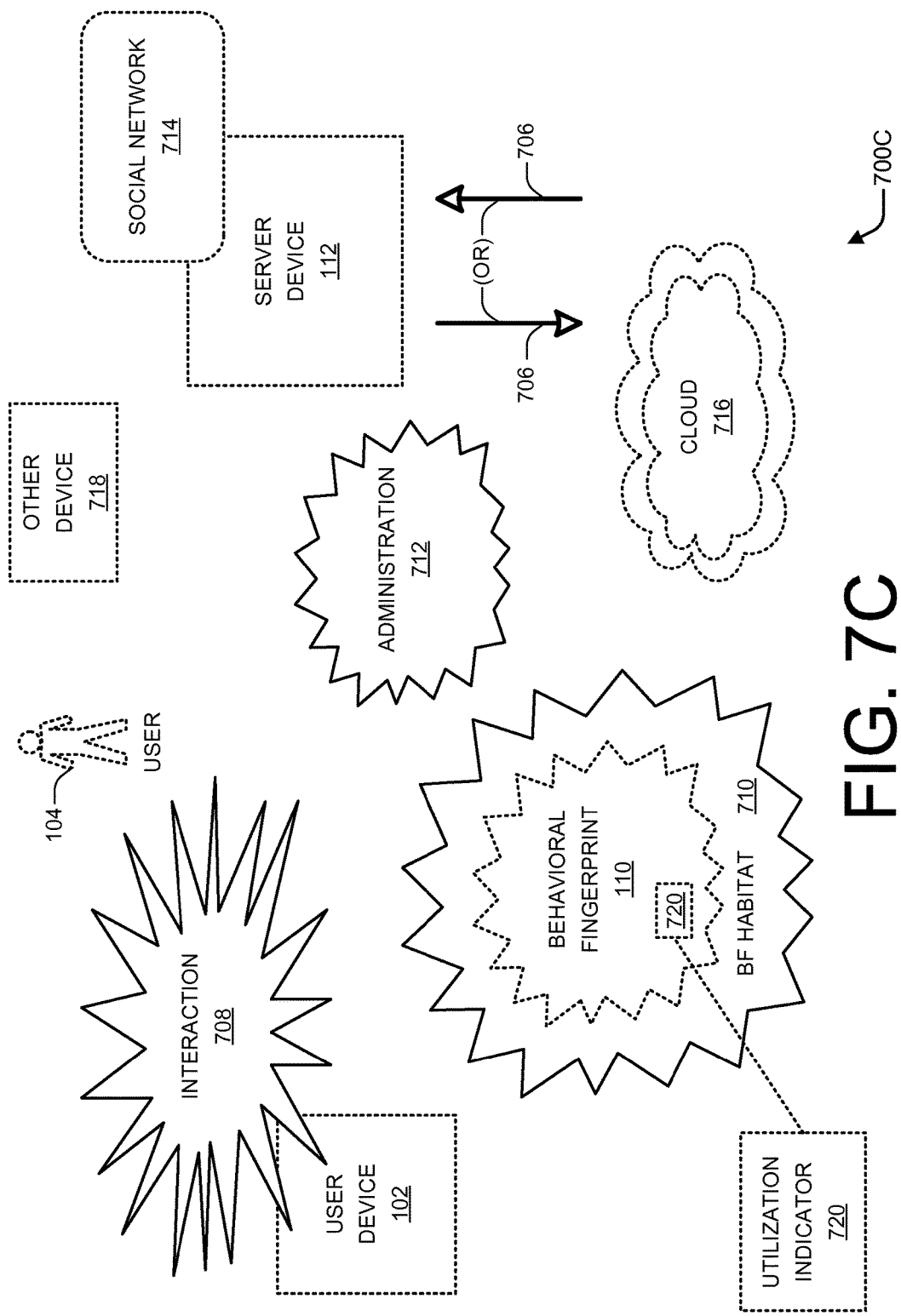

As shown in FIG. 7C, by way of example but not limitation, schematic diagram 700C may include at least one user device 102, at least one user 104, at least one behavioral fingerprint 110, at least one server device 112, at least one communication 706, at least one interaction 708, at least one behavioral fingerprint habitat 710, at least one administration 712, at least one social network 714, at least one cloud 716, at least one other device 718, or at least one utilization indicator 720. More specifically, for certain example embodiments, schematic diagram 700C may include: a user device 102 that may correspond to a user 104, which user 104 may be a current user or may include or comprise an authorized user or an unauthorized user of a user device 102; a server device 112, which may operate within or as part of a cloud 716 or may operate as part of or on behalf of a social network 714. For certain example implementations, a cloud 716 may include at least a portion of a server device, one or more server devices, a provider or utilizer of a cloud service, a provider or utilizer of cloud computing, a combination thereof, or so forth. For certain example embodiments, a behavioral fingerprint 110 may include one or more utilization indicators 720. For certain example implementations, at least one utilization indicator 720 may include or comprise at least one indicator of any of indicators 302-324 (e.g., of FIG. 3). However, claimed subject matter is not limited to any particular described embodiments, implementations, examples, etc.

For certain example embodiments, a server device 112 may be operated by or for a social network 714 (or other third party service provider). A social network 714 may include, by way of example but not imitation, a service, a physical network, a communication layer of a network, an internet location, a website, a computing infrastructure, one or more servers, an application, an interface, cloud computing, or a combination thereof, etc. that enables or facilitates interaction (e.g., via text, images, audio, video, or a combination thereof, etc.) between or among two or more members of a social network. The term "social" in "social network" should not be interpreted to exclude networks designed or intended for professional or specific purposes. Examples of social networks may include, but are not limited to, Facebook, Google+, Twitter, LinkedIn, Myspace, Pinterest, Classmates[dot]com, Flickr, Foursquare, Friendster, LiveJournal, Meetup, Netlog, Orkut, Sina Weibo, Qzone, Habbo, Instagram, or so forth. However, claimed subject matter is not limited to any particular described embodiments, implementations, examples, etc.

For certain example embodiments, an other device 718 may be operated or owned by a user 104 of a user device 102, may be operated or owned by a service provider, may be operated or owned by a social network 714, may be operated or owned by a third party, may be operated or owned by a retail establishment such as by a proprietor or corporate owner thereof, may be operated or owned by an entity affiliated with a server device 112, may be operated by one of the above and owned by another, or so forth. For certain example implementations, other device 718 may be communicatively coupled to a user device 102, a server device 112, a combination thereof, or so forth. By way of example but not limitation, other device 718: may be integrated with a user device 102, may be physically connected to a user device 102, may be wirelessly coupled to a user device 102, may be coupled by wire to a user device 102, may be coupled by wire or wirelessly to a server device 112, may be coupled to a user device 102 or a server device 112 via one or more networks, some combination thereof, or so forth. Other device 718 may additionally or alternatively be capable of bidirectional or unidirectional communication with one or more servers 112 (e.g., of a cloud computing environment 716 or via one or more channels 108 (e.g., of FIGS. 1 and 2A), which channel(s) 108 may include at least part of at least one network, such as an internet). Other device 718 may include or comprise at least a part of, by way of example but not limitation, a point-of-sale (POS) terminal, such as a register; an attachment augmenting a POS terminal; an attachment to a user device 102; a device that accepts credit, debit, or other payment cards and is coupled to a user device 102 or a POS terminal; a device that accepts or generates sensor readings and forwards them to a server 112; a device that collects, determines, or forwards environmental parameter data; a device that forwards other data collected or produced at a user device 102 to a server 112; a device that forwards other data collected or produced or provided by a server 112 to a user device 102; a combination thereof; or so forth. Data (e.g., relating to behavioral fingerprinting, social networking, retailing, utilization indicators, environmental parameters, interactions, or a combination thereof, etc.) may be collected at or by other device 718 or funneled through other device 718 between or among at least one user device 102 or one or more server devices 112. However, claimed subject matter is not limited to any particular described embodiments, implementations, examples, etc. Additional or alternative description that may be relevant to schematic diagram 700C is provided herein below with particular reference to one or more of any of FIGS. 8A-8D, FIGS. 9A-9D, or FIG. 10A.

Figure 7D:
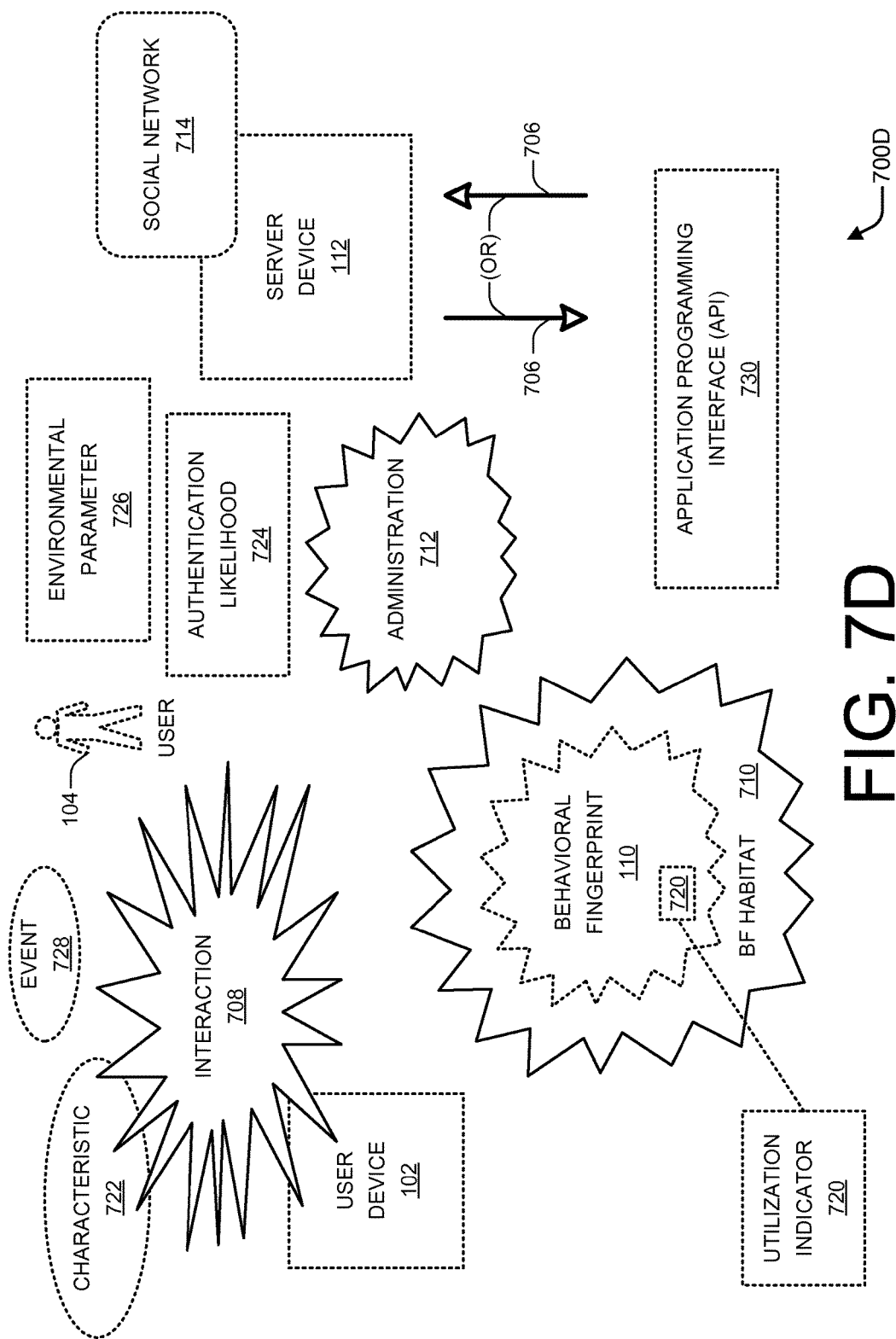

As shown in FIG. 7D, by way of example but not limitation, schematic diagram 700D may include at least one user device 102, at least one user 104, at least one behavioral fingerprint 110, at least one server device 112, at least one communication 706, at least one interaction 708, at least one behavioral fingerprint habitat 710, at least one administration 712, at least one social network 714, at least one utilization indicator 720, at least one characteristic 722, at least one authentication likelihood 724, at least one environmental parameter 726, at least one event 728, or at least one application programming interface (API) 730. However, claimed subject matter is not limited to any particular described embodiments, implementations, examples, etc.

Additional or alternative description that may be relevant to schematic diagram 700D is provided herein below with particular reference to one or more of any of FIGS. 8A-8D, FIGS. 9A-9D, or FIG. 10A.

Figure 7E:
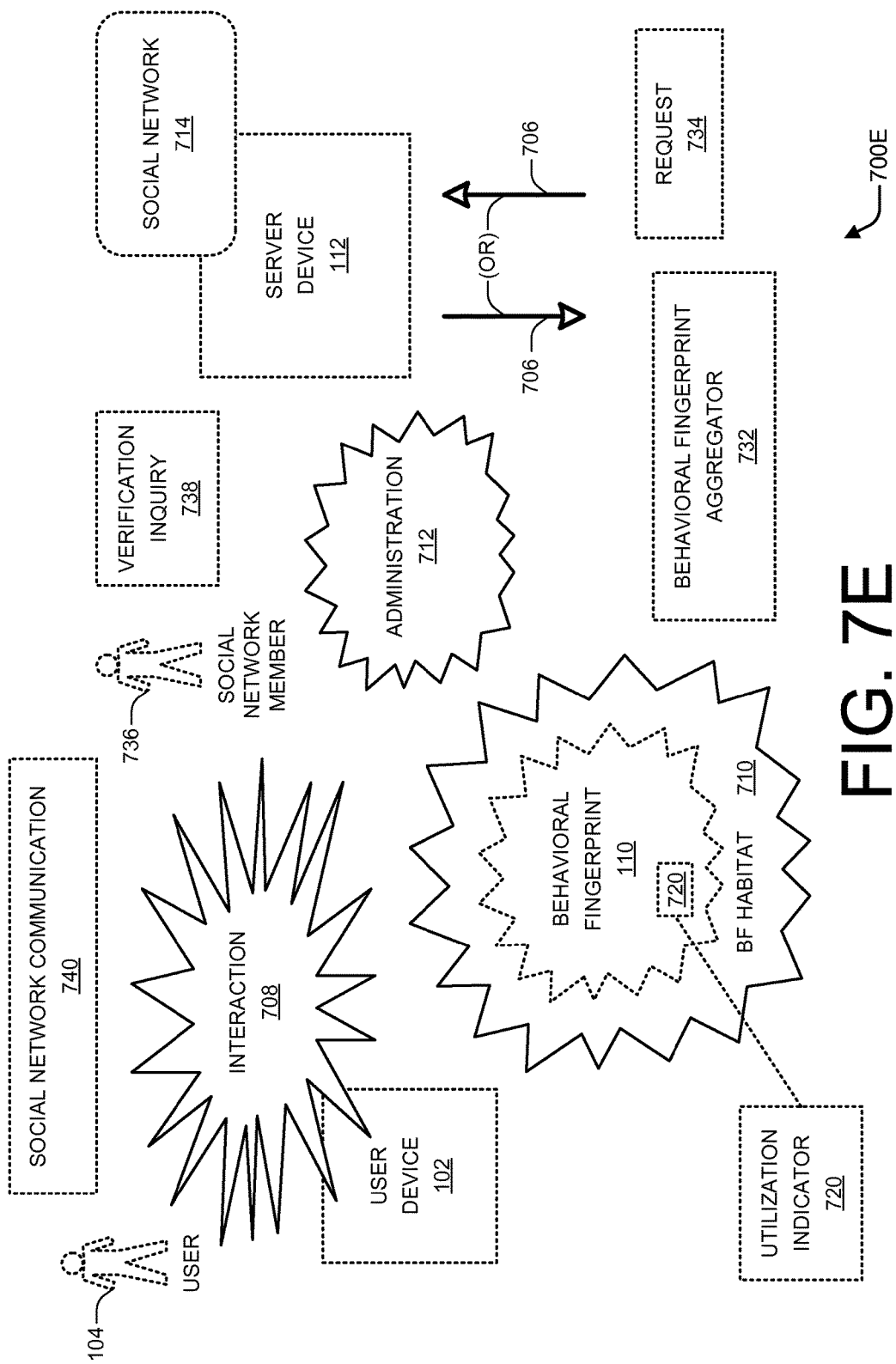

As shown in FIG. 7E, by way of example but not limitation, schematic diagram 700E may include at least one user device 102, at least one user 104, at least one behavioral fingerprint 110, at least one server device 112, at least one communication 706, at least one interaction 708, at least one behavioral fingerprint habitat 710, at least one administration 712, at least one social network 714, at least one utilization indicator 720, at least one behavioral fingerprint aggregator 732, at least one request 734, at least one social network member 736, at least one verification inquiry 738, or at least one social network communication 740. However, claimed subject matter is not limited to any particular described embodiments, implementations, examples, etc. Additional or alternative description that may be relevant to schematic diagram 700E is provided herein below with particular reference to one or more of any of FIGS. 8A-8D, FIGS. 9A-9D, or FIG. 10A.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 8A is a flow diagram 800A illustrating an example method for at least one device with regard to behavioral fingerprinting with social networking in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation(s). For certain example embodiments, one or more operations of flow diagram 800A may be performed by at least one server device (e.g., a server device 112). Alternatively, one or more operations of flow diagram 800A may be performed by at least one user device (e.g., a user device 102).

For certain example embodiments, a method for behavioral fingerprinting with social networking (e.g., that includes, involves, relates to, is associated with, or a combination thereof, etc. at least one social network 714), which method may be at least partially implemented using hardware (e.g., circuitry, at least one processor, processor-accessible memory, or a combination thereof, etc.) such as that of a server device, may include an operation 802 or an operation 804. An operation 802 may be directed at least partially to communicating for at least one interaction related to a user of a user device in a behavioral fingerprint habitat. For certain example implementations, at least one device may communicate 706 (e.g., accept an incoming communication, send an outgoing communication, participate in an intra-device communication, participate in an inter-device communication, receive or transmit an internal communication within a company, receive or transmit an external communication outside of a company, make a transmission, make a reception, provide a signaling, participate in an intra-cloud communication, participate in an inter-cloud communication, or a combination thereof, etc.) for at least one interaction 708 (e.g., a user interface manipulation of a user device by a user, an in-person purchase made by a user via a user device, an internet purchase or order made by a user with a user device, indoor or outdoor navigation by a user with a user device, monitoring of a user by a user device, providing information to a user by a user device, providing input to a user device by a user, carrying a user device by a user, communicating with others by a user via a user device, monitoring a social network stream or newsfeed or viewing a social network timeline of a user with a user device, a user device providing social network messages to a user, any one or more acts having a nexus between a user and a user device as described herein above with particular reference to FIG. 3, or a combination thereof, etc.) related to (e.g., including, involving, pertaining to, affecting, being affected by, receiving input from, presenting output to, indicative of, associated with, corresponding to, or a combination thereof, etc.) a user 104 of a user device 102 in a behavioral fingerprint habitat 710 (e.g., an environment, at least one network, at least one user device, at least one server device, an application programming interface (API), a web service, a cloud computing platform, or a combination thereof, etc. in conjunction with at least a portion of a behavioral fingerprint 110 or a distributed implementation of at least one behavioral fingerprint 110 (e.g., as described herein including, by way of example but not limitation, herein above with particular reference to FIG. 1, 2A, 2B, or 3)). By way of example but not limitation, a server may communicate for at least one interaction related to a user of a user device in a behavioral fingerprint habitat (e.g., a Facebook server having access to at least a portion of a behavioral fingerprint may receive a location of an Android smartphone along with an item for potential purchase by a user of the Android smartphone). However, claimed subject matter is not limited to any particular described embodiments, implementations, examples, etc.

For certain example embodiments, an operation 804 may be directed at least partially to administering at least an aspect of the at least one interaction related to the user of the user device in the behavioral fingerprint habitat. For certain example implementations, at least one device may administer 712 (e.g., manage, supervise, provide a response to, implement an application of, be in charge of, make use of, apply, handle, catalog, coordinate a continuation of, initiate a cessation or change regarding, or a combination thereof, etc.) at least an aspect (e.g., an output, an input, data produced monitoring, one or more variables, a factor, a parameter at least partially in control, or a combination thereof, etc.) of at least one interaction 708 related to a user 104 of a user device 102 in a behavioral fingerprint habitat 710. By way of example but not limitation, a server may administer at least an aspect of the at least one interaction related to the user of the user device in the behavioral fingerprint habitat (e.g., a Facebook server may obtain a likelihood that a user of an Android smartphone is an authorized user thereof based at least partially on a location of the Android smartphone and an item for potential purchase by the user of the Android smartphone in conjunction with at least a portion of a behavioral fingerprint associated with the Android smartphone). However, claimed subject matter is not limited to any particular described embodiments, implementations, examples, etc.

Figure 8B:
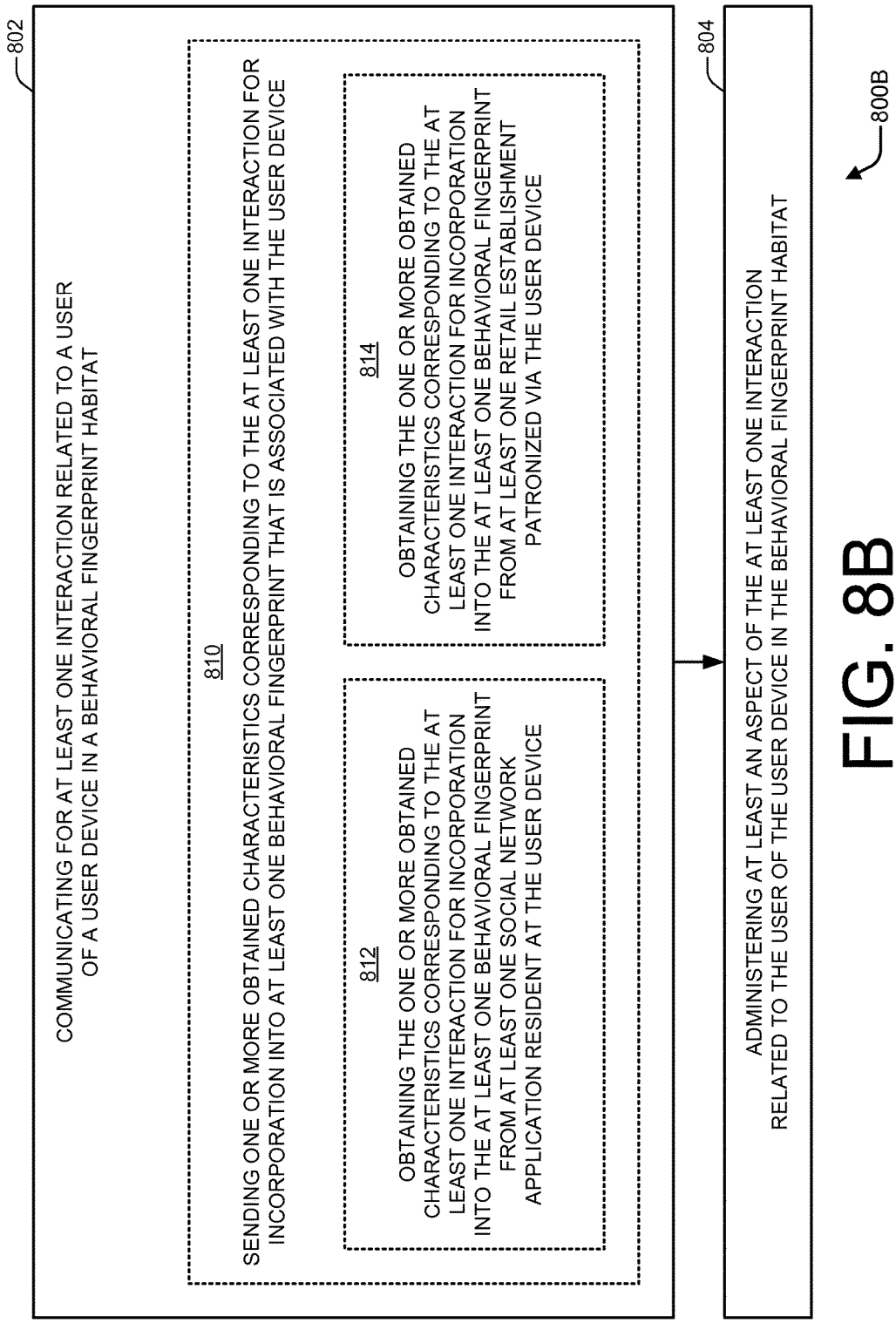
Figure 8D:
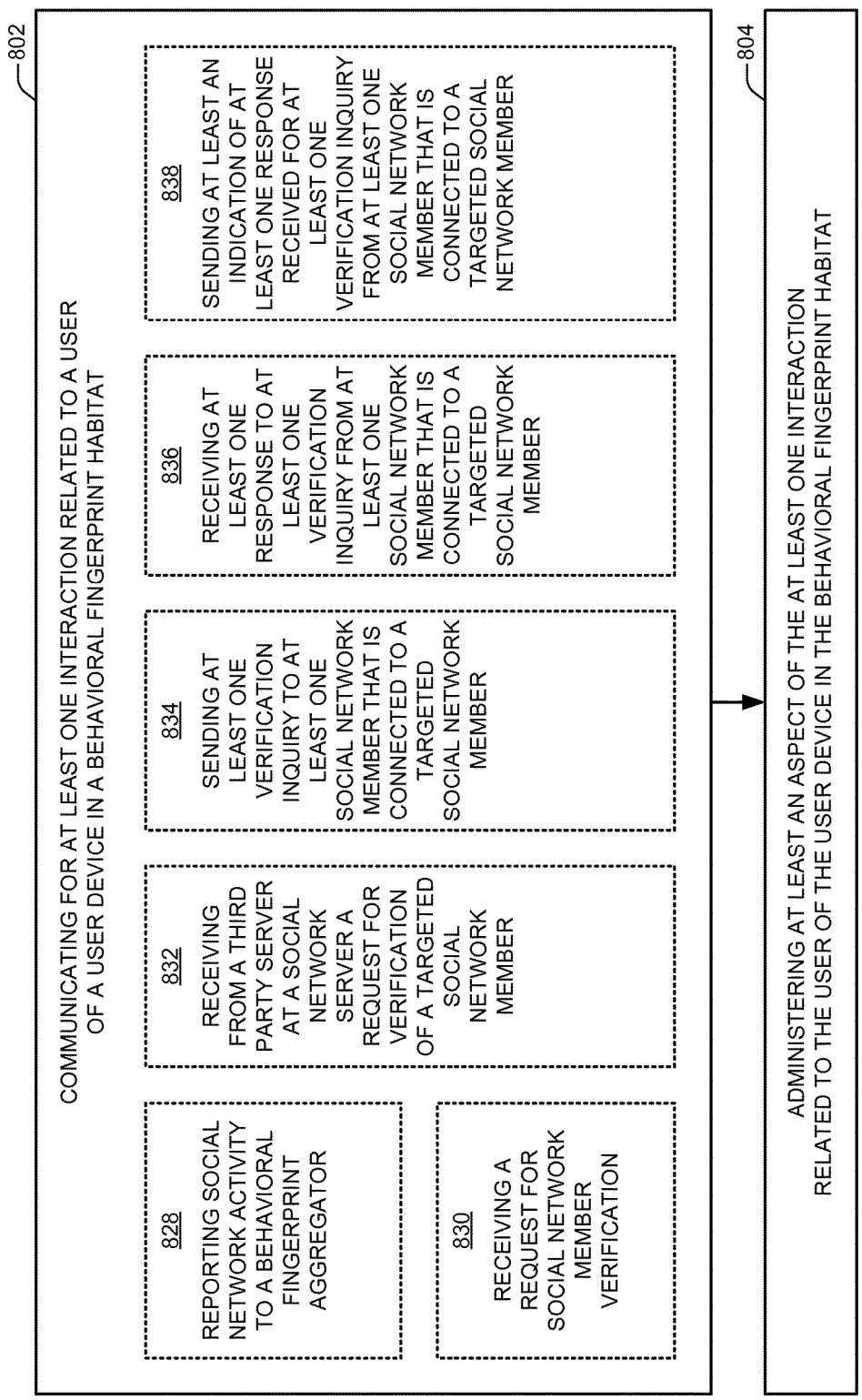

FIGS. 8B-8D depict example additions or alternatives for a flow diagram of FIG. 8A in accordance with certain example embodiments. As illustrated, flow diagrams of FIGS. 8B-8D may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 8B-8D may be performed so as to be fully or partially overlapping with other operation(s). For certain example embodiments, one or more operations of flow diagrams 800B-800D (of FIGS. 8B-8D) may be performed by at least one server device (e.g., a server device 112). Alternatively, one or more operations of flow diagrams 800B-800D may be performed by at least one user device (e.g., a user device 102).

FIG. 8B illustrates a flow diagram 800B having example operations 810, 812, or 814. For certain example embodiments, an operation 810 may be directed at least partially to wherein the communicating for at least one interaction related to a user of a user device in a behavioral fingerprint habitat (of operation 802) includes sending one or more obtained characteristics corresponding to the at least one interaction for incorporation into at least one behavioral fingerprint that is associated with the user device. For certain example implementations, at least one device may send (e.g., transmit, provide a link or reference or code to retrieve, forward, or a combination thereof, etc.) one or more obtained characteristics 722 (e.g., a description, an identification, a code, a label, an indicator 302-324, or a combination thereof, etc.) corresponding to (e.g., associated with, related to, descriptive of, indicative of, derived from, pertaining to, impacting, or a combination thereof, etc.) at least one interaction 708 for incorporation (e.g., for adding, integrating, supplementing with, updating using, augmenting with, replacing with, modifying using, adapting using, deleting at least a portion of, changing statistics using, creating at least one new predicted act based at least partially on, altering at least one existing predicted act based at least partially on, increasing or decreasing a likelihood based at least partially on, or a combination thereof, etc.) into at least one behavioral fingerprint 110 that is associated with a user device 102. By way of example but not limitation, a server may send one or more obtained characteristics corresponding to the at least one interaction for incorporation into at least one behavioral fingerprint that is associated with the user device (e.g., a Facebook server may transmit to a McAfee server, which is maintaining a behavioral fingerprint that is associated with a Microsoft Surface tablet, a description of a destination for a European trip on which a user will take the Microsoft Surface tablet for inclusion of the description into the behavioral fingerprint). However, claimed subject matter is not limited to any particular described embodiments, implementations, examples, etc.

For certain example embodiments, an operation 812 may be directed at least partially to wherein the sending one or more obtained characteristics corresponding to the at least one interaction for incorporation into at least one behavioral fingerprint that is associated with the user device (of operation 810) includes obtaining the one or more obtained characteristics corresponding to the at least one interaction for incorporation into the at least one behavioral fingerprint from at least one social network application resident at the user device. For certain example implementations, at least one device may obtain (e.g., ascertain, receive, retrieve, determine, or a combination thereof, etc.) one or more obtained characteristics 722 (e.g., a description, an identification, a code, a label, an indicator 302-324, or a combination thereof, etc.) corresponding to (e.g., associated with, related to, descriptive of, indicative of, derived from, pertaining to, impacting, or a combination thereof, etc.) at least one interaction 708 for incorporation (e.g., for adding, integrating, supplementing with, updating using, augmenting with, replacing with, modifying using, adapting using, deleting at least a portion of, changing statistics using, creating at least one new predicted act based at least partially on, altering at least one existing predicted act based at least partially on, increasing or decreasing a likelihood based at least partially on, or a combination thereof, etc.) into at least one behavioral fingerprint 110 from at least one social network application (e.g., a native program, a just-in-time compiled program, a program running in a browser, code, a downloaded app, a set of instructions, or a combination thereof, etc. facilitating use of or related to a social network 714) resident at (e.g., at least partially located at, at least partially stored at, at least partially executing on, or a combination thereof, etc.) a user device 102. By way of example but not limitation, a server may obtain the one or more obtained characteristics corresponding to the at least one interaction for incorporation into the at least one behavioral fingerprint from at least one social network application resident at the user device (e.g., a server may receive from a Pinterest application on an HTC Windows Phone 8 a listing including at least a top three Pinterest boards visited each day by an authorized user of the HTC Windows Phone 8). However, claimed subject matter is not limited to any particular described embodiments, implementations, examples, etc.

For certain example embodiments, an operation 814 may be directed at least partially to wherein the sending one or more obtained characteristics corresponding to the at least one interaction for incorporation into at least one behavioral fingerprint that is associated with the user device (of operation 810) includes obtaining the one or more obtained characteristics corresponding to the at least one interaction for incorporation into the at least one behavioral fingerprint from at least one retail establishment patronized via the user device. For certain example implementations, at least one device may obtain (e.g., ascertain, receive, retrieve, determine, or a combination thereof, etc.) one or more obtained characteristics 722 (e.g., a description, an identification, a code, a label, an indicator 302-324, or a combination thereof, etc.) corresponding to (e.g., associated with, related to, descriptive of, indicative of, derived from, pertaining to, impacting, or a combination thereof, etc.) at least one interaction 708 for incorporation (e.g., for adding, integrating, supplementing with, updating using, augmenting with, replacing with, modifying using, adapting using, deleting at least a portion of, changing statistics using, creating at least one new predicted act based at least partially on, altering at least one existing predicted act based at least partially on, increasing or decreasing a likelihood based at least partially on, or a combination thereof, etc.) into at least one behavioral fingerprint 110 from at least one retail establishment (e.g., a physical store, a virtual store, a website that sells goods or services, a purveyor of goods, a provider of services, or a combination thereof, etc. for at least one or more consumers) patronized (e.g., shopped at, visited, ordered from, paid for goods or services, or a combination thereof, etc.) via a user device 102. By way of example but not limitation, a server may obtain the one or more obtained characteristics corresponding to the at least one interaction for incorporation into the at least one behavioral fingerprint from at least one retail establishment patronized via the user device (e.g., a server operated by or for a social network may receive from a Walmart server at least a category indication, such as sporting goods for kids, of articles purchased using a cell phone in a Walmart store, with the category indication to be added to a behavioral fingerprint). However, claimed subject matter is not limited to any particular described embodiments, implementations, examples, etc.

FIG. 8C illustrates a flow diagram 800C having example operations 818, 820, 822, 824a, or 824b. For certain example embodiments, an operation 818 may be directed at least partially to wherein the communicating for at least one interaction related to a user of a user device in a behavioral fingerprint habitat (of operation 802) includes receiving at least a portion of at least one behavioral fingerprint that is associated with the user device at a server device that provides social networking functionality. For certain example implementations, at least one device may receive (e.g., accept, acquire a communication including, get an update of, or a combination thereof, etc.) at least a portion of at least one behavioral fingerprint 110 that is associated with (e.g., that can impact authentication or authorization decisions for, that can be affected by interactions with, corresponding to, stored at, or a combination thereof, etc.) a user device 102 at a server device 112 that provides social networking functionality (e.g., a server that stores social networking data, a server that receives posts or messages, a server that disseminate posts or forwards messages, a server that communicates with a social networking app, a server that facilitates inter-member communication, or a combination thereof, etc.). By way of example but not limitation, a server may receive at least a portion of at least one behavioral fingerprint that is associated with the user device at a server device that provides social networking functionality (e.g., a Google+ server may receive from a Visa server or a Google Wallet server one or more indications of items purchased, as well as retailers from which they were purchased, using an Apple iPhone). However, claimed subject matter is not limited to any particular described embodiments, implementations, examples, etc.

For certain example embodiments, an operation 820 may be directed at least partially to wherein the receiving at least a portion of at least one behavioral fingerprint that is associated with the user device at a server device that provides social networking functionality (of operation 818) includes forwarding the received at least a portion of the at least one behavioral fingerprint that is associated with the user device from the server device to the user device. For certain example implementations, at least one device may forward (e.g., transmit, send after receiving, provide to an entity scheduled to get updates, or a combination thereof, etc.) a received at least a portion of at least one behavioral fingerprint 110 that is associated with (e.g., that can impact authentication or authorization decisions for, that can be affected by interactions with, corresponding to, stored at, or a combination thereof, etc.) a user device 102 from a server device 112 to a user device 102. By way of example but not limitation, a server may forward the received at least a portion of the at least one behavioral fingerprint that is associated with the user device from the server device to the user device (e.g., a Google+ server may send indications of items purchased using a Nexus Android smartphone, with the indications being received from retailers from which the items were purchased, to the Nexus Android smartphone, which may have a Google Wallet application resident thereon). However, claimed subject matter is not limited to any particular described embodiments, implementations, examples, etc.

For certain example embodiments, an operation 822 may be directed at least partially to wherein the communicating for at least one interaction related to a user of a user device in a behavioral fingerprint habitat (of operation 802) includes signaling an authentication likelihood corresponding to the user of the user device with respect to at least one authorized user of the user device. For certain example implementations, at least one device may signal (e.g., provide, record, broadcast, transmit, announce, post, publicize, note, or a combination thereof, etc.) an authentication likelihood 724 (e.g., a probability, a result of a calculation such as a maximum likelihood estimation, a numerical value, a coefficient, a machine learning product, a probability distribution, a Bayesian-derived output, or a combination thereof, etc. indicating at least one likelihood that a current user is at least likely who the user purports to be, is at least likely an authorized user of a user device, is at least likely to be a person that is currently signed into a user device, or a combination thereof, etc.) corresponding to (e.g., associated with, related to, representative of, indicative of, derived from, pertaining to, impacting, or a combination thereof, etc.) a user 104 of a user device 102 with respect to at least one authorized user (e.g., a user 104 that is authorized to use a given user device 102 to at least some extent, a user 104 that is associated with a behavioral fingerprint 110 corresponding to a given user device 102, an owner of a given user device 102, or a combination thereof, etc.) of a user device 102. By way of example but not limitation, a server may signal an authentication likelihood corresponding to the user of the user device with respect to at least one authorized user of the user device (e.g., a Google server may provide an indication, such as "very likely" or "moderately likely", that represents how likely a current user of a Samsung Galaxy phone is to be a known authorized user of the Samsung Galaxy phone). However, claimed subject matter is not limited to any particular described embodiments, implementations, examples, etc.

For certain example embodiments, an operation 824a or 824b may be directed at least partially to wherein the signaling an authentication likelihood corresponding to the user of the user device with respect to at least one authorized user of the user device (of operation 822) includes computing the authentication likelihood corresponding to the user of the user device with respect to the at least one authorized user of the user device (for operation 824a) and transmitting, from a server device that provides social networking features, the authentication likelihood corresponding to the user of the user device with respect to the at least one authorized user of the user device to a third party server device (for operation 824b). For certain example implementations, at least one device may: compute (e.g., determine, calculate, perform at least one routine to ascertain, or a combination thereof, etc.) an authentication likelihood 724 (e.g., a probability, a result of a calculation such as a maximum likelihood estimation, a numerical value, a coefficient, a machine learning product, a probability distribution, a Bayesian-derived output, or a combination thereof, etc. indicating at least one likelihood that a current user is at least likely who the user purports to be, is at least likely an authorized user of a user device, is at least likely to be a person that is currently signed into a user device, or a combination thereof, etc.) corresponding to (e.g., associated with, related to, representative of, indicative of, derived from, pertaining to, impacting, or a combination thereof, etc.) a user 104 of a user device 102 with respect to at least one authorized user of a user device 102 (e.g., a user 104 that is authorized to use a given user device 102 to at least some extent, a user 104 that is associated with a behavioral fingerprint 110 corresponding to a given user device 102, an owner of a given user device 102, or a combination thereof, etc.); or transmit (e.g., send, propagate over a network using electromagnetic signals, propel onto the internet, or a combination thereof, etc.), from a server device 112 that provides social networking features (e.g., provides access to newsfeeds, enables messages to be exchanged between or among social network members, facilitates exchanging information within social network circles, or a combination thereof, etc.), an authentication likelihood 724 corresponding to a user 104 of a user device 102 with respect to at least one authorized user of a user device 102 to a third party server device (e.g., a server device that is not owned by a social network, a server device that is not operated for a social network, a server device owned by or operated for a retail establishment, a server device owned by or operated for a security company, or a combination thereof, etc.). By way of example but not limitation, a server may compute the authentication likelihood corresponding to the user of the user device with respect to the at least one authorized user of the user device (e.g., a Google server may calculate a probability indication, such as a probability distribution, that represents how likely a current user of a Samsung Galaxy phone is to be a known authorized user of the Samsung Galaxy phone); or transmit, from a server device that provides social networking features, the authentication likelihood corresponding to the user of the user device with respect to the at least one authorized user of the user device to a third party server device (e.g., a Google+ server may transmit a probability distribution, which represents how likely a current user of a Samsung Galaxy phone is to be a known authorized user of the Samsung Galaxy phone, to a server operated by or for another company, such as a small independent retail establishment that participates in Google offers). However, claimed subject matter is not limited to any particular described embodiments, implementations, examples, etc.

FIG. 8D illustrates a flow diagram 800D having example operations 828, 830, 832, 834, 836, or 838. For certain example embodiments, an operation 828 may be directed at least partially to wherein the communicating for at least one interaction related to a user of a user device in a behavioral fingerprint habitat (of operation 802) includes reporting social network activity to a behavioral fingerprint aggregator. For certain example implementations, at least one device may report (e.g., send descriptions of, send labels or codes representing, transmit a synopsis of, or a combination thereof, etc.) social network activity (e.g., social network members to whom messages are sent, social network members from whom messages are received, indications of like or dislike, information communicated such as plans to travel or make a purchase, groups or circles joined, entities that are followed, or a combination thereof, etc.) to a behavioral fingerprint aggregator 732 (e.g., an entity that accepts behavioral fingerprint-related indications and incorporates them into a behavioral fingerprint, an entity that receives indications from diverse sources and combines them into a behavioral fingerprint, an entity that processes data about a user to produce at least one behavioral fingerprint indicator, or a combination thereof, etc.). By way of example but not limitation, a server may report social network activity to a behavioral fingerprint aggregator (e.g., a Facebook server may send a list of postings made by a Facebook member with the members Android phone or Apple MacBook to the member's designated credit card security company for potential incorporation into a behavioral fingerprint associated with the member). However, claimed subject matter is not limited to any particular described embodiments, implementations, examples, etc.

For certain example embodiments, an operation 830 may be directed at least partially to wherein the communicating for at least one interaction related to a user of a user device in a behavioral fingerprint habitat (of operation 802) includes receiving a request for social network member verification. For certain example implementations, at least one device may receive (e.g., accept as part of one or more packets, acquire via an electromagnetic communication, process a signal pertaining to, take delivery of, or a combination thereof, etc.) a request 734 (e.g., an inquiry, a code, a petition, a solicitation, or a combination thereof, etc.) for social network member verification (e.g., confirmation, at least one indicia of reliability, an opinion, or a combination thereof, etc. that an alleged, represented, or assumed identity of an individual is likely to be the alleged, represented, or assumed individual that is a member of a social network). By way of example but not limitation, a server may receive a request for social network member verification (e.g., a Google+ server may receive an inquiry from a Costco server asking the Google+ server to verify an identity of a current user of an Android smartphone by sending inquiries to at least two people in a family circle of an authorized user of the Android smartphone). However, claimed subject matter is not limited to any particular described embodiments, implementations, examples, etc.

For certain example embodiments, an operation 832 may be directed at least partially to wherein the communicating for at least one interaction related to a user of a user device in a behavioral fingerprint habitat (of operation 802) includes receiving from a third party server at a social network server a request for verification of a targeted social network member. For certain example implementations, at least one device may receive (e.g., accept as part of one or more packets, acquire via an electromagnetic communication, process a signal pertaining to, take delivery of, or a combination thereof, etc.) from a third party server (e.g., a server device that does not provide social networking, a server that is owned by or operated on behalf of a different company, a server that does not maintain or does not utilize a behavioral fingerprint, or a combination thereof, etc.) at a social network server (e.g., a server device that provides social networking, a server owned by or operated for a social network, a server that facilitates communication between or among two or more social network members, a server device that provides information for or receives information from a web or app interface for a social network, or a combination thereof, etc.) a request 734 (e.g., an inquiry, a code, petition, a solicitation, or a combination thereof, etc.) for verification (e.g., confirmation, at least one indicia of reliability, an opinion, or a combination thereof, etc. that an alleged, represented, or assumed identity of an individual is likely to be the alleged, represented, or assumed individual)

of a targeted social network member 736 (e.g., a name, an identification, a listing, or a combination thereof, etc. of a person that has joined a social network, an entity having a social network account, an individual that communicates with other social network participants, or a combination thereof, etc.). By way of example but not limitation, a social network server may receive from a third party server a request for verification of a targeted social network member (e.g., a Twitter server may receive a petition from a McAfee server asking Twitter to attempt to verify that a possessor of a Nokia Lumia smartphone matches an identity of a named Twitter follower). However, claimed subject matter is not limited to any particular described embodiments, implementations, examples, etc.

For certain example embodiments, an operation 834 may be directed at least partially to wherein the communicating for at least one interaction related to a user of a user device in a behavioral fingerprint habitat (of operation 802) includes sending at least one verification inquiry to at least one social network member that is connected to a targeted social network member. For certain example implementations, at least one device may send (e.g., transmit, provide a link or reference or code to retrieve, forward, or a combination thereof, etc.) at least one verification inquiry 738 (e.g., an email, a text message, an instant message, a phone call, a video call, an attachment such as text or imagery to a communication, a request to confirm identity, a request to confirm likelihood, a request to confirm location, a request to confirm knowledge, or a combination thereof, etc.) to at least one social network member 736 (e.g., a person that has joined a social network, an entity having a social network account, an individual that communicates with other social network participants, or a combination thereof, etc.) that is connected to (e.g., accessible by, followed by, a friend of, linked to, part of a circle with, or a combination thereof, etc.) a targeted social network member (e.g., a name, an identification, a listing, or a combination thereof, etc. of a person that has joined a social network, an entity having a social network account, an individual that communicates with other social network participants, or a combination thereof, etc.). By way of example but not limitation, a server may send at least one verification inquiry to at least one social network member that is connected to a targeted social network member (e.g., a Facebook server may send at least one inquiry to one or more friends of a particular Facebook member asking the one or more friends to confirm if they know that the particular Facebook member, who uses an Apple iPhone, is likely traveling in South America). However, claimed subject matter is not limited to any particular described embodiments, implementations, examples, etc.

For certain example embodiments, an operation 836 may be directed at least partially to wherein the communicating for at least one interaction related to a user of a user device in a behavioral fingerprint habitat (of operation 802) includes receiving at least one response to at least one verification inquiry from at least one social network member that is connected to a targeted social network member. For certain example implementations, at least one device may receive (e.g., accept as part of one or more packets, acquire via an electromagnetic communication, process a signal pertaining to, take delivery of, or a combination thereof, etc.) at least one response (e.g., an answer, an indication, a confirmation, a refutation, a clarification, or a combination thereof, etc.) to at least one verification inquiry 738 (e.g., an email, a text message, an instant message, a phone call, a video call, an attachment such as text or imagery to a communication, a request to confirm identity, a request to confirm likelihood, a request to confirm location, a request to confirm knowledge, or a combination thereof, etc.) from at least one social network member 736 (e.g., a person that has joined a social network, an entity having a social network account, an individual that communicates with other social network participants, or a combination thereof, etc.) that is connected to (e.g., accessible by, followed by, a friend of, linked to, part of a circle with, or a combination thereof, etc.) a targeted social network member (e.g., a name, an identification, a listing, or a combination thereof, etc. of a person that has joined a social network, an entity having a social network account, an individual that communicates with other social network participants, or a combination thereof, etc.). By way of example but not limitation, a server may receive at least one response to at least one verification inquiry from at least one social network member that is connected to a targeted social network member (e.g., a Facebook server may receive from multiple friends of a particular Facebook member four confirmations and two denials about whether the multiple friends know whether the particular Facebook member, who uses an Apple iPhone, is known to be traveling in South America). However, claimed subject matter is not limited to any particular described embodiments, implementations, examples, etc.

For certain example embodiments, an operation 838 may be directed at least partially to wherein the communicating for at least one interaction related to a user of a user device in a behavioral fingerprint habitat (of operation 802) includes sending at least an indication of at least one response received for at least one verification inquiry from at least one social network member that is connected to a targeted social network member. For certain example implementations, at least one device may send (e.g., transmit, provide a link or reference or code to retrieve, forward, or a combination thereof, etc.) at least an indication (e.g., a summary, a description, a reproduction, or a combination thereof, etc.) of at least one response (e.g., an answer, an indication, a confirmation, a refutation, a clarification, or a combination thereof, etc.) received for at least one verification inquiry 738 (e.g., an email, a text message, an instant message, a phone call, a video call, an attachment such as text or imagery to a communication, a request to confirm identity, a request to confirm likelihood, a request to confirm location, a request to confirm knowledge, or a combination thereof, etc.) from at least one social network member 736 (e.g., a person that has joined a social network, an entity having a social network account, an individual that communicates with other social network participants, or a combination thereof, etc.) that is connected to (e.g., accessible by, followed by, a friend of, linked to, part of a circle with, or a combination thereof, etc.) a targeted social network member (e.g., a name, an identification, a listing, or a combination thereof, etc. of a person that has joined a social network, an entity having a social network account, an individual that communicates with other social network participants, or a combination thereof, etc.). By way of example but not limitation, a server may send at least an indication of at least one response received for at least one verification inquiry from at least one social network member that is connected to a targeted social network member (e.g., a Facebook server may inform a Visa server that ⅔ of responding social network friends of a particular Facebook member indicated that the particular Facebook member, who uses an Apple iPhone while traveling, was expected to be traveling in South America). However, claimed subject matter is not limited to any particular described embodiments, implementations, examples, etc.

FIGS. 9A-9D depict example additions or alternatives for a flow diagram of FIG. 8A in accordance with certain example embodiments. As illustrated, flow diagrams of FIGS. 9A-9D may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 9A-9D may be performed so as to be fully or partially overlapping with other operation(s). For certain example embodiments, one or more operations of flow diagrams 900A-900D (of FIGS. 9A-9D) may be performed by at least one server device (e.g., a server device 112). Alternatively, one or more operations of flow diagrams 900A-900D may be performed by at least one user device (e.g., a user device 102).

Figure 9A:
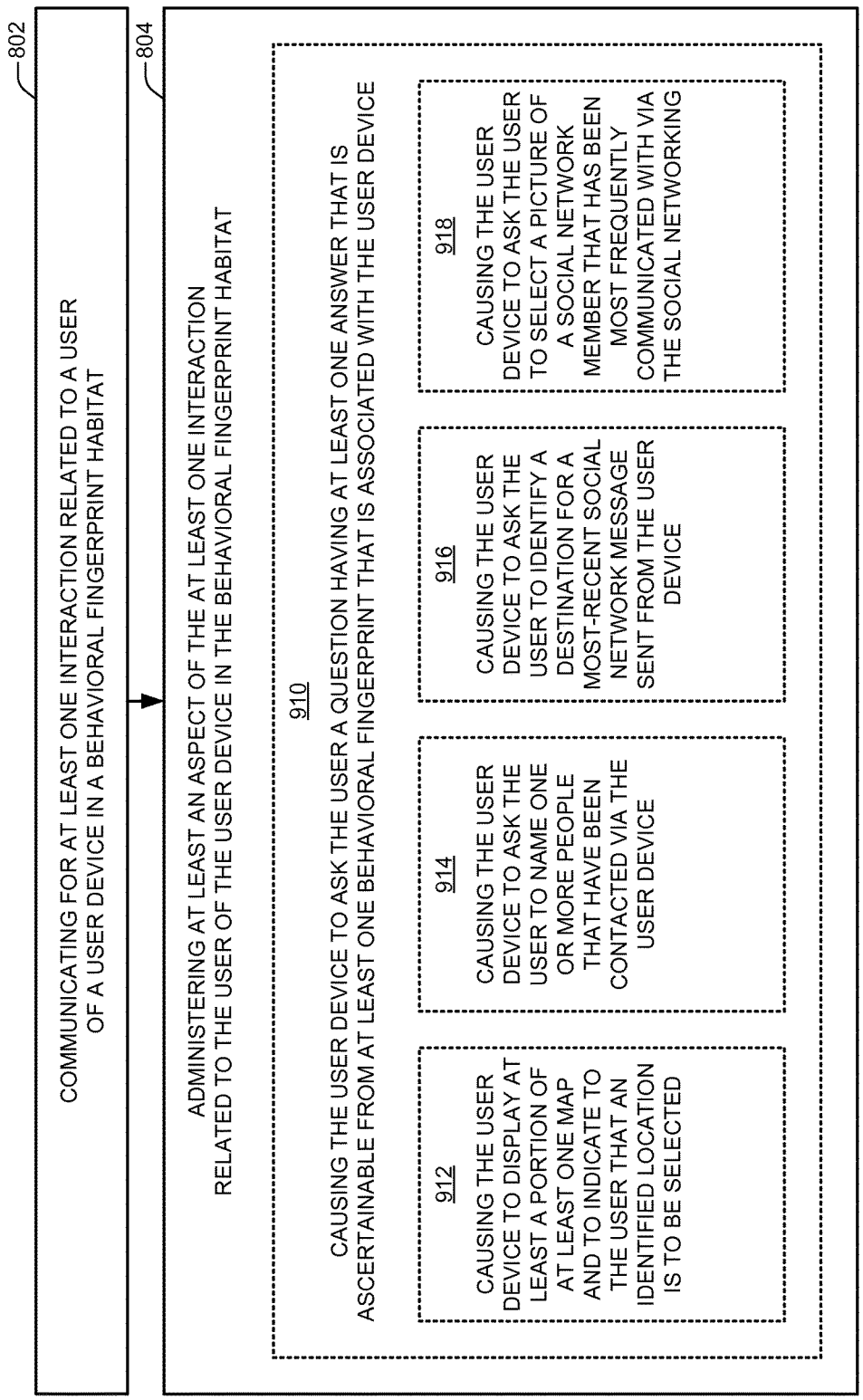

FIG. 9A illustrates a flow diagram 900A having example operations 910, 912, 914, 916, or 918. For certain example embodiments, an operation 910 may be directed at least partially to wherein the administering at least an aspect of the at least one interaction related to the user of the user device in the behavioral fingerprint habitat (of operation 804) includes causing the user device to ask the user a question having at least one answer that is ascertainable from at least one behavioral fingerprint that is associated with the user device. For certain example implementations, at least one device may cause (e.g., order, start, initiate, compel, induce, instruct, command, or a combination thereof, etc.) a user device 102 to ask (e.g., present, display, play on a speaker, or a combination thereof, etc.) a user 104 a question (e.g., an inquiry, an interrogatory, a set of selectable options, words with a blank for short answer input, or a combination thereof, etc.) having at least one answer (e.g., a response to an inquiry, a solution to a problem, a selection, information fitting one or more parameters, or a combination thereof, etc.) that is ascertainable (e.g., determinable, retrievable, derivable, extractable, or a combination thereof, etc.) from at least one behavioral fingerprint 110 that is associated with (e.g., that can impact authentication or authorization decisions for, that can be affected by interactions with, corresponding to, stored at, or a combination thereof, etc.) user device 102. By way of example but not limitation, a server may cause the user device to ask the user a question having at least one answer that is ascertainable from at least one behavioral fingerprint that is associated with the user device (e.g., a Facebook server may send a command to a Facebook app on an Apple iPhone instructing the Facebook app to ask a current user a question that should be correctly answerable by an authorized user with an answer that is determinable from a behavioral fingerprint associated with the Apple iPhone, such as "please enter two of the last ten apps used on this iPhone"). However, claimed subject matter is not limited to any particular described embodiments, implementations, examples, etc.

For certain example embodiments, an operation 912 may be directed at least partially to wherein the causing the user device to ask the user a question having at least one answer that is ascertainable from at least one behavioral fingerprint that is associated with the user device (of operation 910) includes causing the user device to display at least a portion of at least one map and to indicate to the user that an identified location is to be selected. For certain example implementations, at least one device may cause (e.g., order, start, initiate, compel, induce, instruct, command, or a combination thereof, etc.) a user device 102 to display (e.g., request, place on a screen, project, activate pixels, or a combination thereof, etc.) at least a portion of at least one map (e.g., a street view of an area, a drawing of roads, a satellite image, an indoor map, an outdoor map, or a combination thereof, etc.) and to indicate (e.g., describe, instruct, present words visually or aurally, or a combination thereof, etc.) to a user 102 that an identified location (e.g., a pin point, an encircled area, an address, an arrow, a block or zone of multiple identifiable blocks or zones, or a combination thereof, etc.) is to be selected (e.g., pressed on a screen, have an indicator thereof vocalized, entered on a physical or virtual keyboard, point or shake a device, or a combination thereof, etc.). By way of example but not limitation, a server may cause the user device to display at least a portion of at least one map and to indicate to the user that an identified location is to be selected (e.g., a Foursquare server may instruct a behavioral fingerprint-oriented, automated authentication program on an LG Android phone to display four mapped locations and ask the user to select a location that represents a work address for an authorized user). However, claimed subject matter is not limited to any particular described embodiments, implementations, examples, etc.

For certain example embodiments, an operation 914 may be directed at least partially to wherein the causing the user device to ask the user a question having at least one answer that is ascertainable from at least one behavioral fingerprint that is associated with the user device (of operation 910) includes causing the user device to ask the user to name one or more people that have been contacted via the user device. For certain example implementations, at least one device may cause (e.g., order, start, initiate, compel, induce, instruct, command, or a combination thereof, etc.) a user device 102 to ask (e.g., request, present, display, play on a speaker, or a combination thereof, etc.) a user 104 to name (e.g., identify, select from among options, enter an actual name, or a combination thereof, etc.) one or more people that have been contacted (e.g., called, texted, instant messaged, social network messaged or posted, video or text messaged through a proprietary interface such as Apple's iMessage, or a combination thereof, etc.) via user device 102. By way of example but not limitation, a server may cause the user device to ask the user to name one or more people that have been contacted via the user device (e.g., a MySpace server may send a text message to a feature phone asking a current user to reply with names of two of the last five people that were contacted with a voice or text communication via the feature phone). However, claimed subject matter is not limited to any particular described embodiments, implementations, examples, etc.

For certain example embodiments, an operation 916 may be directed at least partially to wherein the causing the user device to ask the user a question having at least one answer that is ascertainable from at least one behavioral fingerprint that is associated with the user device (of operation 910) includes causing the user device to ask the user to identify a destination for a most-recent social network message sent from the user device. For certain example implementations, at least one device may cause (e.g., order, start, initiate, compel, induce, instruct, command, or a combination thereof, etc.) a user device 102 to ask (e.g., request, present, display, play on a speaker, or a combination thereof, etc.) a user 104 to identify (e.g., select from between or among presented options, enter unilaterally, type via a physical or virtual keyboard, or a combination thereof, etc.) a destination (e.g., a person's name, a group's title, a handle, an alias, an image of an individual, or a combination thereof, etc.) for a most-recent social network message (e.g., a public message, a private message, a posting, a textual communication, an aural or video communication, or a combination thereof, etc.) sent from user device 102. By way of example but not limitation, a server may cause the user device to ask the user to identify a destination for a most-recent social network message sent from the user device (e.g., a LinkedIn server may ask a current user of a Kindle Fire to enter a name or alias of a LinkedIn member to whom a message was most recently sent via a LinkedIn app on the Kindle Fire, with the most-recent LinkedIn member stored in a behavioral fingerprint for the Kindle Fire or an authorized user thereof). However, claimed subject matter is not limited to any particular described embodiments, implementations, examples, etc.

For certain example embodiments, an operation 918 may be directed at least partially to wherein the causing the user device to ask the user a question having at least one answer that is ascertainable from at least one behavioral fingerprint that is associated with the user device (of operation 910) includes causing the user device to ask the user to select a picture of a social network member that has been most frequently communicated with via the social networking. For certain example implementations, at least one device may cause (e.g., order, start, initiate, compel, induce, instruct, command, or a combination thereof, etc.) a user device 102 to ask (e.g., present, display, play on a speaker, or a combination thereof, etc.) a user 104 to select (e.g., indicate from between or among multiple options, press a screen portion displaying, enter a letter representing a choice from multiple choices, or a combination thereof, etc.) a picture (e.g., a photograph, a headshot, an avatar, an image, or a combination thereof, etc.) of a social network member (e.g., a person having a social network account, an individual registered with a social network, a group or other entity that participates in social networking, or a combination thereof, etc.) that has been most frequently (e.g., greatest number of times, most commonly within a particular time frame, or a combination thereof, etc.) communicated with via social networking. By way of example but not limitation, a server may cause the user device to ask the user to select a picture of a social network member that was most frequently communicated with via the social networking (e.g., an Instagram server may contact an Instagram app on an Apple iPhone and command it to display four pictures of Instagram members and to ask a current user of the iPhone to touch a picture of the four pictures with the picture to be touched representing an Instagram member to which an authorized user of the iPhone most frequently sends communications). However, claimed subject matter is not limited to any particular described embodiments, implementations, examples, etc.

FIG. 9B illustrates a flow diagram 900B having example operations 922, 924, 926, or 928. For certain example embodiments, an operation 922 may be directed at least partially to wherein the administering at least an aspect of the at least one interaction related to the user of the user device in the behavioral fingerprint habitat (of operation 804) includes memorializing one or more factors affecting an analysis of the user of the user device with regard to authenticity. For certain example implementations, at least one device may memorialize (e.g., store, note, forward, transmit, formulate for archiving, or a combination thereof, etc.) one or more factors (e.g., utilization indicators of a behavioral fingerprint, portions of a behavioral fingerprint, predicted acts of an authorized user, historical usage of a user device, applications trends of a user device, environmental parameters of an event to potentially occur, characteristics of a current transaction or environment in which a user device is involved, statistical values thereof, comparison results, or a combination thereof, etc.) affecting (e.g., impacting, changing, determining, or a combination thereof, etc.) an analysis (e.g., a study, a comparison, a probabilistic examination, an inspection of counterweighting variables, or a combination thereof, etc.) of a user 104 of a user device 102 with regard to authenticity (e.g., a degree to which a current user is adjudged to be or not to be authentic, a level of expected authenticity, whether a current user is adjudged as authentic or inauthentic, a strength of belief that a current user is or comprises or corresponds to an authorized user (e.g., a user 104 that is authorized to use a given user device 102 to at least some extent, a user 104 that is associated with a behavioral fingerprint 110 corresponding to a given user device 102, an owner of a given user device 102, or a combination thereof, etc.), or a combination thereof, etc.). By way of example but not limitation, a server may memorialize one or more factors affecting an analysis of the user of the user device with regard to authenticity (e.g., a Facebook server may store in a retrievable format one or more indicia or inputs, which are relevant to an interaction with or a behavioral fingerprint associated with a Nokia Lumia Windows Phone 8, resulting in an affirmative determination that a current user is an authentic authorized user of the Nokia Lumia Windows Phone 8). However, claimed subject matter is not limited to any particular described embodiments, implementations, examples, etc.

For certain example embodiments, an operation 924 may be directed at least partially to wherein the memorializing one or more factors affecting an analysis of the user of the user device with regard to authenticity (of operation 922) includes memorializing one or more utilization indicators of at least one behavioral fingerprint that is associated with the user device. For certain example implementations, at least one device may memorialize (e.g., store, note, forward, transmit, formulate for archiving, or a combination thereof, etc.) one or more utilization indicators 720 (e.g., a label, a categorization, a code, a tag, an assignment, one or more words, a description, an association, an act, a prediction, or a combination thereof, etc. that represents, embodies, describes, suggests, or a combination thereof, etc. at least one utilization (e.g., accessing, using, interacting with, carrying, moving from place to place, providing input to, receiving output from, communicating with, running apps on, requesting or completing or effecting transactions via, directing operation of, or a combination thereof, etc.) of a user device) of at least one behavioral fingerprint 110 that is associated with (e.g., linked to, affecting the capabilities of, at least partially controlling, having indicator(s) that are capable of being modified responsive to use of, stored at, associated with an account corresponding to, associated with an authorized user of, or a combination thereof, etc.) a user device 102. By way of example but not limitation, a server may memorialize one or more utilization indicators of at least one behavioral fingerprint that is associated with the user device (e.g., a Google server may transmit representations of user interface actions with a Google Nexus tablet for a behavioral fingerprint thereof that led to a determination that a current user is sufficiently authenticated to permit the current user to read an authorized user's email). However, claimed subject matter is not limited to any particular described embodiments, implementations, examples, etc.

For certain example embodiments, an operation 926 may be directed at least partially to wherein the memorializing one or more factors affecting an analysis of the user of the user device with regard to authenticity (of operation 922) includes memorializing at least one environmental parameter relating to an event to potentially occur in conjunction with the user device. For certain example implementations, at least one device may memorialize (e.g., store, note, forward, transmit, formulate for archiving, or a combination thereof, etc.) at least one environmental parameter 726 (e.g., a value, a parameter, an indication of surroundings, a description, a financial valuation, a security level, a location, proximate other user devices, or a combination thereof, etc.) relating to (e.g., associated with, corresponding to, descriptive of, indicative of, pertaining to, or a combination thereof, etc.) an event 728 (e.g., a happening, an action, an occurrence, an exchange, a purchase, an accessing, an unlocking, a meeting, a usage, a transfer, a communication, or a combination thereof, etc.) to potentially occur (e.g., to possibly happen, to conditionally transpire, to occur upon approval, to develop if permitted, to involve an analysis, to continue if not blocked, or a combination thereof, etc.) in conjunction with (e.g., along with, as requested by, as facilitated by, via, at least partially using, involving, or a combination thereof, etc.) a user device 102. By way of example but not limitation, a server may memorialize at least one environmental parameter relating to an event to potentially occur in conjunction with the user device (e.g., a LinkedIn server may package for archiving (i) an item that a user of an Apple iPhone attempted to purchase using the Apple iPhone, (ii) a location of a store of a failed purchase attempt, and (iii) a route the iPhone was taken on to reach the store location if the user of the iPhone is not determined to be sufficiently authentic to permit the item purchase with an automated authentication determination). However, claimed subject matter is not limited to any particular described embodiments, implementations, examples, etc.

For certain example embodiments, an operation 928 may be directed at least partially to wherein the memorializing one or more factors affecting an analysis of the user of the user device with regard to authenticity (of operation 922) includes memorializing at least one result of one or more comparisons of (i) one or more utilization indicators of at least one behavioral fingerprint that is associated with the user device and (ii) at least one environmental parameter relating to an event to potentially occur in conjunction with the user device. For certain example implementations, at least one device may memorialize (e.g., store, note, forward, transmit, formulate for archiving, or a combination thereof, etc.) at least one result (e.g., an output, a difference, a similarity, a representation of overlapping or mutually-exclusive aspects, a value, a code, a designation, or a combination thereof, etc.) of one or more comparisons (e.g., a determination of one or more similarities or differences, an ascertainment of coextensive aspects, a drawing of contrasts, an establishing of a correlation, a weighing or balancing, or a combination thereof, etc.) of (i) one or more utilization indicators 720 (e.g., a label, a categorization, a code, a tag, an assignment, one or more words, a description, an association, an act, a prediction, or a combination thereof, etc. that represents, embodies, describes, suggests, or a combination thereof, etc. at least one utilization (e.g., accessing, using, interacting with, carrying, moving from place to place, providing input to, receiving output from, communicating with, running apps on, requesting or completing or effecting transactions via, directing operation of, or a combination thereof, etc.) of a user device) of at least one behavioral fingerprint 110 that is associated with (e.g., linked to, affecting the capabilities of, at least partially controlling, having indicator(s) that are capable of being modified responsive to use of, stored at, associated with an account corresponding to, associated with an authorized user of, or a combination thereof, etc.) a user device 102 and (ii) at least one environmental parameter 726 (e.g., a value, a parameter, an indication of surroundings, a description, a financial valuation, a security level, a location, proximate other user devices, or a combination thereof, etc.) relating to (e.g., associated with, corresponding to, descriptive of, indicative of, pertaining to, or a combination thereof, etc.) an event 728 (e.g., a happening, an action, an occurrence, an exchange, a purchase, an accessing, an unlocking, a meeting, a usage, a transfer, a communication, or a combination thereof, etc.) to potentially occur (e.g., to possibly happen, to conditionally transpire, to occur upon approval, to develop if permitted, to involve an analysis, to continue if not blocked, or a combination thereof, etc.) in conjunction with (e.g., along with, as requested by, as facilitated by, via, at least partially using, involving, or a combination thereof, etc.) a user device 102. By way of example but not limitation, a server may memorialize at least one result of one or more comparisons of (i) one or more utilization indicators of at least one behavioral fingerprint that is associated with the user device and (ii) at least one environmental parameter relating to an event to potentially occur in conjunction with the user device (e.g., an Instagram server may store actual values of or relative indications of similarities or differences between (i) a typical time, a usual location, and a common mode of accessing—such as desktop versus phone versus tablet or web browser versus social network app or particular web browser choice—an authorized user's social network account and (ii) a respective current time, current location, and current mode of a request to access the authorized user's social network account by a current user of an Apple iMac desktop computer). However, claimed subject matter is not limited to any particular described embodiments, implementations, examples, etc.

FIG. 9C illustrates a flow diagram 900C having example operations 932, 934, 936, or 938. For certain example embodiments, an operation 932 may be directed at least partially to wherein the administering at least an aspect of the at least one interaction related to the user of the user device in the behavioral fingerprint habitat (of operation 804) includes consulting a behavioral fingerprint that is associated with at least one of the user device or the user prior to forwarding a social network communication arriving from the user device. For certain example implementations, at least one device may consult (e.g., consider, refer to, factor into a decision, inspect, or a combination thereof, etc.) a behavioral fingerprint 110 that is associated with (e.g., linked to, affecting the capabilities of, at least partially controlling, having indicator(s) that are capable of being modified responsive to use of, stored at, associated with an account corresponding to, associated with an authorized user of, that can impact authentication or authorization decisions for, that can be affected by interactions with, corresponding to, stored at, or a combination thereof, etc.) at least one of a user device 102 or a user 104 prior to forwarding (e.g., sending, transmitting, posting, messaging, presenting to a destination, enabling a destination to access, or a combination thereof, etc.) a social network communication 740 (e.g., a message, a post, a tweet, a pinning, an email or instant message sent via a social network interface, a voice or video communication transmitted via social networking infrastructure, or a combination thereof, etc.) arriving from (e.g., being received in a transmission from, acquiring via, accepting in a signal originating at, receiving directly or indirectly from, or a combination thereof, etc.) user device 102. By way of example but not limitation, a server may consult a behavioral fingerprint that is associated with at least one of the user device or the user prior to forwarding a social network communication arriving from the user device (e.g., after receiving a connection request from a LinkedIn app executing on a Barnes & Noble Nook intended for a given LinkedIn member but prior to sending the connection request to the given LinkedIn member, a LinkedIn server may access at least a portion of a behavioral fingerprint that is associated with the B&N Nook or an authorized user thereof). However, claimed subject matter is not limited to any particular described embodiments, implementations, examples, etc.

For certain example embodiments, an operation 934 may be directed at least partially to wherein the consulting a behavioral fingerprint that is associated with at least one of the user device or the user prior to forwarding a social network communication arriving from the user device (of operation 932) includes conditioning a posting of the social network communication at least partially on at least one comparison including one or more utilization indicators of the behavioral fingerprint and a content of the social network communication. For certain example implementations, at least one device may condition (e.g., make contingent, make at least partially dependent, cause to be affected or impacted by, render it at least partially based on, or a combination thereof, etc.) a posting (e.g., an action of making text accessible, an action of making a picture or video visible, an instruction to publicize a communication, enabling a communication to be placed on a wall or newsfeed or stream, an act of sending a tweet, an act of pinning an item, an act of sharing a picture, or a combination thereof, etc.) of a social network communication 740 (e.g., a message, a post, a tweet, a pinning, an email or instant message sent via a social network interface, a voice or video communication transmitted via social networking infrastructure, a picture or other image, or a combination thereof, etc.) at least partially on at least one comparison (e.g., a determination of one or more similarities, a determination of one or more differences, an ascertainment of coextensive aspects, a drawing of contrasts, an establishing of a correlation, a weighing or balancing between or among, or a combination thereof, etc.) including one or more utilization indicators 720 of a behavioral fingerprint 110 and a content (e.g., words, sentences, text, grammar, images, recognizable items in pictures or other images, identifiable aspects of videos, or a combination thereof, etc.) of social network communication 740. By way of example but not limitation, a server may condition a posting of the social network communication at least partially on at least one comparison including one or more utilization indicators of the behavioral fingerprint and a content of the social network communication (e.g., a Pinterest server may delay or prevent a submitted item from being pinned if it deviates sufficiently from a historical trend of items uploaded by a user of a Samsung Galaxy Android smartphone as determinable from a behavioral fingerprint associated therewith, such as if a submitted picture includes humans revealing a high percentage of flesh when consultation of the behavioral fingerprint indicates that a user typically uploads images of culinary dishes). However, claimed subject matter is not limited to any particular described embodiments, implementations, examples, etc.

For certain example embodiments, an operation 936 may be directed at least partially to wherein the consulting a behavioral fingerprint that is associated with at least one of the user device or the user prior to forwarding a social network communication arriving from the user device (of operation 932) includes conditioning a messaging of the social network communication at least partially on at least one comparison including one or more utilization indicators of the behavioral fingerprint and a message destination of the social network communication. For certain example implementations, at least one device may condition (e.g., make contingent, make at least partially dependent, cause to be affected or impacted by, render it at least partially based on, or a combination thereof, etc.) a messaging (e.g., a private communication, a communication with enumerated destinations, a communication that is to be accessible by a determinable set of social network members, or a combination thereof, etc.) of a social network communication 740 (e.g., a message, a post, a tweet, a pinning, an email or instant message sent via a social network interface, a voice or video communication transmitted via social networking infrastructure, or a combination thereof, etc.) at least partially on at least one comparison (e.g., a determination of one or more similarities, a determination of one or more differences, an ascertainment of coextensive aspects, a drawing of contrasts, an establishing of a correlation, a weighing or balancing between or among, or a combination thereof, etc.) including one or more utilization indicators 720 of a behavioral fingerprint 110 and a message destination (e.g., an identified friend, a named circle, an email address, an alias, finite number of followers, or a combination thereof, etc.) of social network communication 740. By way of example but not limitation, a server may condition a messaging of the social network communication at least partially on at least one comparison including one or more utilization indicators of the behavioral fingerprint and a message destination of the social network communication (e.g., a Google+ server may at least temporarily block delivery of a Google+ message sent from an Android Nexus tablet at 1 am to a destination that has not been sent a message in six months or that is on a user-provided do-not-send list in accordance with at least one indicator of a behavioral fingerprint that is associated with the Android Nexus tablet). However, claimed subject matter is not limited to any particular described embodiments, implementations, examples, etc.

For certain example embodiments, an operation 938 may be directed at least partially to wherein the consulting a behavioral fingerprint that is associated with at least one of the user device or the user prior to forwarding a social network communication arriving from the user device (of operation 938) includes analyzing the social network communication in relation to a readability level corresponding to the behavioral fingerprint prior to forwarding the social network communication. For certain example implementations, at least one device may analyze (e.g., study, compare, a probabilistically examine, inspect counterweighting variables or factors, or a combination thereof, etc.) a social network communication 740 (e.g., a message, a post, a tweet, a pinning, an email or instant message sent via a social network interface, a voice or video communication transmitted via social networking infrastructure, or a combination thereof, etc.) in relation to a readability level (e.g., an indication of writing style, an indication of target audience, a score, a reading ease score, a grade level indication, a Dale-Chall formula score, a value on a lexile scale, or a combination thereof, etc.) corresponding to (e.g., stored as part of, reflected by, indicated in, referenced by, or a combination thereof, etc.) a behavioral fingerprint 110 prior to forwarding (e.g., sending, transmitting, posting, messaging, presenting to a destination, or a combination thereof, etc.) social network communication 740. By way of example but not limitation, a server may analyze the social network communication in relation to a readability level corresponding to the behavioral fingerprint prior to forwarding the social network communication (e.g., a Facebook server may refuse to post a communication submitted from an HTC Windows Phone 8 smartphone without an affirmative authentication if a readability level of the submitted communication is significantly below or above a typical readability level of postings submitted from the HTC Windows Phone 8 smartphone as evidenced by an average readability level score included as part of a behavioral fingerprint associated with an authorized user of the HTC Windows Phone 8 smartphone). However, claimed subject matter is not limited to any particular described embodiments, implementations, examples, etc.

Figure 9D:
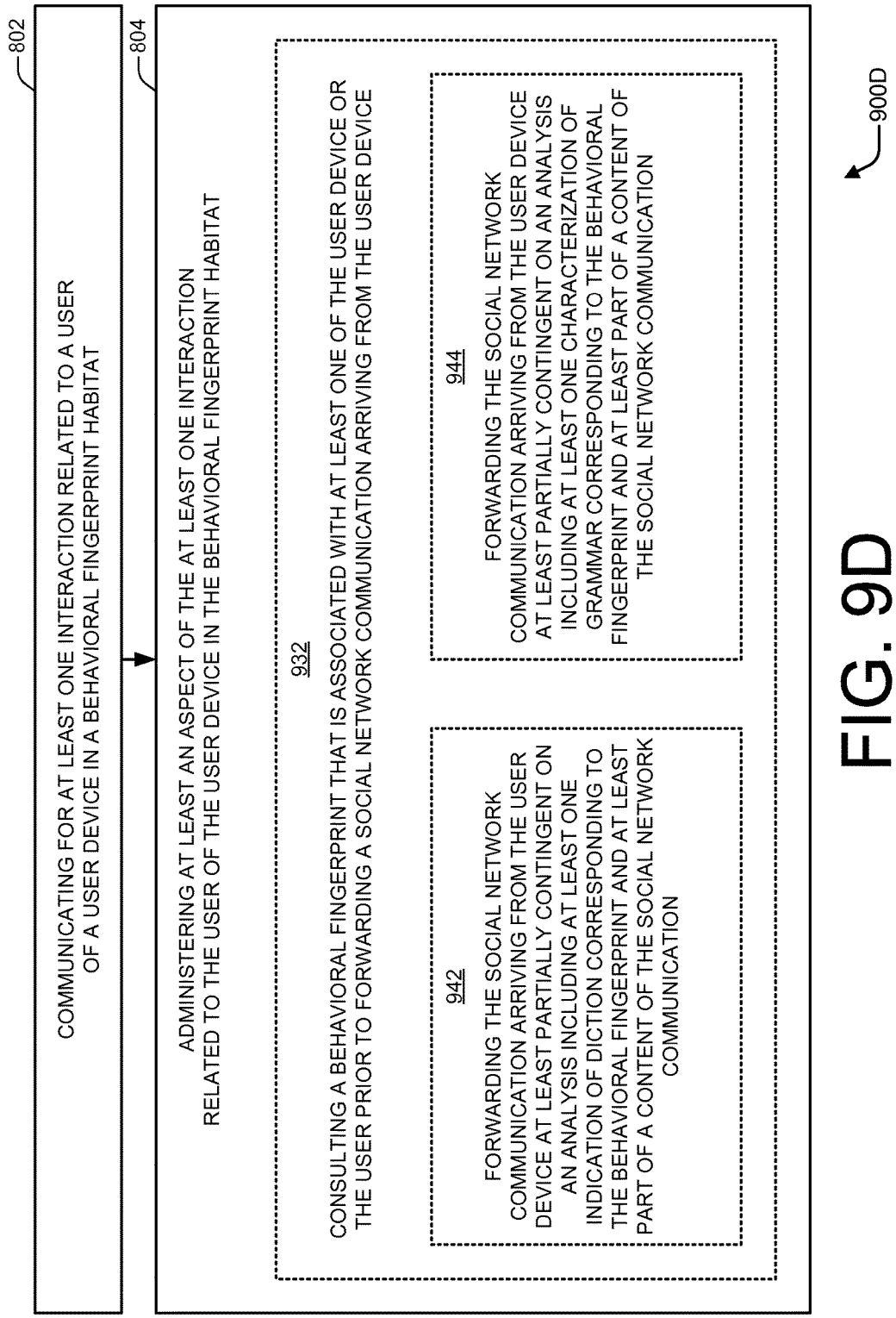

FIG. 9D illustrates a flow diagram 900D having example operations 942 or 944. For certain example embodiments, an operation 942 may be directed at least partially to wherein the consulting a behavioral fingerprint that is associated with at least one of the user device or the user prior to forwarding a social network communication arriving from the user device (of operation 932) includes forwarding the social network communication arriving from the user device at least partially contingent on an analysis including at least one indication of diction corresponding to the behavioral fingerprint and at least part of a content of the social network communication. For certain example implementations, at least one device may forward (e.g., send, transmit, post, message, present to a destination, enable a destination to access, or a combination thereof, etc.) a social network communication 740 (e.g., a message, a post, a tweet, a pinning, an email or instant message sent via a social network interface, a voice or video communication transmitted via social networking infrastructure, or a combination thereof, etc.) arriving from (e.g., received from, acquired via, originated at, approved using, formulated or prepared utilizing, or a combination thereof, etc.) a user device 102 at least partially contingent on (e.g., conditional upon, dependent on, affected or impacted by, gated based on, potentially permitted to occur or continue based on a result of, or a combination thereof, etc.) an analysis (e.g., a study, a comparison, a probabilistic examination, a consideration of counterweighting variables or factors, or a combination thereof, etc.) including at least one indication of diction (e.g., choice of words, acceptability of word choice, politeness of text, professional versus casual nature of words, or a combination thereof, etc.) corresponding to a behavioral fingerprint 110 and at least part of a content (e.g., words, sentences, text, grammar, images, recognizable items in pictures or other images, identifiable aspects of videos, or a combination thereof, etc.) of social network communication 740. By way of example but not limitation, a server may forward the social network communication arriving from the user device at least partially contingent on an analysis including at least one indication of diction corresponding to the behavioral fingerprint and at least part of the content of the social network communication (e.g., a Twitter server may publicize a submitted tweet if a level or type of diction of the tweet matches a diction of tweets customarily received from a given iPad or account as included or indicated as part of a behavioral fingerprint that is associated with the iPad or quarantine or delay a submitted tweet if it fails to match a diction level or type of a behavioral fingerprint, such as if the submitted tweet includes profanity when previous tweets have not). However, claimed subject matter is not limited to any particular described embodiments, implementations, examples, etc.

For certain example embodiments, an operation 944 may be directed at least partially to wherein the consulting a behavioral fingerprint that is associated with at least one of the user device or the user prior to forwarding a social network communication arriving from the user device (of operation 932) includes forwarding the social network communication arriving from the user device at least partially contingent on an analysis including at least one characterization of grammar corresponding to the behavioral fingerprint and at least part of a content of the social network communication. For certain example implementations, at least one device may forward (e.g., send, transmit, post, message, present to a destination, enable a destination to access, or a combination thereof, etc.) a social network communication 740 (e.g., a message, a post, a tweet, a pinning, an email or instant message sent via a social network interface, a voice or video communication transmitted via social networking infrastructure, or a combination thereof, etc.) arriving from (e.g., received from, acquired via, originated at, approved using, formulated or prepared utilizing, or a combination thereof, etc.) a user device 102 at least partially contingent on (e.g., conditional upon, dependent on, affected or impacted by, gated based on, potentially permitted to occur or continue based on a result of, or a combination thereof, etc.) an analysis (e.g., a study, a comparison, a probabilistic examination, a consideration of counterweighting variables or factors, or a combination thereof, etc.) including at least one characterization of grammar (e.g., punctuation, capitalization, subject-verb agreement, spelling, pronoun usage, general number agreement, fragments, verb phrases, noun phrases, grammar style, misused words, or a combination thereof, etc.) corresponding to behavioral fingerprint 110 and at least part of a content (e.g., words, sentences, text, grammar, images, recognizable items in pictures or other images, identifiable aspects of videos, or a combination thereof, etc.) of social network communication 740. By way of example but not limitation, a server may forward the social network communication arriving from the user device at least partially contingent on an analysis including at least one characterization of grammar corresponding to the behavioral fingerprint and at least part of a content of the social network communication (e.g., a Facebook server may permit a submitted communication from a social network member's iPhone to post to a given wall only if text of the submitted communication has a grammar level or score that meets or exceeds a grammar level or score of a behavioral fingerprint that is associated with the iPhone or an authorized user thereof). However, claimed subject matter is not limited to any particular described embodiments, implementations, examples, etc.

Figure 10A:
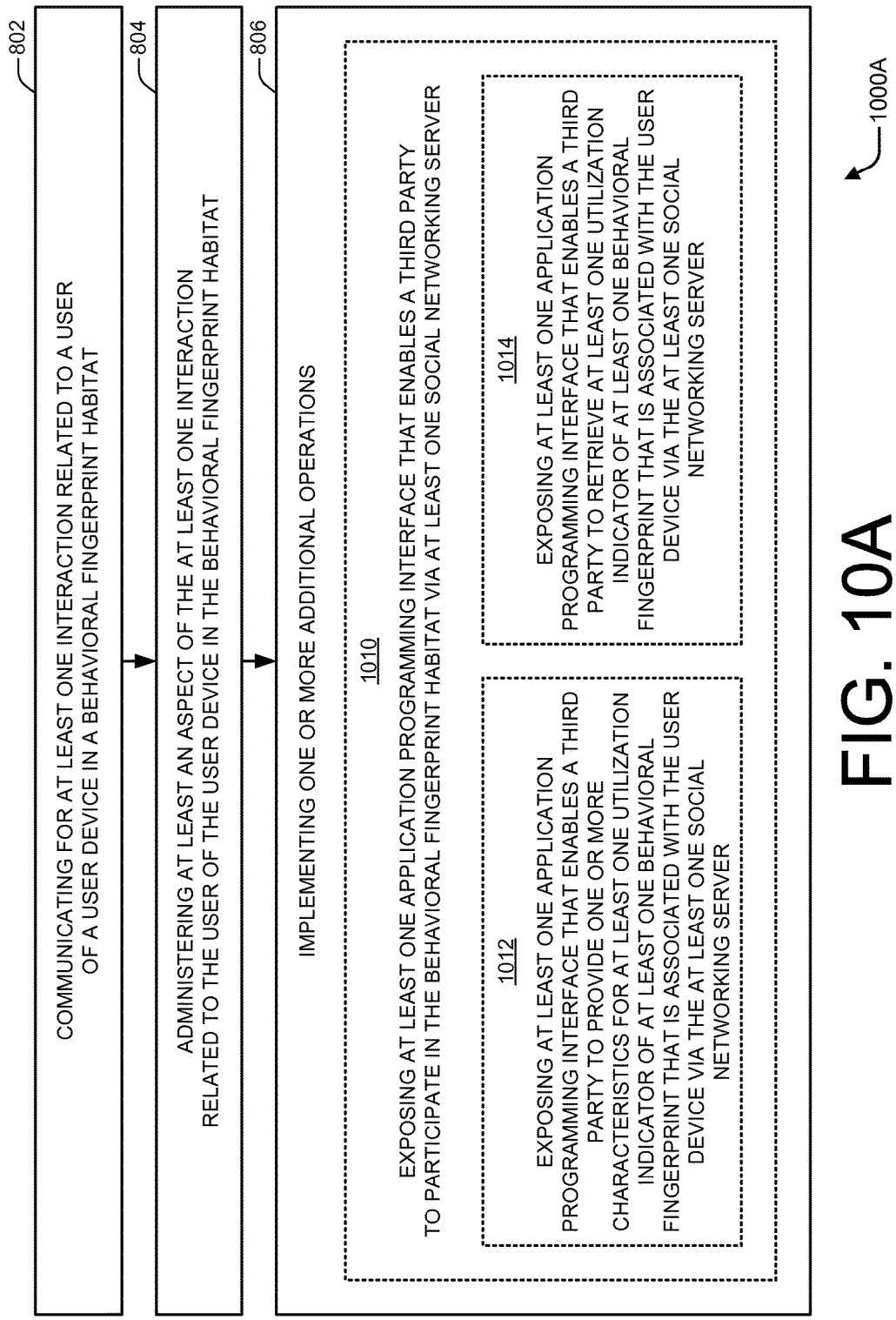
FIG. 10A depicts example additions or alternatives for a flow diagram of FIG. 8A in accordance with certain example embodiments.

FIG. 10A depicts example additions or alternatives for a flow diagram of FIG. 8A in accordance with certain example embodiments. As illustrated, the flow diagram of FIG. 10A may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of the flow diagram of FIG. 10A may be performed so as to be fully or partially overlapping with other operation(s). For certain example embodiments, one or more operations of flow diagram 1000A (of FIG. 10A) may be performed by at least one server device (e.g., a server device 112). Alternatively, one or more operations of flow diagram 1000A may be performed by at least one user device (e.g., a user device 102).

FIG. 10A illustrates a flow diagram 1000A having an example operation 806. For certain example embodiments, an operation 806 may be directed at least partially to wherein a method further includes implementing one or more additional operations. For certain example implementations, at least one device may implement one or more operations in addition to communicating (of operation 802) or administering (of operation 804). Example additional operations may include, by way of example but not limitation, 1010, 1012, or 1014 (of FIG. 10A).

FIG. 10A illustrates a flow diagram 1000A having example operations 1010, 1012, or 1014. For certain example embodiments, an operation 1010 may be directed at least partially to wherein a method of communicating (of operation 802) or administering (of operation 804) further includes (at operation 806) exposing at least one application programming interface that enables a third party to participate in the behavioral fingerprint habitat via at least one social networking server. For certain example implementations, at least one device may expose (e.g., make available to those external to a company, publicize, create, instantiate on an internet-available server, provide as a web service, produce via cloud computing, or a combination thereof, etc.) at least one application programming interface (API) 730 (e.g., a web service, a cloud computing platform, a programming environment, code or functionality or modules to enable software components to communicate with each other, or a combination thereof, etc.) that enables a third party (e.g., an entity that does not provide the API, a company that did not create the API, a company that does not maintain the API infrastructure, an entity that is not providing social networking functionality, or a combination thereof, etc.) to participate (e.g., utilize, rely on authentication determinations based at least partially on, rely on authorization decisions based at least partially on, receive or retrieve information from, submit or contribute data for, make an authentication determination for, or a combination thereof, etc. a behavioral fingerprint 110) in a behavioral fingerprint habitat 710 via at least one social networking server (e.g., a server device 112 that is part of a social network 714, a server that provides social network functionality, a server that facilitates communication between or among social network members, a server that provides updates to or receives posts or messages from a client-side social network application, or a combination thereof, etc.). By way of example but not limitation, a server may expose at least one application programming interface that enables a third party to participate in the behavioral fingerprint habitat via at least one social networking server (e.g., a Facebook server may present a web interface that provides access (1) to at least a portion of a behavioral fingerprint of a social network member to a security service such as Trend Micro that wishes to make authentication determinations using a behavioral fingerprint or (2) to a profiling app on a user device that an authorized user has given permission to help tune a behavioral fingerprint by contributing indications of actions by the authorized user that are detected by the profiling app). However, claimed subject matter is not limited to any particular described embodiments, implementations, examples, etc.

For certain example embodiments, an operation 1012 may be directed at least partially to wherein the exposing at least one application programming interface that enables a third party to participate in the behavioral fingerprint habitat via at least one social networking server (of operation 1010) includes exposing at least one application programming interface that enables a third party to provide one or more characteristics for at least one utilization indicator of at least one behavioral fingerprint that is associated with the user device via the at least one social networking server. For certain example implementations, at least one device may expose (e.g., make available to those external to a company, publicize, create, instantiate on an internet-available server, provide as a web service, produce via cloud computing, or a combination thereof, etc.) at least one application programming interface (API) 730 (e.g., a web service, a cloud computing platform, a programming environment, code or functionality or modules to enable software components to communicate with each other, or a combination thereof, etc.) that enables a third party (e.g., an entity that does not provide the API, a company that did not create the API, a company that does not maintain the API infrastructure, an entity that is not providing social networking functionality, or a combination thereof, etc.) to provide (e.g., submit, send in, report, upload, or a combination thereof, etc.) one or more characteristics 722 (e.g., a description, an identification, a code, a label, an actual or preliminary indicator 302-324, or a combination thereof, etc., which may correspond to (e.g., be associated with, be related to, be descriptive of, be indicative of, be derived from, pertain to, impact, or a combination thereof, etc.) at least one interaction 708) for at least one utilization indicator 720 (e.g., a label, a categorization, a code, a tag, an assignment, one or more words, a description, an association, an act, a prediction, or a combination thereof, etc. that represents, embodies, describes, suggests, or a combination thereof, etc. at least one utilization (e.g., accessing, using, interacting with, carrying, moving from place to place, providing input to, receiving output from, communicating with, running apps on, requesting or completing or effecting transactions via, directing operation of, or a combination thereof, etc.) of a user device) of at least one behavioral fingerprint 110 that is associated with (e.g., linked to, affecting the capabilities of, at least partially controlling, having indicator(s) that are capable of being modified responsive to use of, stored at, associated with an account corresponding to, associated with an authorized user of, or a combination thereof, etc.) a user device 102 via at least one social networking server (e.g., a server device 112 that is part of a social network 714, a server that provides social network functionality, a server that facilitates communication between or among social network members, a server that provides updates to or receives posts or messages from a client-side social network application, or a combination thereof, etc.). By way of example but not limitation, a server may expose at least one application programming interface (API) that enables a third party to provide one or more characteristics for at least one utilization indicator of at least one behavioral fingerprint that is associated with the user device via the at least one social networking server (e.g., a Google+ server may publicly present a set of programming instructions or constructs or input capabilities so that a retail company is empowered to submit for incorporation into a behavioral fingerprint of an authorized user of a Google Nexus smartphone a description of a transaction between the authorized user and the retail company). However, claimed subject matter is not limited to any particular described embodiments, implementations, examples, etc.

For certain example embodiments, an operation 1014 may be directed at least partially to wherein the exposing at least one application programming interface that enables a third party to participate in the behavioral fingerprint habitat via at least one social networking server (of operation 1010) includes exposing at least one application programming interface that enables a third party to retrieve at least one utilization indicator of at least one behavioral fingerprint that is associated with the user device via the at least one social networking server. For certain example implementations, at least one device may expose (e.g., make available to those external to a company, publicize, create, instantiate on an internet-available server, provide as a web service, produce via cloud computing, or a combination thereof, etc.) at least one application programming interface (API) 730 (e.g., a web service, a cloud computing platform, a programming environment, code or functionality or modules to enable software components to communicate with each other, or a combination thereof, etc.) that enables a third party (e.g., an entity that does not provide the API, a company that did not create the API, a company that does not maintain the API infrastructure, an entity that is not providing social networking functionality, or a combination thereof, etc.) to retrieve (e.g., acquire by asking, ascertain by requesting contemporaneously or previously, download, or a combination thereof, etc.) at least one utilization indicator 720 (e.g., a label, a categorization, a code, a tag, an assignment, one or more words, a description, an association, an act, a prediction, or a combination thereof, etc. that represents, embodies, describes, suggests, or a combination thereof, etc. at least one utilization (e.g., an accessing, a using, an interacting with, a carrying, a moving from place to place, a providing input to, a receiving output from, a communicating with, a running of apps on, a requesting or completing or effecting transactions via, a directing operation of, or a combination thereof, etc.) of a user device) of at least one behavioral fingerprint 110 that is associated with (e.g., linked to, affecting the capabilities of, at least partially controlling, having indicator(s) that are capable of being modified responsive to use of, stored at, associated with an account corresponding to, associated with an authorized user of, or a combination thereof, etc.) a user device 102 via at least one social networking server (e.g., a server device 112 that is part of a social network 714, a server that provides social network functionality, a server that facilitates communication between or among social network members, a server that provides updates to or receives posts or messages from a client-side social network application, or a combination thereof, etc.). By way of example but not limitation, a server may expose at least one application programming interface (API) that enables a third party to retrieve at least one utilization indicator of at least one behavioral fingerprint that is associated with the user device via the at least one social networking server (e.g., a Twitter server may provide a web service that an operating system of a tablet computer may utilize to acquire one or more identifications of people that an authorized user of the tablet computer follows). However, claimed subject matter is not limited to any particular described embodiments, implementations, examples, etc.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or nonvolatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for behavioral fingerprinting with social networking, comprising:
   circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device;

circuitry configured for administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with at least one social networking user account; and circuitry configured for facilitating at least one authenticated social networking interaction by the at least one user device at least partially based on at least one authentication decision related to the at least one question having at least one answer ascertainable from at least one behavioral fingerprint associated with at least one social networking user account.

2. The system for behavioral fingerprinting with social networking of claim 1, wherein circuitry configured for communicating at least one interaction related to at least one user of at least one user device in a behavioral fingerprint habitat, including at least signaling at least one authentication likelihood corresponding to the at least one user of the at least one user device with respect to at least one authorized user of the at least one user device comprises:

circuitry configured for sending one or more obtained characteristics corresponding to the at least one interaction for incorporation into at least one behavioral fingerprint associated with the at least one user device.

3. The system for behavioral fingerprinting with social networking of claim 2, wherein circuitry configured for sending one or more obtained characteristics corresponding to the at least one interaction for incorporation into at least one behavioral fingerprint associated with the at least one user device comprises:

circuitry configured for obtaining the one or more obtained characteristics corresponding to the at least one interaction for incorporation into the at least one behavioral fingerprint from at least one social network application resident at the at least one user device, including at least the at least one social network application obtaining at least one current geographic location of the at least one user device at least partially using at least one internet protocol address of the at least one user device.

4. The system for behavioral fingerprinting with social networking of claim 2, wherein circuitry configured for sending one or more obtained characteristics corresponding to the at least one interaction for incorporation into at least one behavioral fingerprint associated with the at least one user device comprises:

circuitry configured for obtaining the one or more obtained characteristics corresponding to the at least one interaction for incorporation into the at least one behavioral fingerprint from at least one social network application resident at the at least one user device, including at least the at least one social network application obtaining at least one current geographic location of the at least one user device at least partially using at least one satellite positioning system receiver of the at least one user device.

5. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:

circuitry configured for receiving at least a portion of at least one behavioral fingerprint associated with the at least one user device by at least one server device that provides social networking functionality.

6. The system for behavioral fingerprinting with social networking of claim 5, wherein circuitry configured for receiving at least a portion of at least one behavioral fingerprint associated with the at least one user device by at least one server device that provides social networking functionality comprises:

circuitry configured for forwarding the received at least a portion of the at least one behavioral fingerprint that associated with the at least one user device from the at least one server device to the at least one user device.

7. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:

circuitry configured for signaling at least one authentication likelihood corresponding to the at least one user of the at least one user device with respect to at least one authorized user of the at least one user device, including at least signaling at least one likelihood that at least one current user of the at least one user device is actually the at least one authorized user of the at least one user device.

8. The system for behavioral fingerprinting with social networking of claim 7, wherein circuitry configured for signaling at least one authentication likelihood corresponding to the at least one user of the at least one user device with respect to at least one authorized user of the at least one user device, including at least signaling at least one likelihood that at least one current user of the at least one user device is actually the at least one authorized user of the at least one user device comprises:

circuitry configured for computing the at least one authentication likelihood that the at least one current user of the at least one user device is actually the at least one authorized user of the at least one user device; and circuitry configured for transmitting, from at least one server device that provides social networking features, at least one indication of the at least one authentication likelihood.

9. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:

circuitry configured for reporting one or more social network activities to at least one behavioral fingerprint aggregator.

10. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:

circuitry configured for receiving at least one request for social network member verification.

11. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:
   circuitry configured for receiving from at least one third party server by at least one social network server at least one request for verification of at least one targeted social network member, including at least receiving at least one request for verification that at least one possessor of the at least one user device matches an identity of at least one existing member of at least one social network.

12. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:
   circuitry configured for sending at least one verification inquiry to at least one social network member connected to at least one targeted social network member, including at least sending at least one request for verification that at least one existing member of at least one social network personally knows at least one possessor of the at least one user device.

13. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:
   circuitry configured for sending at least a one indication of at least one response received for at least one verification inquiry from at least one social network member connected to at least one targeted social network member.

14. The system for behavioral fingerprinting with social networking of claim 1, wherein circuitry configured for administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with at least one social networking user account comprises:
   circuitry configured for causing the at least one user device to ask the at least one user at least one question having at least one answer ascertainable from at least one behavioral fingerprint associated with the at least one user device and the at least one social networking user account.

15. The system for behavioral fingerprinting with social networking of claim 1, wherein circuitry configured for administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with at least one social networking user account comprises:
   circuitry configured for causing the at least one user device to display at least a portion of at least one map and to indicate to the at least one user that at least one identified location on the map on the display is to be selected, including at least asking the at least one user to identify, by touching one or more corresponding map locations, one or more geographical locations indicated as one or more previous social network check-ins by the at least one behavioral fingerprint associated with the at least one social networking user account.

16. The system for behavioral fingerprinting with social networking of claim 1, wherein circuitry configured for administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with at least one social networking user account comprises:
   circuitry configured for causing the at least one user device to ask the at least one user to name one or more people that have been contacted via the at least one user device.

17. The system for behavioral fingerprinting with social networking of claim 1, wherein circuitry configured for administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with at least one social networking user account comprises:
   circuitry configured for causing the at least one user device to ask the at least one user to identify at least one destination for a most-recent social network message sent from the at least one user device.

18. The system for behavioral fingerprinting with social networking of claim 1, wherein circuitry configured for administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with at least one social networking user account comprises:
   circuitry configured for causing the at least one user device to ask the at least one user to select at least one picture of at least one social network member, the at least one picture of at least one social network member accessed via the at least one social networking user account.

19. The system for behavioral fingerprinting with social networking of claim 1, wherein circuitry configured for administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with at least one social networking user account comprises:
   circuitry configured for memorializing one or more factors affecting at least one analysis of the at least one user of the at least one user device with regard to authenticity.

20. The system for behavioral fingerprinting with social networking of claim 19, wherein circuitry configured for memorializing one or more factors affecting at least one analysis of the at least one user of the at least one user device with regard to authenticity comprises:
  circuitry configured for memorializing at least one environmental parameter relating to at least one event to potentially occur in conjunction with the at least one user device.

21. The system for behavioral fingerprinting with social networking of claim 19, wherein circuitry configured for memorializing one or more factors affecting at least one analysis of the at least one user of the at least one user device with regard to authenticity comprises:
  circuitry configured for memorializing at least one result of one or more comparisons of (i) one or more utilization indicators of at least one behavioral fingerprint associated with the at least one user device and (ii) at least one environmental parameter relating to at least one event to potentially occur in conjunction with the at least one user device.

22. The system for behavioral fingerprinting with social networking of claim 19, wherein circuitry configured for memorializing one or more factors affecting at least one analysis of the at least one user of the at least one user device with regard to authenticity comprises:
  circuitry configured for memorializing one or more utilization indicators of at least one behavioral fingerprint associated with the at least one user device.

23. The system for behavioral fingerprinting with social networking of claim 1, wherein circuitry configured for administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with at least one social networking user account comprises:
  circuitry configured for consulting at least one behavioral fingerprint associated with one or more of the at least one user device or the at least one user prior to forwarding at least one social network communication arriving from the at least one user device.

24. The system for behavioral fingerprinting with social networking of claim 23, wherein circuitry configured for consulting at least one behavioral fingerprint associated with one or more of the at least one user device or the at least one user prior to forwarding at least one social network communication arriving from the at least one user device comprises:
  circuitry configured for conditioning at least one posting of the at least one social network communication at least partially on at least one comparison including at least (i) one or more utilization indicators of the at least one behavioral fingerprint and (ii) at least part of at least one content of the at least one social network communication.

25. The system for behavioral fingerprinting with social networking of claim 23, wherein circuitry configured for consulting at least one behavioral fingerprint associated with one or more of the at least one user device or the at least one user prior to forwarding at least one social network communication arriving from the at least one user device comprises:
  circuitry configured for forwarding the at least one social network communication arriving from the at least one user device at least partially contingent on at least one analysis including at least (i) at least one indication of diction corresponding to the at least one behavioral fingerprint and (ii) at least part of at least one content of the at least one social network communication.

26. The system for behavioral fingerprinting with social networking of claim 23, wherein circuitry configured for consulting at least one behavioral fingerprint associated with one or more of the at least one user device or the at least one user prior to forwarding at least one social network communication arriving from the at least one user device comprises:
  circuitry configured for forwarding the at least one social network communication arriving from the at least one user device at least partially contingent on at least one analysis including at least (i) at least one characterization of grammar corresponding to the at least one behavioral fingerprint and (ii) at least part of at least one content of the at least one social network communication.

27. The system for behavioral fingerprinting with social networking of claim 23, wherein circuitry configured for consulting at least one behavioral fingerprint associated with one or more of the at least one user device or the at least one user prior to forwarding at least one social network communication arriving from the at least one user device comprises:
  circuitry configured for conditioning at least one message of the at least one social network communication at least partially on at least one comparison including at least (i) one or more utilization indicators of the at least one behavioral fingerprint and (ii) at least one message destination of the at least one social network communication.

28. The system for behavioral fingerprinting with social networking of claim 23, wherein circuitry configured for consulting at least one behavioral fingerprint associated with one or more of the at least one user device or the at least one user prior to forwarding at least one social network communication arriving from the at least one user device comprises:
  circuitry configured for analyzing the at least one social network communication in relation to at least one readability level corresponding to the at least one behavioral fingerprint prior to forwarding the at least one social network communication.

29. The system for behavioral fingerprinting with social networking of claim 1, further comprising:
  circuitry configured for exposing at least one application programming interface that enables at least one third party to participate in the behavioral fingerprint habitat via at least one social networking server.

30. The system for behavioral fingerprinting with social networking of claim 29, wherein circuitry configured for exposing at least one application programming interface that enables at least one third party to participate in the behavioral fingerprint habitat via at least one social networking server comprises:
  circuitry configured for exposing at least one application programming interface that enables at least one third party to provide one or more characteristics for at least one utilization indicator of at least one behavioral fingerprint associated with the at least one user device via the at least one social networking server.

31. The system for behavioral fingerprinting with social networking of claim 29, wherein circuitry configured for exposing at least one application programming interface that enables at least one third party to participate in the behavioral fingerprint habitat via at least one social networking server comprises:

circuitry configured for exposing at least one application programming interface that enables at least one third party to retrieve at least one utilization indicator of at least one behavioral fingerprint associated with the at least one user device via the at least one social networking server.

32. The system for behavioral fingerprinting with social networking of claim 1, wherein circuitry configured for facilitating at least one authenticated social networking interaction by the at least one user device at least partially based on at least one authentication decision related to the at least one question having at least one answer ascertainable from at least one behavioral fingerprint associated with at least one social networking user account comprises:

circuitry configured for authorizing access to at least some data disposed on at least one server in response to determining that the at least one user is the at least one authorized user of the at least one user device.

33. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:

circuitry configured for detecting at least one proximity of the at least one user device to at least another user device, including at least determining that the at least one user of the at least one user device may not be the at least one authorized user of the at least one user device at least partially based on determining that at least another user device associated with at least one social networking friend of the at least one authorized user is not within the at least one proximity of the at least one user device at least partially based on at least one indication of the at least one behavioral fingerprint that the at least one social networking friend is a friend of the at least one authorized user.

34. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:

circuitry configured for receiving at least one response to at least one verification inquiry from at least one social network member connected to at least one targeted social network member.

35. The system for behavioral fingerprinting with social networking of claim 1, wherein circuitry configured for communicating for at least one interaction related to at least one user of at least one user device in a behavioral fingerprint habitat, including at least signaling at least one authentication likelihood corresponding to the at least one user of the at least one user device with respect to at least one authorized user of the at least one user device comprises:

circuitry configured for causing, responsive to receiving at least one indication of the at least one user device requesting at least one social networking interaction, the at least one user device to sense at least one current geographic location of the at least one user device at least partially using at least one satellite positioning sensor of the at least one user device;

circuitry configured for accessing the at least one behavioral fingerprint associated with the at least one authorized user to determine at least one match between the sensed at least one current geographic location and at least one normal geographic location of the at least one authorized user; and circuitry configured for signaling that the at least one user of the at least one user device is not the at least one authorized user at least partially based on failing to match the sensed at least one current geographic location and at least one normal geographic location of the at least one authorized user through the at least one behavioral fingerprint.

36. A system for behavioral fingerprinting with social networking, comprising:

at least one computing device; and one or more instructions which, when executed on the at least one computing device, cause the at least one computing device to perform one or more operations including at least:

communicating for at least one interaction related to at least one user of at least one user device in a behavioral fingerprint habitat, including at least signaling at least one authentication likelihood corresponding to the at least one user of the at least one user device with respect to at least one authorized user of the at least one user device;

administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with at least one social networking user account; and facilitating at least one authenticated social networking interaction by the at least one user device at least partially based on at least one authentication decision related to the at least one question having at least one answer ascertainable from at least one behavioral fingerprint associated with at least one social networking user account.

37. A method for behavioral fingerprinting with social networking, comprising:

communicating for at least one interaction related to at least one user of at least one user device in a behavioral fingerprint habitat, including at least signaling at least one authentication likelihood corresponding to the at least one user of the at least one user device with respect to at least one authorized user of the at least one user device;

administering at least one aspect of the at least one interaction related to the at least one user of the at least one user device in the behavioral fingerprint habitat, including at least causing the at least one user device to ask the at least one user at least one question having at least one answer ascertainable from at least one behavioral fingerprint associated with the at least one social networking user account; and facilitating at least one authenticated social networking interaction by the at least one user device at least partially based on at least one authentication decision related to the at least one question having at least one answer ascertainable from at least one behavioral fingerprint associated with at least one social networking user account.

\* \* \* \* \*